United States Patent

Nagao et al.

[11] Patent Number: 6,062,548
[45] Date of Patent: May 16, 2000

[54] VIBRATION ATTENUATING SPRING AND DAMPER MECHANISM USING THE SAME SPRING

[75] Inventors: Kanehisa Nagao; Mamoru Ohkubo, both of Neyagawa, Japan

[73] Assignee: EXEDY Corporation, Neyagawa, Japan

[21] Appl. No.: 08/925,484

[22] Filed: Sep. 5, 1997

[30] Foreign Application Priority Data

| Sep. 11, 1996 | [JP] | Japan | 8-240678 |
| Jan. 23, 1997 | [JP] | Japan | 9-010546 |
| Jan. 23, 1997 | [JP] | Japan | 9-010547 |
| Jan. 23, 1997 | [JP] | Japan | 9-010548 |

[51] Int. Cl.[7] ........................ F16J 1/04
[52] U.S. Cl. ........................ 267/30; 92/209
[58] Field of Search ............ 267/30, 229, 160, 267/161, 162, 165; 192/209

[56] References Cited

U.S. PATENT DOCUMENTS

| 3,737,155 | 6/1973 | Karlan | 267/136 |
| 4,949,829 | 8/1990 | Tojima et al. | 192/89.23 |
| 5,358,210 | 10/1994 | Simon et al. | 248/628 |
| 5,533,415 | 7/1996 | Ackermann et al. | 74/7 E |
| 5,562,541 | 10/1996 | Fukushima | 464/24 |
| 5,803,441 | 9/1998 | Yamamoto | 267/165 |
| 5,868,232 | 2/1999 | Fukushima | 192/70.13 |

FOREIGN PATENT DOCUMENTS

| 675587 | 4/1939 | Germany . |
| 749197 | 4/1944 | Germany . |

Primary Examiner—Robert J. Oberleitner
Assistant Examiner—Melanie Talavera
Attorney, Agent, or Firm—Shinjy

[57] ABSTRACT

A damper mechanism for attenuating vibrations having a vibration attenuating spring element (1) which includes: a leaf spring (2) having a bent portion (4) and a pair of lever portions (5) extending from both ends of the bent portion (4); and an elastic member (3) disposed between the lever portions (5). When the leaf spring (2) is subjected to compressive forces, the lever portions (5) and the elastic member (3) are elastically deformed. Internal friction is generated in the elastic member (5). The functions typically provided by a conventional elastic member and a conventional resistance generating mechanism are realized by utilizing a simple spring element composed of the leaf spring (2) and the elastic member (3).

17 Claims, 55 Drawing Sheets

XXXXVI

VIBRATION ATTENUATING SPRING AND DAMPER MECHANISM USING THE SAME SPRING

BACKGROUND OF THE INVENTION

A. Field of the Invention

The present invention relates to a vibration attenuating spring and a damper mechanism using the vibration attenuating spring for attenuating twist vibrations.

B. Description of the Related Art

In a vehicle, a damper mechanism is typically interposed between an engine and a transmission for absorbing torque variation of the engine. The damper mechanism may be part of a clutch disc assembly or a flywheel assembly of a clutch mechanism. The damper mechanism usually includes an input member and an output member which are rotatable relative to each other, spring members such as coil springs for limiting the rotation of the two members with respect to each other, and a friction generating mechanism for generating a friction for attenuating the vibrations when the two members are rotated relative to each other. Alternatively, instead of the friction generating mechanism, it is possible to use a viscous resistance generating mechanism with the spring members for generating a viscous resistance to attenuate the vibrations. The viscous resistance generating mechanism may generate a large resistance in comparison with the friction generating mechanism.

The above-described mechanism using the viscous resistance generating mechanism requires a sealed fluid chamber for containing fluid used with the viscous resistance generating mechanism. Therefore, a reliable seal configuration is necessary. Also, since two kinds of mechanism, the spring members and the viscous resistance generating mechanism, are required for optimal operation, the structure is complicated and expensive to manufacture.

SUMMARY OF THE INVENTION

One object of the present invention is to simplify damper mechanism function and structure.

In accordance with one aspect of the present invention, a vibration attenuating spring includes a leaf spring having a bent portion and a pair of lever portions extending from respective ends of the bent portion. An elastic member is disposed within the bent portion. The elastic member is elastically deformable in response to the lever portions being pressed toward one another.

Preferably, the elastic member is fixed to an inner surface of the bent portion of the leaf spring.

Preferably, the elastic member is formed integrally within the bent portion of the leaf spring.

Preferably, the elastic member is formed of rubber.

Preferably, the leaf spring is formed of metal.

Preferably, the elastic member is formed with a contact portion that is in intimate contact with an inner surface of the bent portion of the leaf spring and the elastic member is also formed with a projection portion extending from the contact portion, the projecting portion being space apart from the lever portions with the leaf spring in a compression free state.

Preferably, the vibration attenuating spring further includes a plurality of the spring elements that are connected in series end to end defining an elongated leaf spring with a plurality of bent portions having corresponding lever portions.

In accordance with another aspect of the present invention, a vibration attenuating spring includes an elongated leaf spring bent into an undulated shape with a plurality of bent portions and a plurality of lever portions where each lever portion extends between corresponding pairs of bent portions defining a repeating sinusoidal-like shape. An elastic member is disposed between an adjacent pair of the lever portions such that the elastic member is elastically deformable when the pair of the lever portions are moved toward each other.

Preferably, a plurality of the elastic members are disposed between a plurality of pairs of the lever portions.

Preferably, the elastic member is fixed to an inner surface of one of the bent portions.

Preferably, the elastic member is formed integrally with the leaf spring.

Preferably, the elastic member is formed of a rubber material.

Preferably, the leaf spring is formed of metal.

In accordance with yet another aspect of the present invention, a vibration attenuating spring includes an elongated leaf spring bent into an undulated shape with a plurality of bent portions and a plurality of lever portions where each lever portion extends between corresponding pairs of bent portions defining a repeating sinusoidal-like shape. The bent portions define two groups of bent portions, a first group of bent portions being defined on a first longitudinal side of the leaf spring and a second group of bent portions defined on a second longitudinal side of the leaf spring. A plurality of elastic members are disposed on an inner surface of each of the first group of bent portions, the elastic members being elastically deformable in response to the lever portions being urged toward one another.

Preferably, the plurality of elastic members are disposed between every other of the first group of lever portions.

Preferably, the plurality of elastic members have differing sizes from one another.

Preferably, the plurality of elastic members have differing rigidities with respect to one another.

Preferably, the plurality of elastic members are fixed to an inner surface of the first group of lever portions.

Preferably, the plurality of elastic members are formed integrally with the first group of lever portions.

Preferably, the plurality of elastic members are formed of rubber.

Preferably, the plurality of leaf springs are formed of metal.

Preferably, the leaf spring is preformed in an arcuate shape as a whole in a compression free state.

In accordance with still another aspect of the present invention, a damper mechanism includes an input rotary member, an output rotary member disposed to be rotatable relative to the input rotary member, and an elongated leaf spring disposed between the input rotary member and the output rotary member. The elongated leaf spring is bent into an undulated shape with a plurality of bent portions and a plurality of lever portions where each lever portion extends between corresponding pairs of bent portions defining a repeating sinusoidal-like shape. The bent portions define two groups of bent portions, a first group of bent portions being defined on a first longitudinal side of the leaf spring and a second group of bent portions defined on a second longitudinal side of the leaf spring. A plurality of elastic members are disposed on an inner surface of at least one of the first and second groups of bent portions. The elastic members are elastically deformable in response to the lever portions being urged toward one another.

Preferably, the input rotary member at least partially defines a damper receiving chamber and a portion of the output rotary member extends into the damper receiving chamber. The leaf spring and the plurality of elastic members are disposed in the damper receiving chamber. The damper mechanism further includes a sliding frictional resistance reducing mechanism disposed between an outer circumferential wall of the damper receiving chamber and the leaf spring.

Preferably, the sliding frictional resistance reducing mechanism includes needle bearings disposed between two circumferentially extending retaining members.

In accordance with another aspect of the present invention, a vibration attenuating spring has a spring element that includes a leaf spring having a bent portion, a pair of pivot portions extending from respective ends of the bent portion and a pair of lever portions, each of the pair of the lever portions extending from a corresponding end of one of the pivot portions. An elastic member is disposed between the lever portion and is elastically deformable in response to the lever portions being pressed toward one another.

Preferably, the elastic member is loosely disposed between the pair of lever portions with the leaf spring in a compression free state.

Preferably, the elastic member is firmly engaged between the pair of lever portions with the leaf spring in a compression free state.

Preferably, the bent portion curves with an arcuate shape in a circumferential direction greater than 180°. The pair of pivot portions extend from respective ends of the bent portion with an arcuate shape that curves in a direction opposite from curving of the arcuate shape of the bent portion. The pair of lever portions curve in a direction opposite from the curve of the pivot portions.

Preferably, a gap is defined between the pair of pivot portions with the leaf spring in a compression free state.

Preferably, the elastic member is made of rubber and the leaf spring is made of metal.

In accordance with yet another aspect of the present invention, a vibration attenuating spring has a plurality of spring elements connected in series to each other, each spring element including a leaf spring having a bent portion, a pair of pivot portions extending from respective ends of the bent portion and a pair of lever portions, each of the pair of the lever portions extending from a corresponding end of one of the pivot portions. An elastic member is disposed between the lever portions and is elastically deformable in response to the lever portions being pressed toward one another.

Preferably, the elastic member is loosely disposed between the pair of lever portions with the leaf spring in a compression free state.

Preferably, the elastic member is firmly engaged between the pair of lever portions with the leaf spring in a compression free state.

Preferably, the bent portion curves with an arcuate shape in a circumferential direction greater than 180°. The pair of pivot portions extend from respective ends of the bent portion with an arcuate shape that curves in a direction opposite from curving of the arcuate shape of the bent portion. The pair of lever portions curve in a direction opposite from the curve of the pivot portions.

Preferably, a gap is defined between the pair of pivot portions with the leaf spring in a compression free state.

Preferably, the elastic member is made of rubber and the leaf spring is made of metal.

In accordance with still yet another aspect of the present invention, a damper mechanism includes an input rotary member, the input rotary member at least partially defining a spring chamber. An output rotary member is disposed to be rotatable relative to the input rotary 333 member, a portion of the output rotary member extending into the spring chamber. A spring element is disposed in the spring chamber. The spring element is engaged for compression between the portion of the output rotary member and portions of the input rotary member in response to relative rotation between the input rotary member and the output rotary member. The spring element includes a leaf spring having a bent portion, a pair of pivot portions extending from respective ends of the bent portion and a pair of lever portions, each of the pair of the lever portions extending from a corresponding end of one of the pivot portions. An elastic member is disposed between the lever portion and is elastically deformable in response to the lever portions being pressed toward one another.

Preferably, the elastic member is loosely disposed between the pair of lever portions with the leaf spring in a compression free state.

Preferably, the elastic member is firmly engaged between the pair of lever portions with the leaf spring in a compression free state.

Preferably, the bent portion curves with an arcuate shape in a circumferential direction greater than 180°. The pair of pivot portions extend from respective ends of the bent portion with an arcuate shape that curves in a direction opposite from curving of the arcuate shape of the bent portion. The pair of lever portions curve in a direction opposite from the curve of the pivot portions.

Preferably, a gap is defined between the pair of pivot portions with the leaf spring in a compression free state.

Preferably, the elastic member is made of rubber and the leaf spring is made of metal.

Preferably, the damper mechanism further includes a sliding frictional resistance reducing mechanism disposed at an outer circumferential side of the spring element within the spring chamber.

Preferably, the sliding frictional resistance reducing mechanism includes first and second retainers, a plurality of rollers disposed between the first and second retainers, the first retainer being engaged with an inner surface of the spring chamber, the second retainer being engaged with an outer radial portion of the spring element.

In another further aspect of the present invention, a damper mechanism includes an input rotary member, the input rotary member at least partially defining a spring chamber and an output rotary member disposed to be rotatable relative to the input rotary member. A portion of the output rotary member extends into the spring chamber. A plurality of spring elements are disposed in the spring chamber. The spring elements are engaged for compression between the portion of the output rotary member and portions of the input rotary member in response to relative rotation between the input rotary member and the output rotary member. Each of the spring elements includes an elongated leaf spring bent into an undulated shape with a plurality of bent portions and a plurality of lever portions where each lever portion extends between corresponding pairs of bent portions defining a repeating sinusoidal-like shape. The bent portions define two groups of bent portions, a first group of bent portions being defined on a first longitudinal side of the leaf spring and a second group of bent portions defined on a second longitudinal side of the leaf spring. A plurality of elastic members are disposed on an inner surface of at least a portion of the first group of bent portions, the elastic members being elastically deformable in response to the lever portions being urged toward one another. At least one spring receiving slider is disposed circumferentially between adjacent spring elements. The spring receiving slider has a radial width that is approximately the same radial width as the spring chamber.

Preferably, the plurality of elastic members are disposed between every other of the first group of lever portions.

Preferably, the plurality of elastic members have differing sizes from one another.

Preferably, the plurality of elastic members have differing rigidities with respect to one another.

Preferably, the plurality of elastic members are fixed to an inner surface of the first group of lever portions.

Preferably, the plurality of elastic members are formed integrally with the first group of lever portions.

Preferably, the plurality of elastic members are formed of rubber.

Preferably, the elongated leaf spring is formed of metal.

Preferably, the leaf spring is preformed in an arcuate shape as a whole in a compression free state.

Preferably, the spring receiving slider is formed with a sliding surface which engages a circumferentially extending surface of the spring chamber.

Preferably, the spring receiving slider is formed with first and second support portions which extend circumferentially from a radially outward portion of the spring receiving slider. The first support portion engages one of the first group of bent portions on a first of the spring elements spacing the first of the spring elements away from the surface of the spring chamber, and the second support portion engages one of the first group of bent portions on a second of the spring elements spacing the second of the spring elements away from the surface of the spring chamber.

With the configurations of the present invention, a more complicated conventional elastic member and resistance generating mechanism are easily replaced with a simple spring element composed of the leaf spring and the elastic member. It is therefore possible to obtain the high performance with desirable characteristics with a simple structure.

These and other objects, features, aspects and advantages of the present invention will become more fully apparent from the following detailed description of the present invention when taken in conjunction with the accompanying drawings where like reference numerals denote corresponding parts throughout.

DETAILED DESCRIPTION OF THE PREFERRED EMBODIMENTS

FIRST EMBODIMENT

Figure 1:
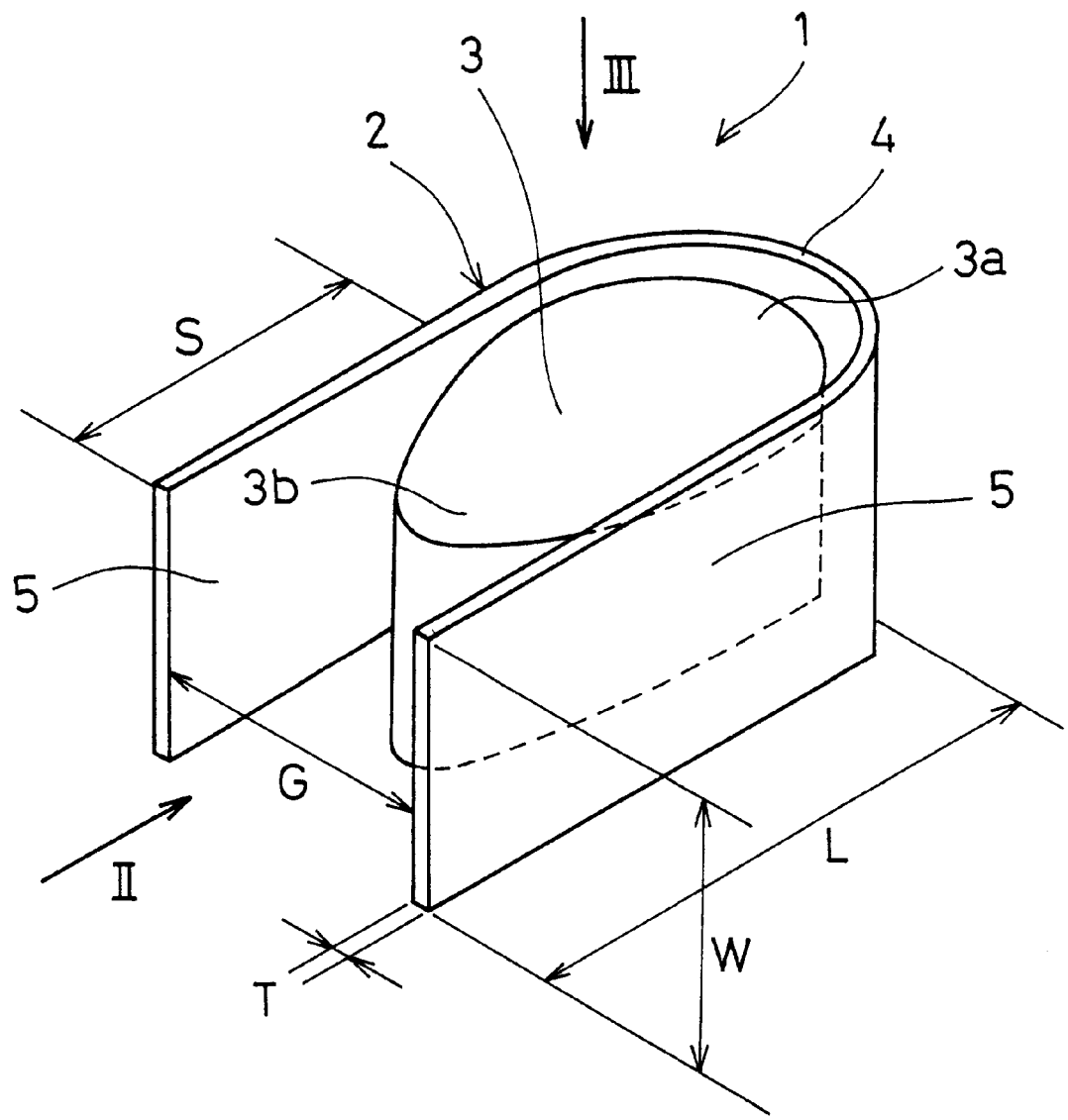
FIG. 1 is a perspective view showing a vibration attenuating spring element in accordance with a first embodiment of the present invention.
Figure 2:
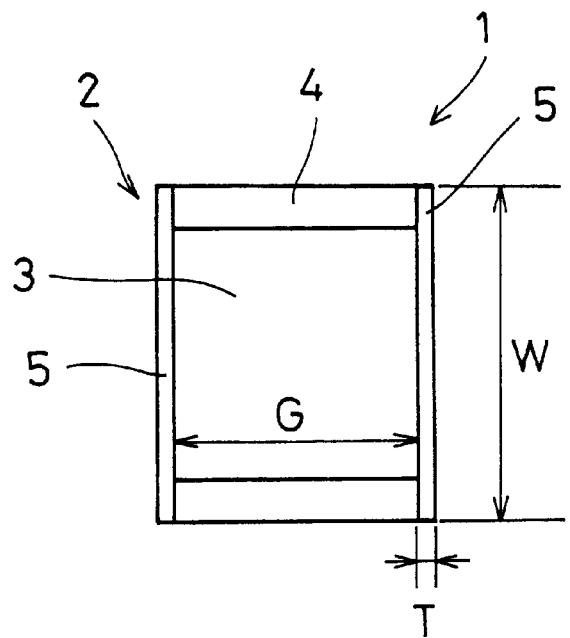
FIG. 2 is an end view of the vibration attenuating spring element looking in the direction of the arrow II in FIG. 1.
Figure 3:
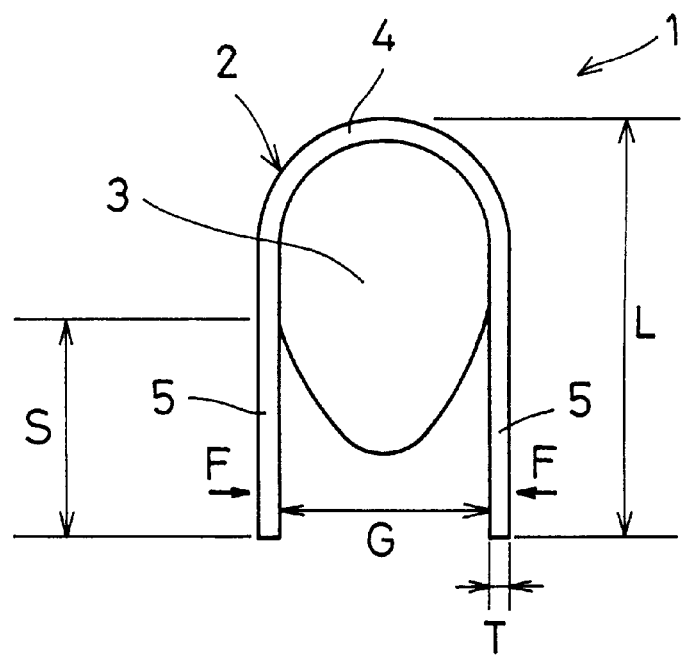
FIG. 3 is a side view of the vibration attenuating spring element looking in the direction of the arrow III in FIG. 1.

A vibration attenuating spring element 1 shown in FIGS. 1 to 3 is composed of a leaf spring 2 and an elastic member 3. The vibration attenuating spring element 1 is for use in a clutch mechanism, such as a clutch disk assembly, a flywheel mechanism or torque convertor, as is described in greater detail below with regard to the various embodiments.

The leaf spring 2 is made of metal, more specifically, spring steel. The leaf spring 2 formed from an elongated slender plate of spring steel which is bent so that opposing ends of the elongated slender plate extend in the generally same direction, possibly being parallel to one another. For example, the leaf spring 2 is bent to form a curved or bent portion 4. Lever portions 5 extend in generally the same direction from the bent portion. The lever portions 5 define a gap G therebetween. The width W and the thickness T of the leaf spring 2 are preferably constant over the entire length of the leaf spring 5.

The elastic member 3 is disposed in the interior of the leaf spring 2, i.e., between the pair of lever portions 5 and is generally confined within the bent portion 4. The elastic member 3 is made of, for example, rubber and is molded to an inner surface bent portion 4 of the leaf spring 2. For instance, the elastic member 3 may be integrally formed with the inner surface of the leaf spring 2 or adhered to the inner surface of the bent portions 4. More specifically, an intimate contact portion 3a of the elastic member 3 is engaged with the bent portion 4. A projecting portion 3b extends away from the intimate contact portion 3a between the lever portions 5.

The intimate contact portion 3a has generally the same curved shape of the bent portion 4 and is molded to the inner surface of the bent portion 4. The projecting portion 3b has a tapering surface, tapering away from the intimate contact portion 3a, and therefore, the projecting portion 3b and the pair of lever portions 5 define a diverging gap therebetween, as is shown in FIGS. 1 and 3.

The length of the projecting portion 3 is shorter than the lever portions 5, as is also shown in FIGS. 1 and 3.

The length of the leaf spring 2 measured from a generally central portion of the bent portion 4 to ends of the lever portions 5 is designated by L, and the distance from the tip ends of the lever portions 5 to the portions of the leaf spring 2 in contact with the elastic member 3 is designated by S, as is shown in FIG. 1.

OPERATION

As was mentioned above, the vibration attenuating spring element 1 is preferably intended for use in a damper mechanism of a clutch, flywheel or torque convertor mechanism. Such applications of the vibration attenuating spring element 1 are described in greater detail below with regard to other embodiments. In such applications of the vibration attenuating spring element 1, relatively rotating bodies contact the vibration attenuating spring element 1, causing it to undergo compression in response to forces applied by the relatively rotating bodies. Relative rotation between the bodies is generally caused by vibrations within the drive train or engine (not shown) of a vehicle equipped with the present invention in a damper assembly.

The vibration attenuating spring element 1 is used for the purpose of attenuating such vibrations. The vibration attenuating spring element 1 is arranged so that the direction of measurement of the gap G corresponds to the direction in which forces or vibrations are applied. When vibrations are transmitted to the vibration attenuating spring element 1, the lever portions 5 are repeatedly elastically deformed such that the lever portions 5 move toward each other to thereby repeatedly compress the elastic member 3. As a result, the vibrations are attenuated.

Elastic material, such as rubber and similar polymers, may undergo large amounts of deformation and still return to its original shape and size without rebound effects such as oscillations. Such deformation causes internal friction within the elastic material. The internal friction prevents the occurrence of oscillations upon recovery from deformation. The elastic member 3 is made of such elastic material.

When vibrations having a minute amplitude occur, the lever portions 5 are mainly elastically deformed to thereby obtain characteristics of low rigidity. In this case, there is little, if any elastic deformation of the elastic member 3 and the internal friction generated is small. With such characteristics, the minute amplitude vibrations are effectively absorbed. In case of vibrations having a large amplitude, the elastic deformation of the elastic member 3 may be generally large. Since the elastic member absorbs the vibration by compression, the characteristics of high rigidity and large internal friction may be obtained. With such characteristics, the large amplitude vibrations are effectively attenuated.

Figure 4:
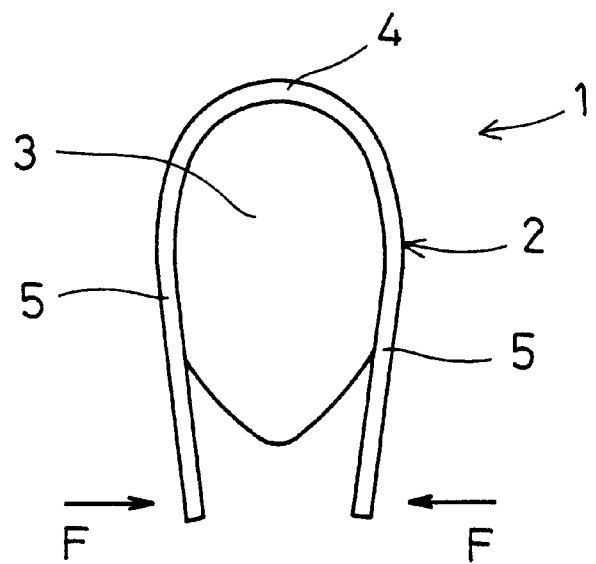
FIG. 4 is a view of the vibration attenuating spring element showing an operational condition of the vibration attenuating spring element depicted in FIGS. 1, 2 and 3.
Figure 5:
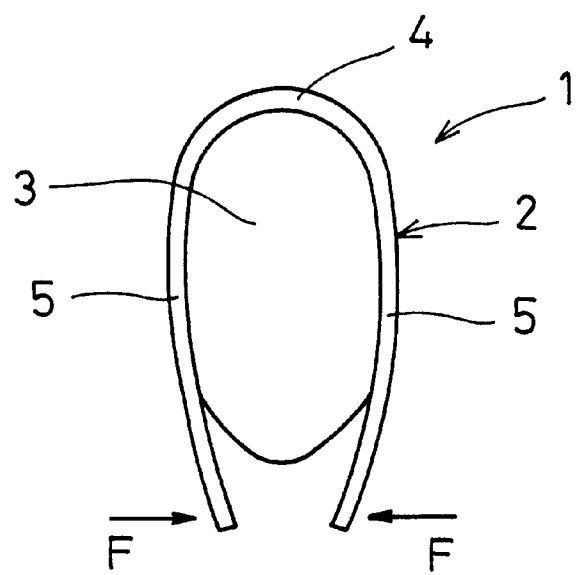
FIG. 5 is a view of the vibration attenuating spring element showing another operational condition of the vibration attenuating spring element.

The elastic deformation operation of the vibration attenuating spring element 1 will be further described with reference to FIGS. 3 to 5. In the condition shown in FIG. 3, no external force is applied to the vibration attenuating spring element 1. In other words, as shown in FIG. 3, the vibration attenuating spring element 1 is in a compression free state. The external forces F are applied in a direction generally parallel to the measured length of the gap G, as shown in FIG. 3. Then, as shown in the order of FIG. 4 to FIG. 5, the lever portions 5 are elastically deformed to thereby compress the elastic member 3. In the process of this elastic deformation, the lever portions 5 are most largely elastically deformed at portions along the length S extending away from the bent portion 4. As the elastic deformation progresses, the free ends of lever portions 5, which were initially not in contact with the elastic member 3, gradually begin to contact the projecting portion 3b of the elastic member 3 thus increasing the overall rigidity of the lever portions 5, since now the elastic member 3 is in contact with the projecting portion 3b. Also, the degree of elastic deformation of the elastic member 3 increases. The internal friction within the elastic member 3 also increases.

ADVANTAGEOUS EFFECT

Prior art configurations include both a spring member and a separate friction generating mechanism for creating a hysterisis effect to dampen vibrations. In the present invention, the vibration attenuating spring element 1 includes the leaf spring 2 and an elastic member 3 which provide generally the same function as the prior art, but do so with a simpler construction The vibration attenuating spring element 1 has a compact structure with highly desirable dampening characteristics. The combination of the leaf spring 2 made of metal and the elastic member 3 made of rubber causes the vibration attenuating spring element 1 to be high in strength and low in weight. Furthermore, since the elastic member 3 may take any desired shape with ease, the characteristics of the vibration attenuating spring element 1 may be changed by altering the shape of the elastic member 3 while keeping a simple structure for the leaf spring 2 (for example, a uniform width and a uniform thickness).

Since the leaf spring 2 is in the form of a bent plate, the shape is compact in comparison with, for example, a coil spring. In particular, it is possible to reduce a dimension of the width W.

Since the elastic member 3 is integrally fixed to the leaf spring 2, the elastic member 3 is prevented from being dislodged from the bent portion of the leaf spring 2. Accordingly, it is possible to carry the vibration attenuating spring element 1 as a single member, thereby facilitating easy and simple transportation and management thereof.

Since the elastic member 3 is made of rubber, a large internal friction is generated when it is elastically deformed. Also, the rubber may be molded in any desired shape with ease.

The above-described advantageous effects are common with all the following embodiments.

MODIFICATION TO THE FIRST EMBODIMENT

The vibration attenuating spring element 1 in accordance with the first embodiment is only one example of the present invention. The shape, the material and the like of each component are not limited to those shown in the embodiment. For example, the material of the elastic member 3 is not limited to the rubber but may be resin or solid elastic viscous material. Also, the elastic member 3 may be in intimate contact with the lever portions over the full side surfaces without any projecting portion.

The elastic member 3 is not always fixed to the leaf spring 2. If the elastic member 3 is freely removed away from the leaf spring 2, it is possible to change the overall deformation characteristics of the vibration attenuating spring element 1 by substituting the elastic members for ones of differing sizes and shapes.

The foregoing modifications may be commonly applied to all the following embodiments.

SECOND EMBODIMENT

Figure 6:
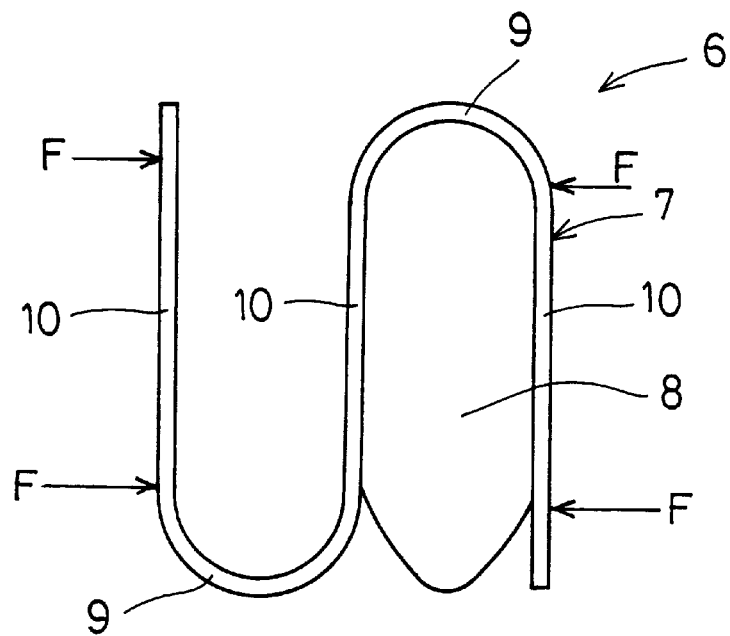
FIG. 6 is a side view of a vibration attenuating spring in accordance with a second embodiment of the present invention.

A vibration attenuating spring 6 shown in FIG. 6 is composed of a leaf spring 7 and an elastic member 8.

The leaf spring 7 is made of metal more specifically, spring steel. The leaf spring 7 is bent so that it has an S-shape. Bent portions 9 are defined on the leaf spring 7. Lever portions 10 are defined extending from each end of each bent portion 9. In the same manner as in the first embodiment, the width and the thickness of the leaf spring 7 are kept constant over the full length. As is shown in FIG. 6, there are three lever portions 10 and two bent portions 9.

An elastic member 8 is disposed within the confines of only one of the bent portion 9 of the leaf spring 7. The other of the two bent portions 9 is left empty. The elastic member 8 is made of, for example, rubber and is molded to the inner surfaces of the bent portion 9 of the leaf spring 7 and adjacent pair of lever portions 10. The elastic member 8 extends in the longitudinal direction of length of the lever portions 10. The elastic members 8 are in direct contact with most of the adjacent lever portions 10 leaving only a small portion or tip of the two adjacent lever portions 10 free from contacting the elastic member 8 in a compression free state.

The vibration attenuating spring 6 is used for the purpose of attenuating the vibrations in, for example, a clutch disc assembly or a flywheel assembly. The vibration attenuating spring 6 is arranged so that forces F may compress the vibration attenuating spring 6. When vibrations are transmitted to the vibration attenuating spring 6, the lever portions 10 are repeatedly elastically deformed in a direction close to each other to thereby repeatedly compress the elastic member 8. As a result, the vibrations are attenuated.

When vibrations having a minute amplitude occur, the lever portions 10 where the elastic member 8 is not disposed and the bent portion 9 are mainly elastically deformed to thereby obtain characteristics of low rigidity. In this case, since the elastic deformation amount of the elastic member 8 is small, the internal friction is small. With such characteristics, the minute amplitude vibrations are effectively absorbed. In case of vibrations having a large amplitude, since the elastic deformation of the lever portions 10 in which no elastic member 8 is disposed and the elastic deformation amount of the bent portions 9 are large, the characteristics of high rigidity and large internal friction may be obtained. With such characteristics, the large amplitude vibrations are effectively attenuated.

The basic effects obtained by the combination of the leaf spring 7 and the elastic member 8 is the generally the same as those obtained by the vibration attenuating spring element 1 according to the first embodiment described above.

Furthermore, in this embodiment, the portion where the elastic member is not disposed is provided in the bent portions 9 of the leaf spring 9 so that a low resistance is obtained by the leaf spring 7 in the range where the deformation amount is small, and a high resistance is obtained by the elastic member 8 in the range where the deformation amount is large. Namely, the two-stage compression characteristics may be obtained by configuring the leaf spring and the elastic member in series with each other.

The size, the shape and the material of the leaf spring 7 and the elastic member 8 are not limited to those shown in this embodiment.

THIRD EMBODIMENT

Figure 7:
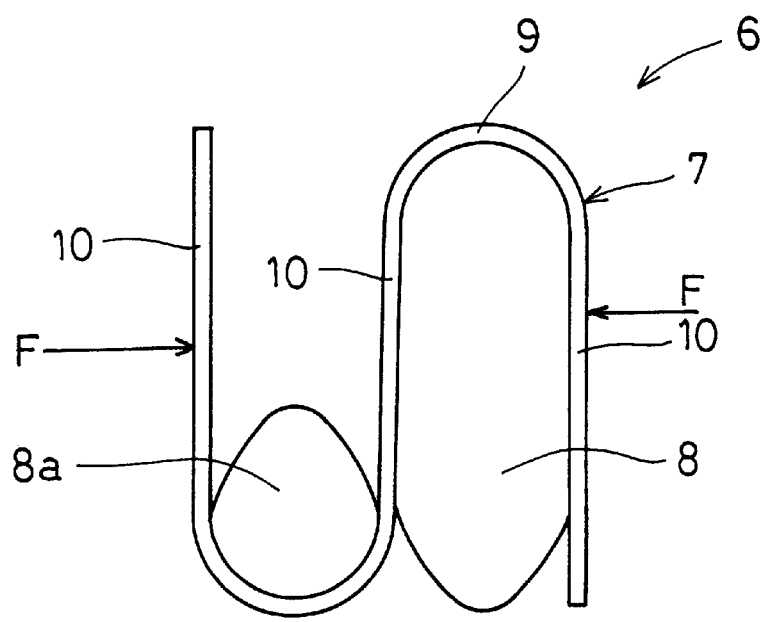
FIG. 7 is a side view of a vibration attenuating spring in accordance with a third embodiment of the present invention.

A vibration attenuating spring 6 shown in FIG. 7 has a structure similar to the vibration attenuating spring 6 shown in the second embodiment. A second elastic member 8a made of the material that is generally the same as the elastic member 8 is disposed on the bent portion 9 side in which the elastic member 8 was not disposed in the vibration attenuating spring 6 shown in the second embodiment. The length of the second elastic member 8a in the longitudinal direction of the lever portions 10 is less than half the length of the lever portions 10.

In this vibration attenuating spring 6, the rigidity of the portion where the second elastic member 8a is disposed is less than that of the lever portions 10 adjacent to the elastic member 8. Thus, the portions having different rigidities are connected in series, so that the same effect as that of the second embodiment may be obtained. In this embodiment, the two-stage compression characteristics may be obtained by using the leaf spring and the plurality of elastic members having different rigidities and the same material.

FOURTH EMBODIMENT

Figure 8:
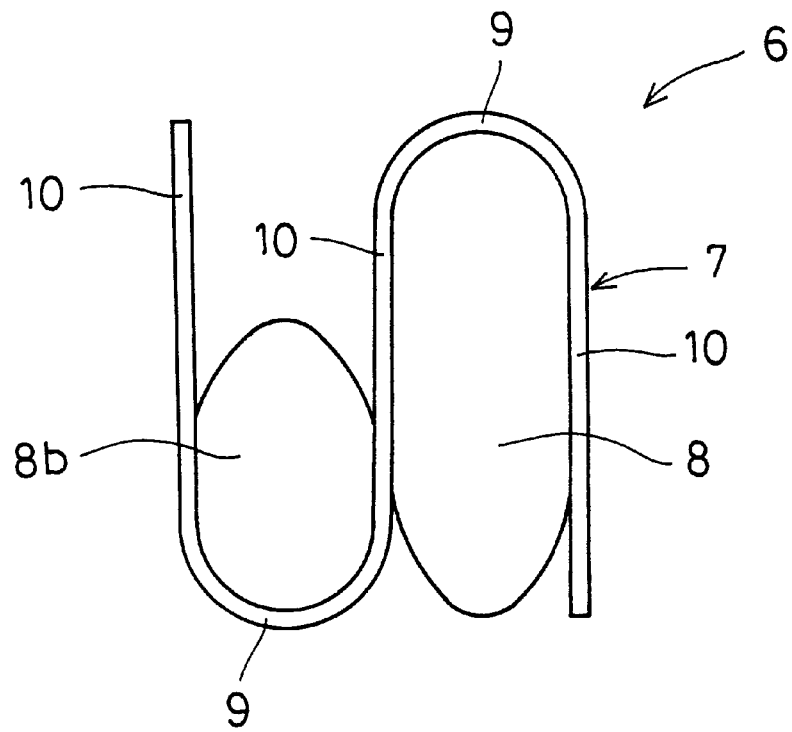
FIG. 8 is a side view of a vibration attenuating spring in accordance with a fourth embodiment of the present invention.

A vibration attenuating spring 6 is shown in FIG. 8 in accordance with a fourth embodiment of the present invention. In the fourth embodiment, the vibration attenuating spring 6 has a structure similar to that described with respect to the second embodiment. Specifically, the vibration attenuating spring 6 in the fourth embodiment includes two bent portions 9 and three lever portions 9 and one elastic member 8. However, in the fourth embodiment, the vibration attenuating spring 6 includes a third elastic member 8b made of the material that is the generally same as the elastic member 8 and is disposed in one of the bent portions 9.

The length of the third elastic member 8b in the longitudinal direction of the lever portions 10 is short and is generally equal to half the length of the lever portions 10.

In the vibration attenuating spring 6 according to the fourth embodiment, the rigidity of the portion where the third elastic member 8b is disposed is lower than that of the portion having the elastic member 8. Thus, the portions having different rigidities are connected in series, so that similar effects as that of the second embodiment may be obtained. In the fourth embodiment, the two-stage compression characteristics are obtained by using the leaf spring and the elastic members 8 and 8b having different rigidities and the same material.

FIFTH EMBODIMENT

Figure 9:
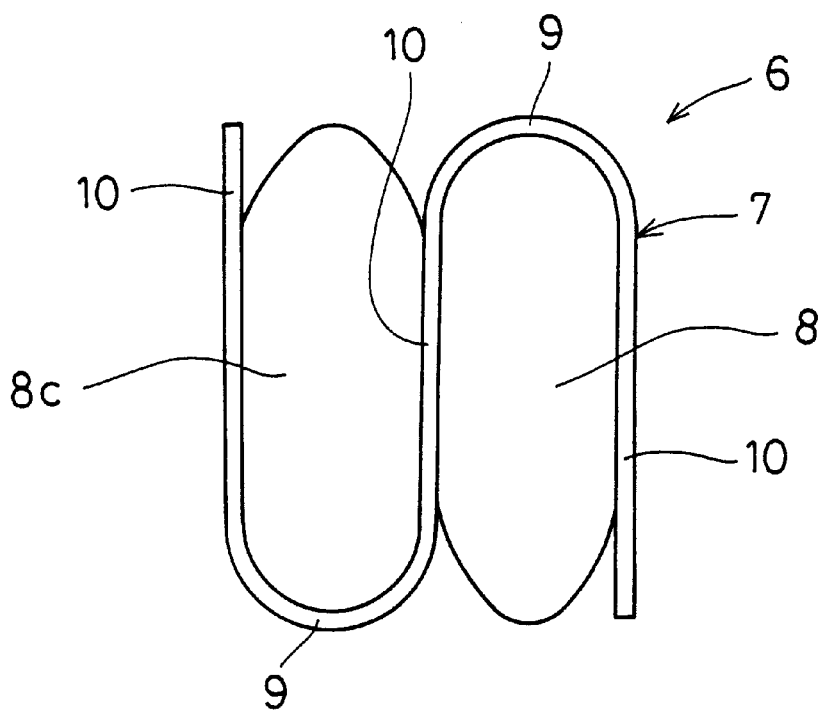
FIG. 9 is a side view of a vibration attenuating spring in accordance with a fifth embodiment of the present invention.

A vibration attenuating spring 6 shown in FIG. 9 in accordance with a fifth embodiment of the present invention. The vibration attenuating spring 6 in accordance with a fifth embodiment includes two bent portions 9 and three lever portions 9 and one elastic member 8. However, in the fifth embodiment, the vibration attenuating spring 6 includes a fourth elastic member 8c. The fourth elastic member 8c is disposed in the bent portion 9 opposite the elastic member 8. The fourth elastic member 8c has generally the same shape and size as that of the elastic member 8 but is made of material having a lower rigidity than that of the elastic member 8.

In the vibration attenuating spring 6 according to the fifth embodiment, the rigidity of the portion where the fourth elastic member 8c is disposed is lower than that of the portion with the elastic member 8. For this reason, the same effect as that of the second embodiment may be obtained.

In the fifth embodiment, the two-stage compression characteristics may be obtained by using the leaf spring and the plurality of elastic members having different rigidities.

As a matter of course, also in the third to fifth embodiments, a plurality of elastic members having different material and different shapes may be used in various combinations.

SIXTH EMBODIMENT

Figure 10:
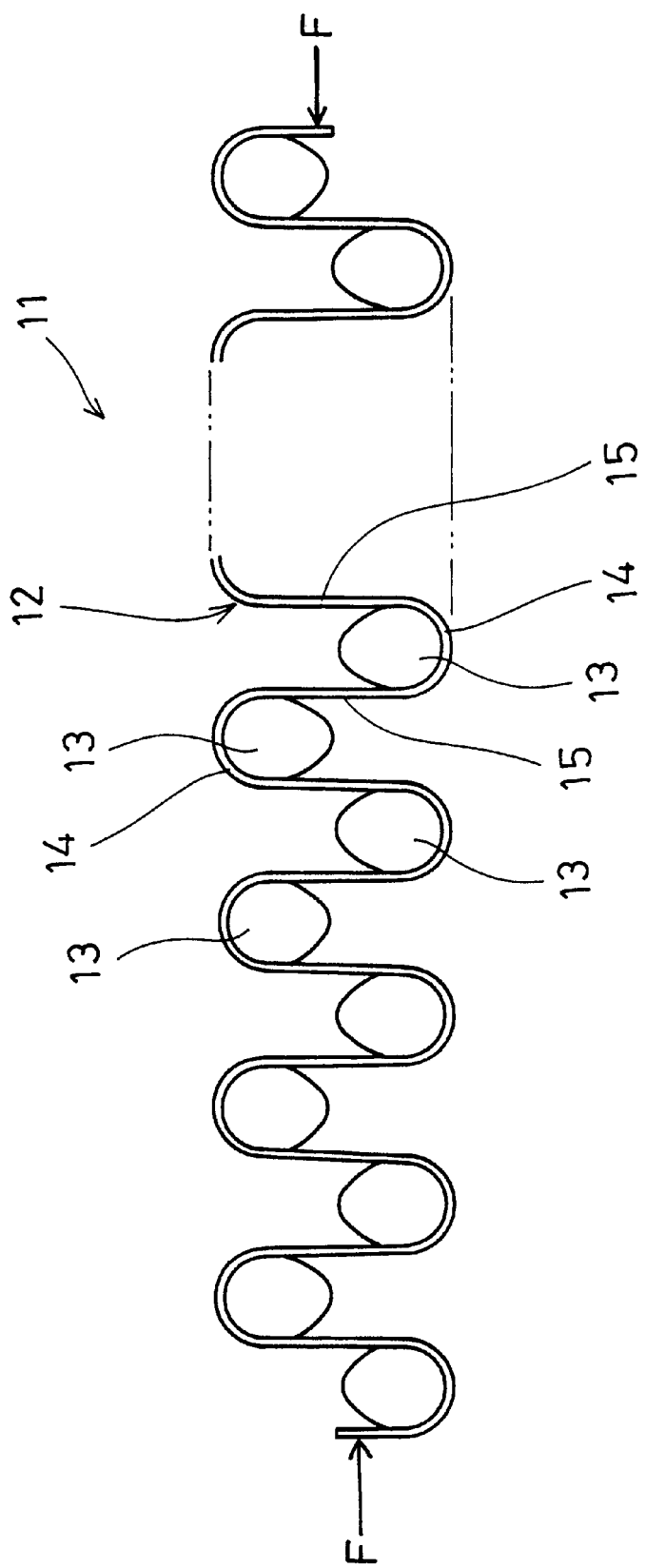
FIG. 10 is a fragmentary side view of a vibration attenuating spring in accordance with a sixth embodiment of the present invention.

A vibration attenuating spring 11 is shown in FIG. 10 in accordance with a sixth embodiment of the present invention. The vibration attenuating spring 11 is composed of a leaf spring 12 that is bent in an undulated manner and a plurality of elastic members 13 disposed within the leaf spring 12. The leaf spring 12 is alternatively bent so as to have a plurality of bent portions 14 and a plurality of lever portions 15 connected to each end of the plurality of bent portions 14. The plurality of elastic members 13 are disposed inside of the bent portions 14, respectively. The relationship between the bent portions 14 and the lever portions 15 is the generally same as that described above with respect to the first embodiment. For this reason, it is possible to consider that the vibration attenuating spring 11 is, in effect, a plurality of vibration attenuating springs in accordance with the first embodiment put end to end and connected in series.

When vibrations are transmitted to the vibration attenuating spring 11 in a direction in which the vibration attenuating spring 11 extends, the forces F associated with the vibration causes the vibration attenuating spring 11 to undergo elastic deformation. At this time, the respective lever portions take the elastic deformation to compress the elastic members 13. The operation and the characteristics of the respective bent portions 14, lever portions 15 and elastic members 13 are the same as those explained in conjunction with the first embodiment above. In this case, since the arrangement is the same as a structure in which the vibration attenuating spring elements 1 according to the first embodiment are connected in series, it is possible to obtain the characteristics of large amounts of compression and low rigidity with little, if any, oscillations.

The leaf spring 12 may be formed a single elongated member or alternatively may be formed by the connecting individual leaf spring pieces such as is described in with respect to the first embodiment. Also, the shape, size and arrangement position of the leaf spring 12 and the elastic members 13 are not limited to those of the sixth embodiment. The elastic members 13 of this embodiment take the same shape and material. However, it is possible to change the shape and material to those shown and described above with respect to the third, fourth and fifth embodiments.

SEVENTH EMBODIMENT

Figure 11:
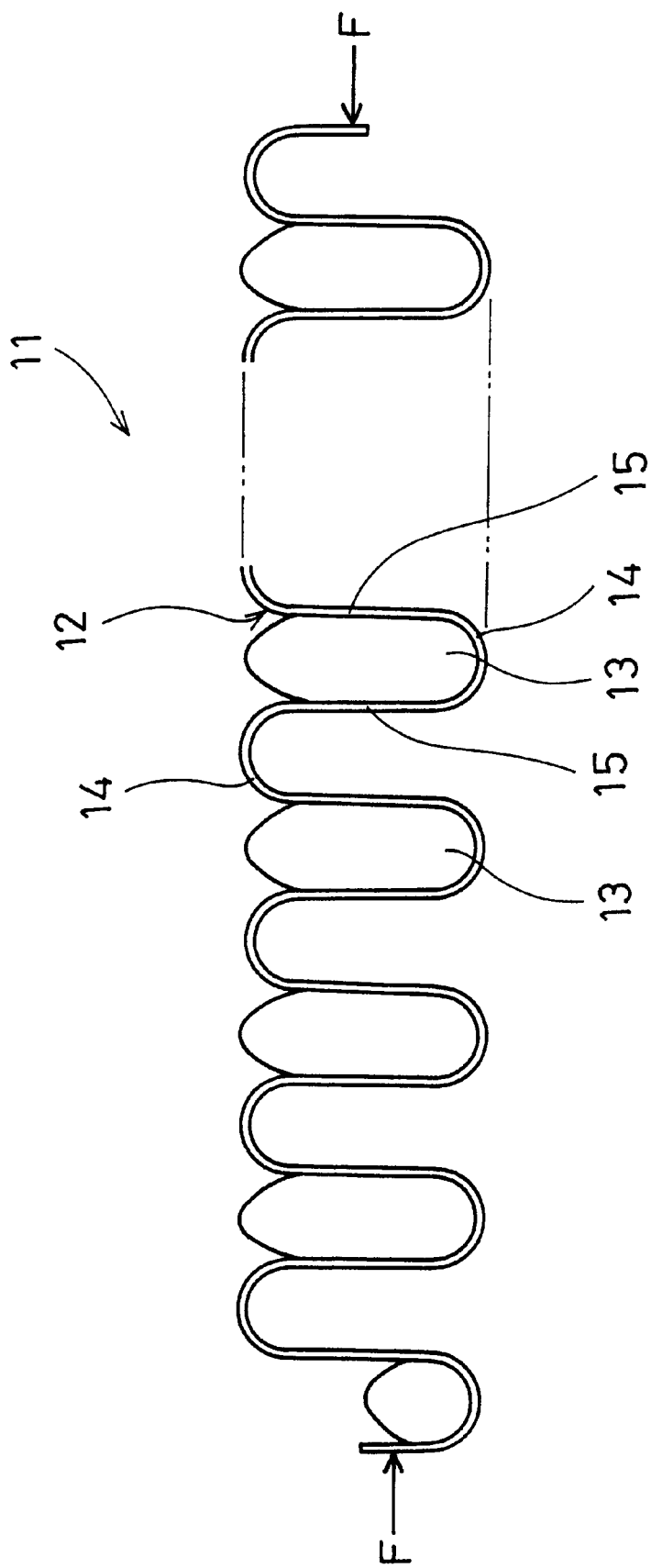
FIG. 11 is a fragmentary side view of a vibration attenuating spring in accordance with a seventh embodiment of the present invention.

A vibration attenuating spring 11 is shown in FIG. 11 in accordance with a seventh embodiment of the present invention. The vibration attenuating spring 11 is composed of a leaf spring 12 extending in an undulated manner and a plurality of elastic members 13 provided in portions of the leaf spring 12. The leaf spring 12 is generally the same as that described above in conjunction with the sixth embodiment. The plurality elastic members 13 are alternatively arranged inside of the bent portions 14 such that every other bent portion 14 includes an elastic member 13. From a functional point of view, the vibration attenuating spring 11 is composed of the plurality of vibration attenuating springs in accordance with the second embodiment that are connected in series. The elastic members 13 extend over the length from the first bent portions 14 to the other second bent portions 14 and are in full contact with the lever portions 15.

The vibration attenuating spring 11 is used for the purpose of attenuating vibrations. The vibration attenuating spring 11 is configured so that forces F may compress the vibration attenuating spring 11. When the vibrations are transmitted to the vibration attenuating spring 11, the lever portions 15 are repeatedly elastically deformed toward each other to thereby repeatedly compress the elastic member 13. As a result, the vibrations are attenuated.

When vibrations having a minute amplitude occur, the bent portions 14 where no elastic members are provided are mainly elastically deformed to thereby obtain characteristics of low rigidity. In this case, since the elastic deformation amount of the elastic member 13 is small, the internal friction is small. With such characteristics, the minute amplitude vibrations are effectively absorbed. In case of vibrations having a large amplitude, since the elastic deformation amount of the bent portions 14 where the elastic members 13 are provided is also large, the elastic deformation amount of the elastic member 13 becomes large and the characteristics of high rigidity and large internal friction may be obtained. With such characteristics, the large amplitude vibrations are effectively attenuated and oscillations are minimized if not eliminated due to the internal friction of the elastic members 13.

In this case, the configuration of the seventh embodiment is generally the same as an arrangement in which the vibration attenuating springs 6 according to the second embodiment are connected end to end in series. Therefore, it is possible to obtain the characteristics of large shift amount and low rigidity.

Furthermore, in the seventh embodiment, the elastic members are provided in parts of the plurality of bent portions 14 of the leaf spring 12, so that a small resistance is obtained by the leaf spring 12 in the range of small deformation amount, and a large resistance is obtained by the elastic members 13 in the range of large deformation amount. Namely, the leaf spring and the elastic members are applied in series to thereby obtain the two-stage compression characteristics.

The dimension, shape and material of the leaf spring 12 and the elastic members 13 are not limited to those of this embodiment.

The leaf spring 12 may be formed as a single bent elongated member or may be formed by a combination of individual leaf spring pieces.

EIGHTH EMBODIMENT

Figure 12:
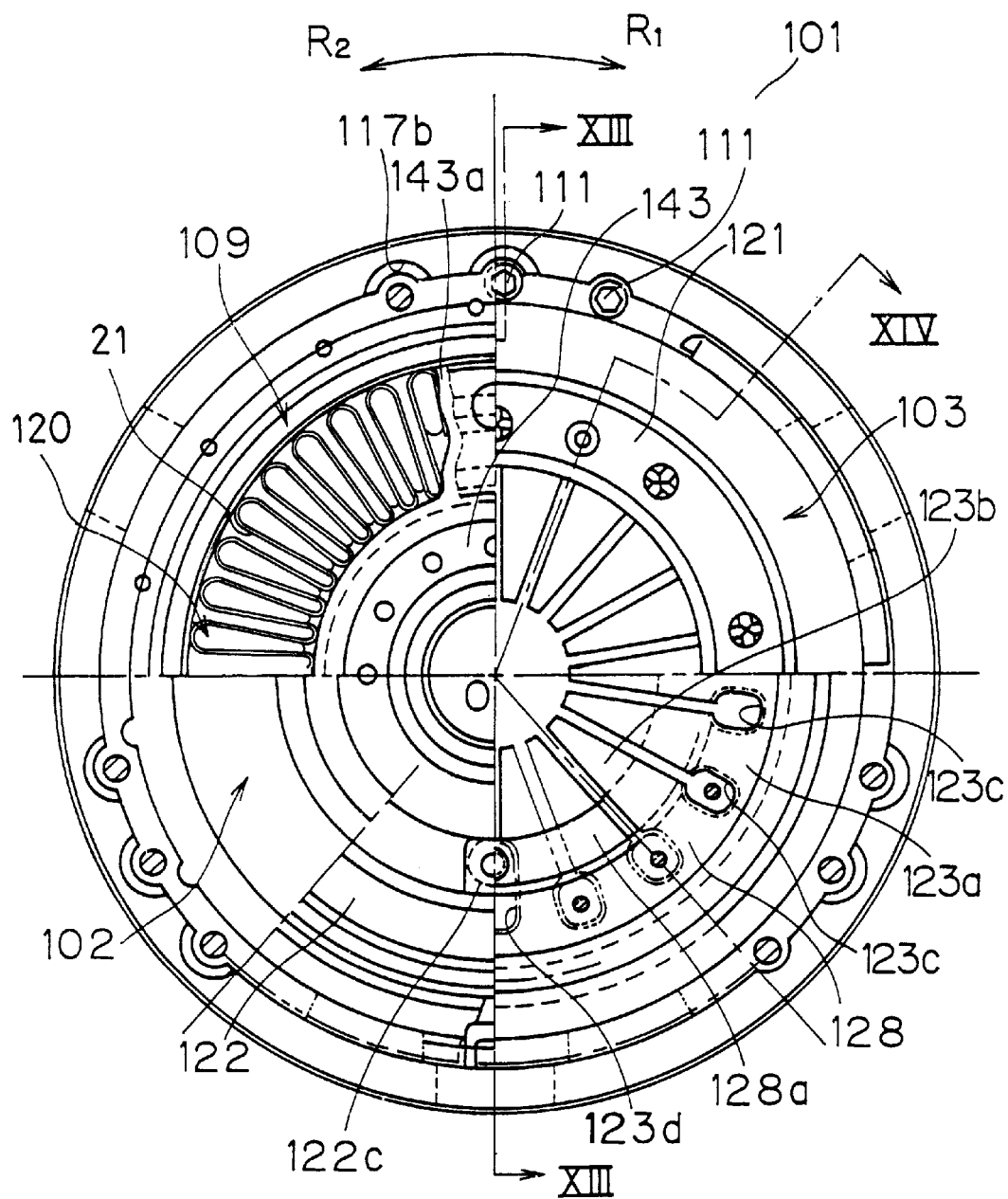
FIG. 12 is a multiple cutaway view showing details of a clutch mechanism in which a vibration attenuating spring is installed in accordance with an eighth embodiment of the present invention.
Figure 13:
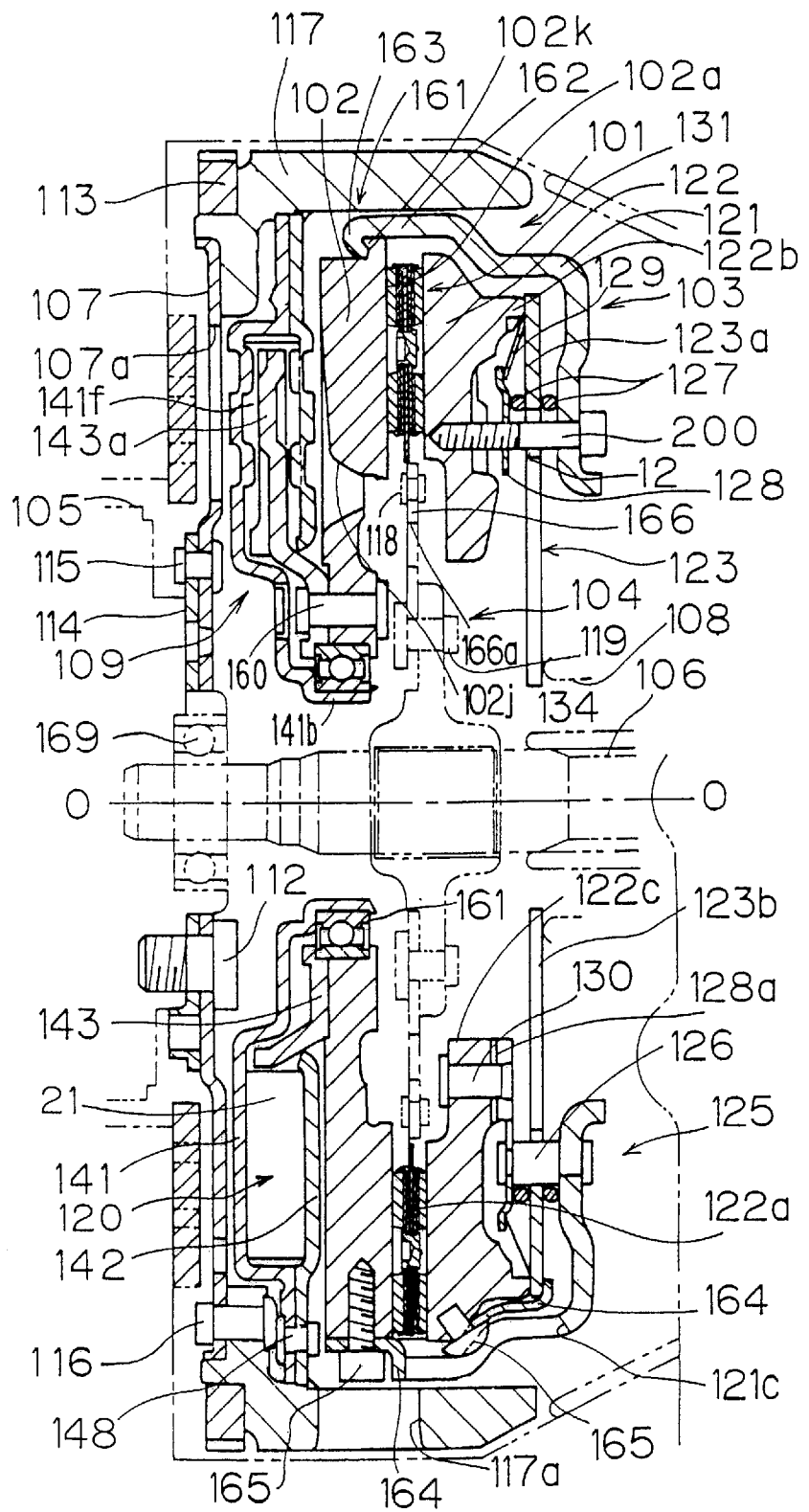
FIG. 13 is a cross-sectional view taken along the line XIII—XIII in FIG. 12.
Figure 14:
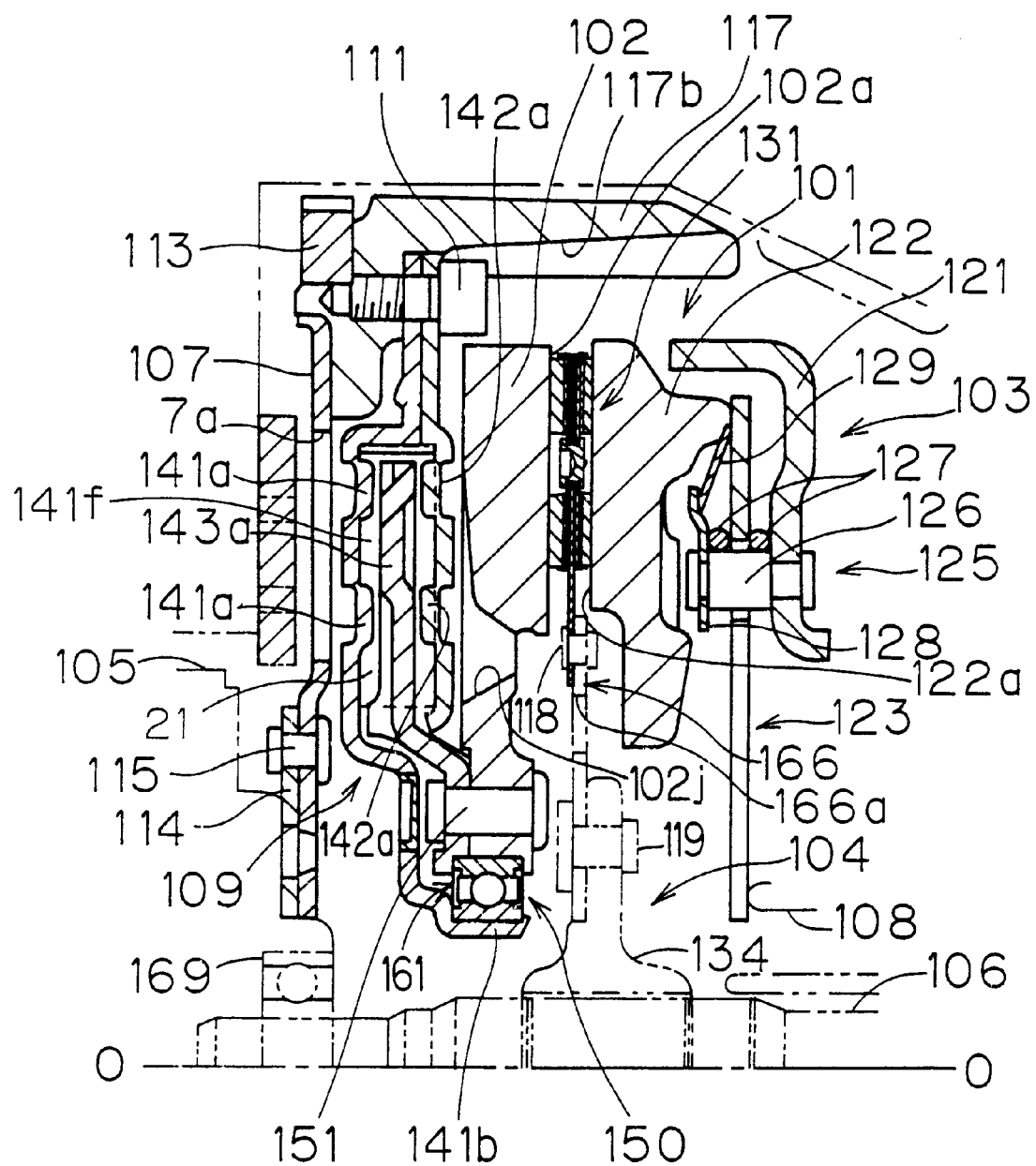
FIG. 14 is a cross-sectional view taken along the line XIV–O in FIG. 12.

In accordance with an eighth embodiment of the present invention, a modular clutch 101 shown in FIGS. 12 to 14 is mainly composed of a second flywheel 102, a clutch cover assembly 103, a clutch disc assembly 104, and a damper mechanism 109. An engine (not shown) is disposed on the left side of FIGS. 13 and 14, and the transmission (not shown) is disposed on the right side of FIGS. 13 and 14. Herein after, for purposes of directional reference, the left side of FIGS. 13 and 14 will be referred to as the engine side and the right side of FIGS. 13 and 14 will be referred to as the transmission side.

The modular clutch 101 is a device for selectively transmitting torque from a crankshaft 105 of the engine to a main drive shaft 106 extending from the transmission side. In FIGS. 13 and 14, the line O—O denotes the rotational axis of the modular clutch 101.

A flexible plate 107 and an inertia member 117 (first flywheel) are connected to an end of the crankshaft 105. The flexible plate 107 is a disc-like plate member, and a disc-like plate member 114 is fixed to the inner circumferential portion of the flexible plate 107 by rivets 115. The inner circumferential portion of the flexible plate 107 is fixed to the crankshaft 105 on the engine side together with a plate member 114 by bolts 112. A plurality of round holes 107a are formed at equal intervals in the circumferential direction in an intermediate portion, in the radial direction, of the flexible plate 107. The flexible plate 107 has a high rigidity in the circumferential direction but may be deformed elastically in the bending direction about the end of the crankshaft to absorb flexural vibrations.

The inertia member 117 is fixed to the outer circumferential periphery of the flexible plate 107 by rivets 116. The inertia member 117 is a sleeve-like member fully extending in the axial direction. Also, a ring gear 113 is fixed to the inertia member 117. Three operating holes 117a are formed at equal intervals in the circumferential direction for communicating an inner circumferential side and an outer circumferential side of the inertia member 117.

Thus, the flexible plate 107 and the inertia member 117 are provided on the crankshaft 105 side in advance, and the module clutch 101 is mounted relative to these components.

The structure of each portion of the modular clutch 101 will now be described.

The damper mechanism 109 is mainly composed of a first input plate 141, a second input plate 142, a vibration attenuating spring 21 and a driven member 143. The first input plate 141 is a disc-like plate member disposed on a side of the flexible plate 107. The outer circumferential portion of the first input plate 141 is in contact with the inner circumferential surface of the inertia member 117. Also, an intermediate portion, in the radial direction, of the first input plate 141 includes a projection that extends toward the engine side defining an arcuate spaces 120 together with the second input plate 142. The second input plate 142 is a disc-like plate member disposed beside of the first input plate 141. An outer peripheral portion of the second input plate 142 is in contact with the inner circumferential surface of the inertia member 117. Also, the outer circumferential portion of the second input plate 142 and the outer circumferential portion of the first input plate 141 are in contact with each other and are fixed to each other by rivets 148. The inner circumferential portion of the first input plate 141 extends inwardly beyond the inner circumference of the second input plate 142. The inner circumferential portion of the first input plate 141 is formed on the transmission side into an inner circumferential projection 141b projecting in the form of a sleeve.

Moreover, the outer circumferential portions of the first and second input plates 141 and 142 are fixed to the inertia member 117 by three bolts 111 at three positions at equal intervals in the circumferential direction. The bolts 111 are accessed from the transmission side. Grooves 117b are formed in the inertia member 117 at positions corresponding to the respective bolts 111.

Arcuate spaces 120 formed by the first input plate 141 and the second input plate 142 serve as spring receiving chambers. The pair of vibration attenuating springs 21 are disposed in the arcuate spaces 120.

Figure 15:
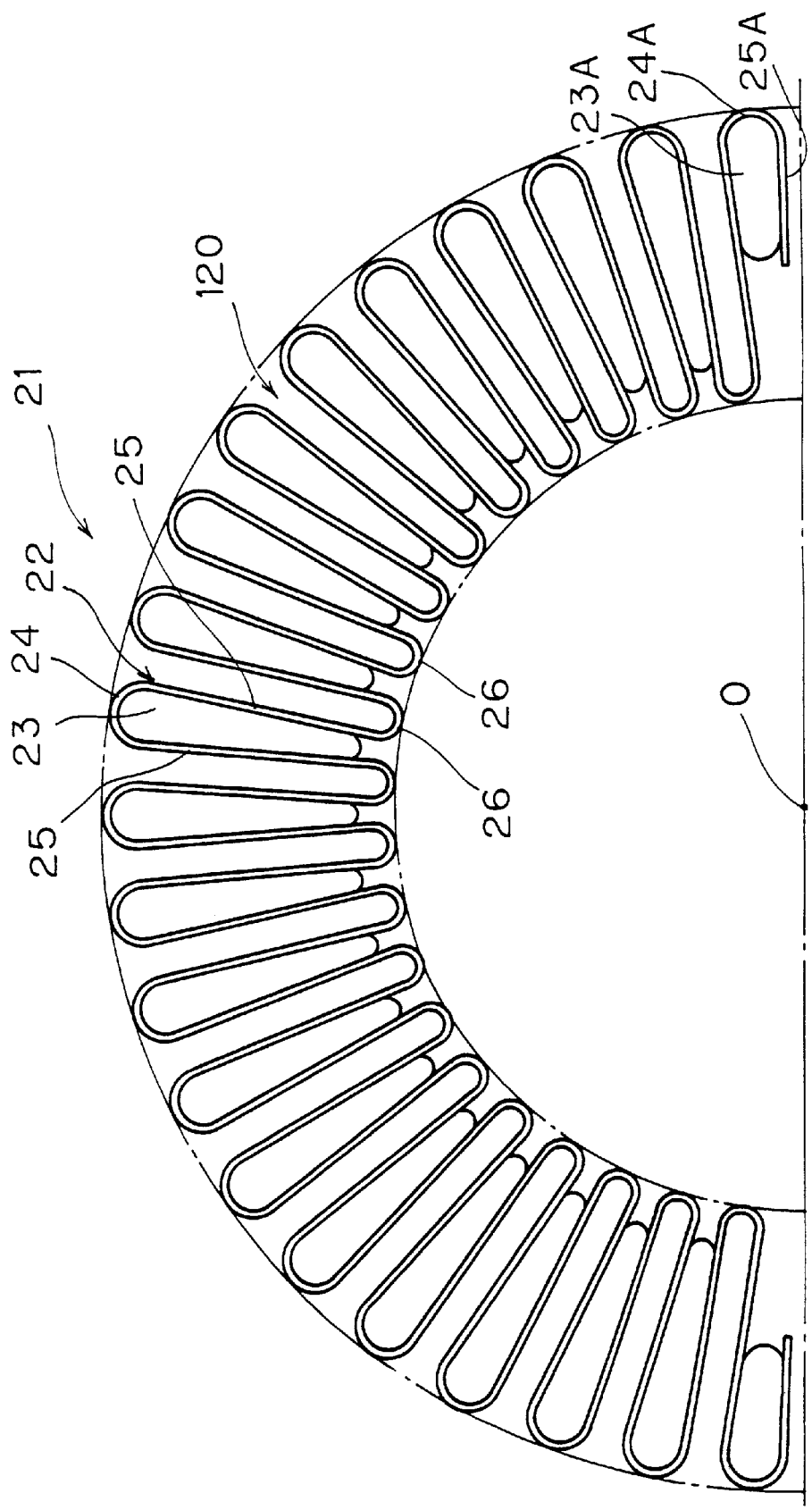
FIG. 15 is a fragmentary view showing the vibration attenuating spring removed from the clutch mechanism depicted in FIG. 12.

The vibration attenuating springs 21 interposed in the arcuate spaces 120 will now be explained. The vibration attenuating springs 21 are a damper for attenuating the vibrations caused by the torque variation of the engine as well as performing the torque transmission in the damper mechanism 109. As shown in FIG. 15, the vibration attenuating springs 21 are disposed within the spring receiving chamber 120 in such a state that the vibration attenuating springs similar to that described above with respect to the seventh embodiment.

Figure 16:
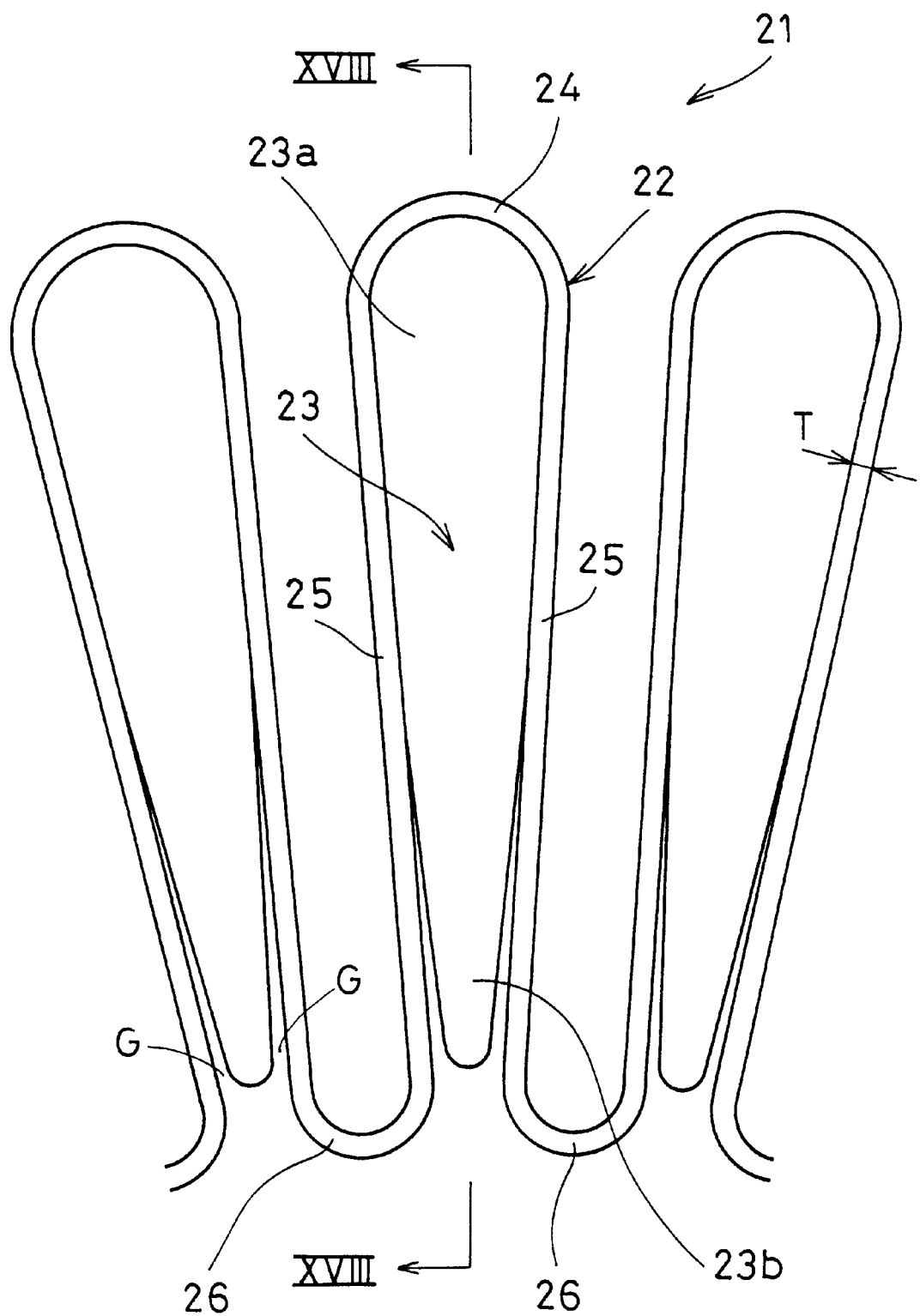
FIG. 16 is a fragmentary, view of a portion of the vibration attenuating spring depicted in FIG. 15, shown on an enlarged scale.
Figure 17:
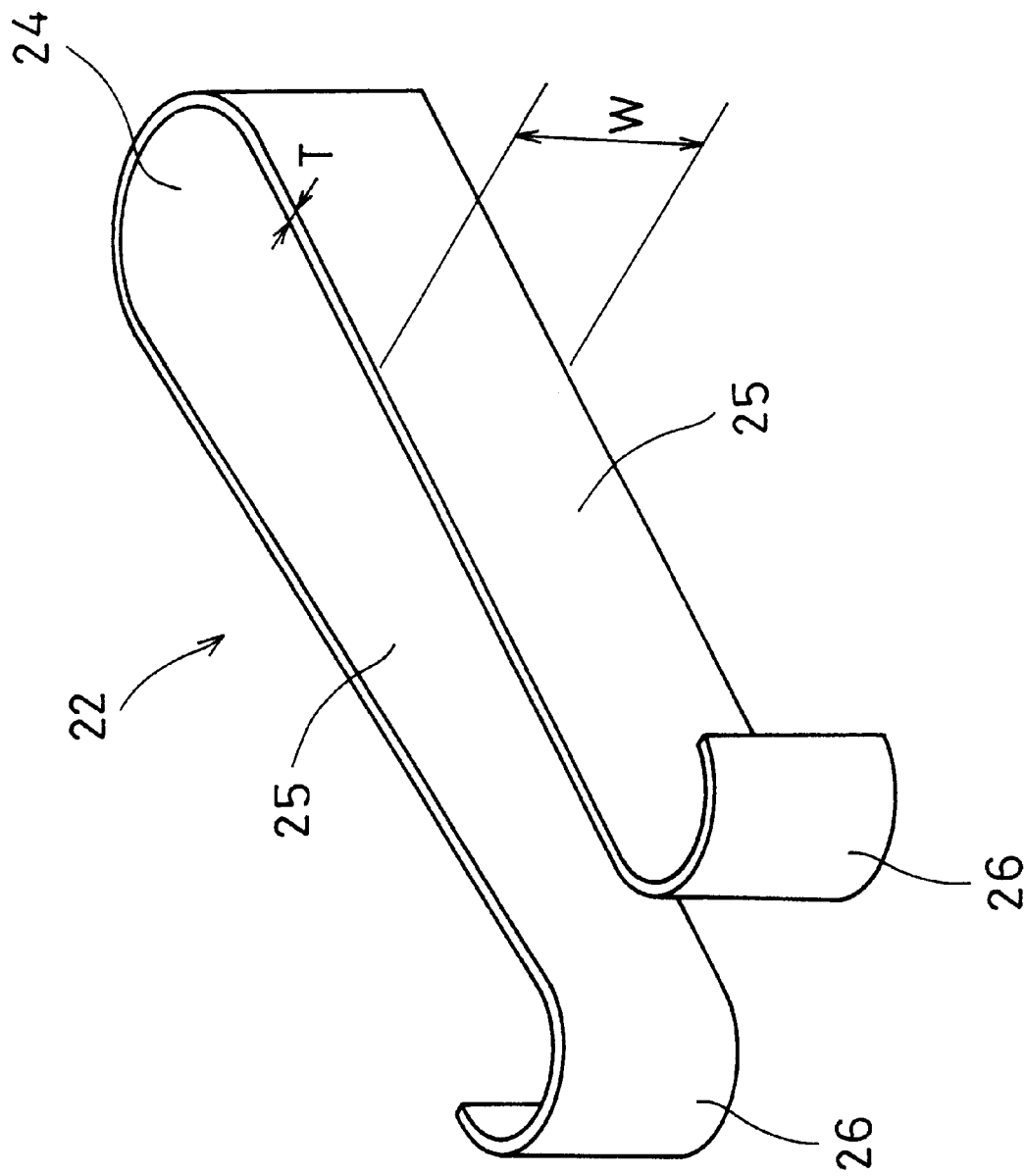
FIG. 17 is a fragmentary perspective view showing details of the vibration attenuating spring depicted in FIGS. 16 and 17.

Each of the vibration attenuating springs 21 is composed of a leaf spring 22 extending in the circumferential direction and a plurality of elastic members 23 provided in portions of the leaf spring 22. The leaf spring 22 is made of metal, more specifically, spring steel. The leaf spring 22 extends through about 180° in the circumferential direction. The leaf spring 22 is alternatively bent so that, as shown in FIGS. 15 to 17, it is composed of a plurality of bent portions 24 formed on a radially outward portion of the leaf spring 22, a plurality of bent portions 26 formed on a radially inward portion of the leaf spring 22 and a plurality of lever portions 25 extending between the bent portions 24 and 26. The leaf spring 22 has a constant width W and a thickness T over the full length A diameter of the radially outward bent portions 24 is greater than that of the radially inward bent portions 26. Also, pairs of lever portions 25 extend from the corresponding bent portion 24 or 26 and extend linearly toward the opposing bent portion 24 or 26. Pair of lever portions 25 extending from the bent portions 24 converge toward each other as they approach the corresponding bent portions 24. In other words, the arcuate length of each bent portion 24 is slightly greater than 180° and the arcuate length of each bent portion 26 is slightly less than 180°.

Figure 18:
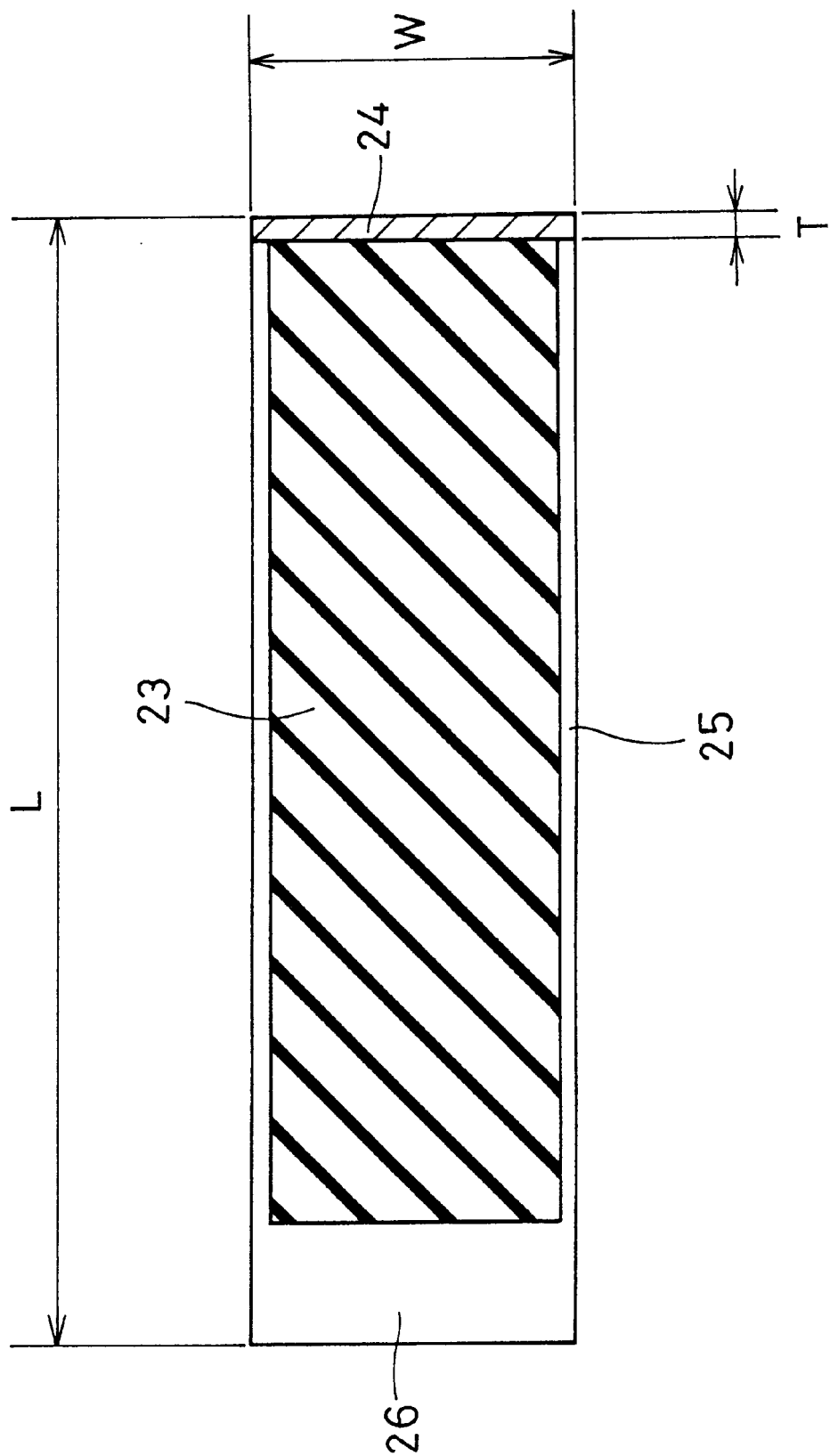
FIG. 18 is a cross-sectional view of the vibration attenuating spring taken along the line XVIII—XVIII of FIG. 16.

The plurality of elastic members 23 are disposed inside of the radially outward bent portions 24, i.e., between the pair of the associated lever portions 25 extending from both ends of the radially outward bent portions 24. The elastic members 23 are made of, for example, rubber, and are molded to the inner surfaces, on the bent portions 24, of the leaf spring 22. The elastic members 23 extend radially inwardly approximately the full length along the lever portions 25. As shown in FIG. 16, a radially outward contact portion 23a of each of the elastic members 23 contacts the inner surface of the bent portion 24 and extending radially inward from each of the contact portions 23a is a projecting portion 23b. The contact portion 23a is molded or adhered to the inner surface of the bent portion 24 and to approximately half the length of the lever portions 25. A gap G is defined between each of the pair of lever portions 25 and each side of a corresponding projecting portion 23b. The width of the gap G decreases going from the bent portions 26 to a point about midway between the bent portions 26 and the bent portions 24. As shown in FIG. 18, a width, of the elastic member 23 is less than the width w of the leaf spring 22. The length, in the radial direction, of the lever portions 25 of the leaf spring 22 is designated by L.

Referring to FIG. 15, at each of the two opposite ends of each vibration attenuating spring 21, a lever portion 25A extends from the radially outward bent portion 24A to an intermediate portion, in the radial direction, of the other lever portion 25, and the elastic member 23A having substantially the same length as that of the shorter lever portion 25A is disposed in the radially outwardly bent portion 24A. Alternatively, the lever portions at the circumferential ends of the spring 22 direction may extend the same length as the lever portions 25 and dimension of the elastic members at the circumferential ends of the spring 22 may be the same as other the elastic members 23.

The driven member 143 is a disc-like member having a pair of engagement portions 143a extending radially outwardly and integrally from the disc-like portion. The two engagement portions 143a extend in the arcuate spaces 120 at two opposite ends of each spring 22. The engagement portions 143a are in contact with both ends, in the circumferential direction, of the pair of vibration attenuating springs 21. Also, the first and second input plates 141 and 142 have support portions 141a and 142a projecting at two radially opposite positions in the axial direction and come into contact with both ends, in the circumferential direction, of the vibration attenuating springs 21.

The second flywheel 102 has a flat frictional surface 102a on the transmission side at its outer circumferential portion. Also, communication holes 102j are formed in the second flywheel 102 for communicating both surfaces on the inner circumferential side of the frictional surface 102a. The driven member 143 is fixed to the inner circumferential edge of the flywheel 102 by rivets 160. The inner circumferential portions of the second flywheel 102 and the driven member 143 are supported on the inner circumferential projections 141b of the first input plate 141 through bearings 161. Three engagement portions 102k are formed at three positions at equal intervals in the circumferential direction on the outer circumferential surface of the flywheel 102. The engagement portions 102k project radially outwardly. Also, the end portion, on the engine side, of each of the engagement portions 102k is slanted to be deepened radially inwardly.

The clutch cover assembly 103 is mainly composed of a clutch cover 121, a pressure plate 122, a diaphragm spring 123, a coupling plate 128, stud pins 126, two wire rings 127 and a conical spring 129.

The clutch cover 121 is a dish-like plate having a large hole in the middle and has three extension portions 162 extending toward the flywheel 102 at three positions at equal intervals in the circumferential direction on its outer circumferential portion and having a predetermined width. An inwardly bent portion 163 is formed at an end of each extension portion 162. The bent portion 163 is engaged with the associated engagement portion 102k of the second flywheel 102. Thus, the clutch cover 121 is not movable toward the transmission side relative to the flywheel 102. Also, a cutaway extending in the circumferential direction is formed at the end of the extension portion 162, and a plate 164, similarly extending in the circumferential direction, is engaged with this cutaway. The plate 164 is fixed to the outer circumferential surface 102b of the second flywheel 102 by a bolt 165. Thus, the clutch cover 121 is not rotatable relative to the flywheel 102. Also, the bolt seat for the flywheel 102 is dispensed with so that the flywheel 102 is smaller in the radial direction.

The pressure plate 122 is an annular member disposed within the clutch cover 121. A pressure surface 122a confronting the frictional surface 102a of the flywheel 102 is formed in the pressure plate 122. Also, an annular projection portion 122b projecting toward the transmission side is formed in the surface, opposite the pressure surface 122a, of the pressure plate 122. Furthermore, the flange portions 122c extending radially inwardly are formed in the pressure plate 122.

The diaphragm spring 123 is a disc-like member which is disposed between a portion of the clutch cover 121 and the pressure plate 122. The diaphragm spring 123 is formed of an annular elastic portion 123a and a plurality of lever portions 123b extending radially inwardly from the annular portion 123a. First holes 123c are formed on the outer circumferential side between the plurality of lever portions 123b. Also, three second holes 123d are formed at three positions at equal intervals in the circumferential direction in the respective slits. The second holes 123d extend radially inwardly more than the first holes 123c and extend in the vicinity of the flange portion 122c of the pressure plate 122. The annular elastic portion 123a is supported at both sides at its inner circumferential edge by the wire rings 127 to be described later and is brought at its outer circumferential portion into contact with the annular projection portions 122b of the pressure plate 122. Under this condition, the elastic portion 123a biases the pressure plate 122 toward the flywheel 102.

A support structure 125 for supporting the diaphragm spring 123 will be described. A plurality of stud pins 126 fixed to the inner circumferential edge of the bottom portion of the clutch cover 121 extend toward the pressure plate 122 through the first holes 123c of the diaphragm spring 123. A coupling plate 128 (described later) is fixed to the other end of each stud pin 126. The wire rings 127 are disposed between the coupling plate 128 (described later) and the diaphragm spring 123 and the bottom portion of the clutch cover 121 and the diaphragm spring 123 in the outer circumferential side of each stud pin 126, respectively. Namely, the inner circumferential portion of the elastic portion 123a of the diaphragm spring 123 is clamped between the pair of wire rings 127.

The coupling plate 128 is an annular plate member. Three joint portions 128a extending in the circumferential direction R1 (FIG. 12) in the form of arcuate shapes are formed integrally with the inner circumferential portion of the coupling plate 128. An end of each joint portion 128a is fixed to a flange portion 122c of the pressure plate 122 by a rivet 122c. The position of the rivet 122c corresponds to the second hole 123d of the diaphragm spring 123. The joint portion 128a has a high rigidity in the circumferential direction but is flexible in the axial direction. The joint portion 128a biases the pressure plate 122 in a direction away from the second flywheel 102.

The conical spring 129 is disposed at the circumferential portion of the coupling plate 128. The inner circumferential edge of the conical spring 129 is supported to the coupling plate 128. The outer circumferential edge of the conical spring 129 biases the outer circumferential edge of the diaphragm spring 123, i.e., the portion, close to the annular projection portion 122b of the pressure plate 122, of the diaphragm spring 123 in a direction away from the pressure plate 122.

As described above, the coupling plate 128 connects the clutch cover 121 and the pressure plate 122 to each other and supports the conical spring 129. As described above, a plurality of functions are imparted to the coupling plate 128 to thereby reduce the number of the mechanical parts.

A plurality of retainer members 164 are fixed to the pressure plate 122 by fastening pins 165. Their one ends clamp the outer circumferential edge of the diaphragm spring 123 in corporation with the annular projection portions 122b of the pressure plate 122. Incidentally, holes 121c are formed at positions of extension portions 162 corresponding to the retainer members 164.

The clutch disc assembly 104 is mainly composed of the above-described clutch coupling portion 131, hub 134, and plate 166. The clutch coupling portion 131 is interposed between the frictional surface 102a of the flywheel 102 and the pressure surface 122a of the pressure plate 122. The hub 134 is spline engaged with the main drive shaft 106 which extends from the transmission (not shown). The inner circumferential portion of the plate 166 is fixed to the flange of the hub 134 by rivets 119. The outer circumferential portion of the plate 166 is fixed to the clutch coupling portion 131 by rivets 118. A plurality of holes 166a are formed at equal intervals in the circumferential direction in the plate 166.

The main drive shaft 106 extending from the transmission side is supported at its end to the crankshaft 105 through a bearing 169. The release device 108 is disposed around the main drive shaft 106 to be movable in the axial direction. The release device 108 is engaged at one end with the side surface, on the transmission side, of ends of the lever portions 123b of the diaphragm spring 123. When the release device 108 is moved on the engine side to thereby move the lever portions 123b on the engine side, the biasing force from the elastic portions 123a to the pressure plate 122 is released.

Incidentally, a bolt 200 is shown in FIG. 13 but this bolt is not used when the modular clutch 101 is used. The bolt 200 is used for the purpose of assembling or disassembling the clutch cover assembly 103 relative to the flywheel 102. A plurality of bolts 200 are threadedly engaged with the pressure plate 122 while passing through holes formed in the inner circumferential side of the bottom portion of the clutch cover 121, further passing through the first holes 123c of the diaphragm spring 123, and further passing through the coupling plate 128.

OPERATION

The operation of the modular clutch 101 will now be described.

When the crankshaft 105 on the engine side is rotated, a torque is transmitted through the flexible plate 107 to the modular clutch 101. Then, the torque is transmitted through the damper mechanism 109 to the flywheel 102 and is outputted to the clutch disc assembly 104. The pressure plate 122 is rotated together with the clutch cover 121 through the coupling plate 128. Since the rotational drive of the pressure plate 122 is attained by the coupling plate 128 for connecting the inner circumferential portion of the pressure plate 122 and the inner circumferential portion of the clutch cover 121, it is unnecessary to form a cutaway portion for receiving the strap plate at the outer circumferential portion of the clutch cover 121 like the conventional structure.

Since the inertia member 117 is fixed to the first and second input plates 141 and 142, it is possible to sufficiently keep the inertia moment of the input system in the input/output system of the power that is separated into the input system and the output system through the vibration attenuating spring 21. As a result, it is possible to set the resonance frequency not more than the practical RPM region. Since the inertia member 117 is disposed on the outer circumferential portion, it is possible to minimize the thickness in the axial direction the first and second input plates 141 and 142 which constitute the arcuate spaces 120. As a result, it is possible to miniaturize the modular clutch 101 as a whole in the axial direction. Furthermore, since the inertia portion 117 extends long in the axial direction, the size of the overall structure is not enlarged in the radial direction. The reason why the overall structure is not enlarged in the radial direction even if the inertia member 117 is thus provided on the outer circumferential portion of the damper mechanism 109 is that the clutch mounting seat is dispensed with from the second flywheel 102 and the inertia member 117 may be disposed more radially inwardly.

In the case where the vibration is transmitted from the crankshaft 105, it is possible to absorb the vibration by the flexing of the flexible plate 107 about the crankshaft.

When the twist vibrations are transmitted from the engine side, in the damper mechanism 109, the first and second input plates 141 and 142 and the driven member 143 are cyclically relatively rotated. At this time, the vibration attenuating spring 21 is compressed in the circumferential direction. In this case, since the attenuating springs 21 may be regarded as the spring elements consisting of bent portions 24 and elastic members 23 arranged in series in the circumferential direction, it is possible to obtain the characteristics of low rigidity in the wide twist angle.

Figure 19:
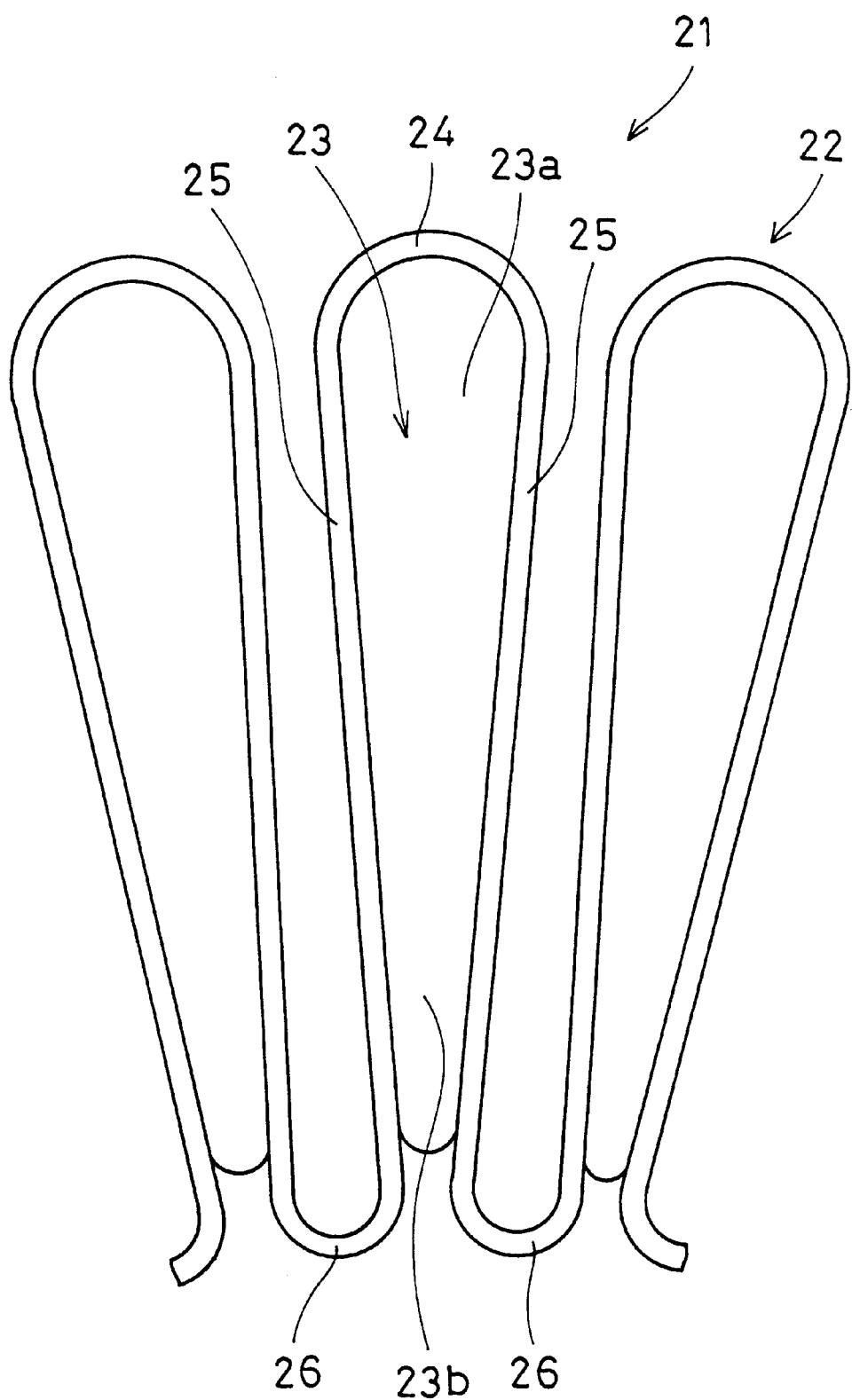
FIG. 19 is a view similar to FIG. 16, showing one operational condition of the vibration attenuating spring depicted in FIGS. 12–18.

The operation of each vibration attenuating spring 21 upon the twist vibration transmission will now be described. When the minute twist vibrations caused by the torque variation of the engine are transmitted, the vibration attenuating spring 21 is changed alternatively between the conditions shown in FIGS. 16 and 19. When the vibration attenuating spring 21 is moved from the condition shown in FIG. 16 to the condition shown in FIG. 19, the radially inward bent portions 26 are mainly elastically deformed to thereby obtain the low rigidity. In FIG. 19, the portions on the radially inward bent portions 26 of the lever portions 25 are brought into contact with the projection portions 23b but the elastic members 23 are not firmly clamped by the lever portions 25 as a whole. For this reason, a large internal friction is not generated in the elastic members 23. Thus, the minute twist vibrations are hardly transmitted on the flywheel 102 side due to the low rigidity/small resistance characteristics.

Figure 20:
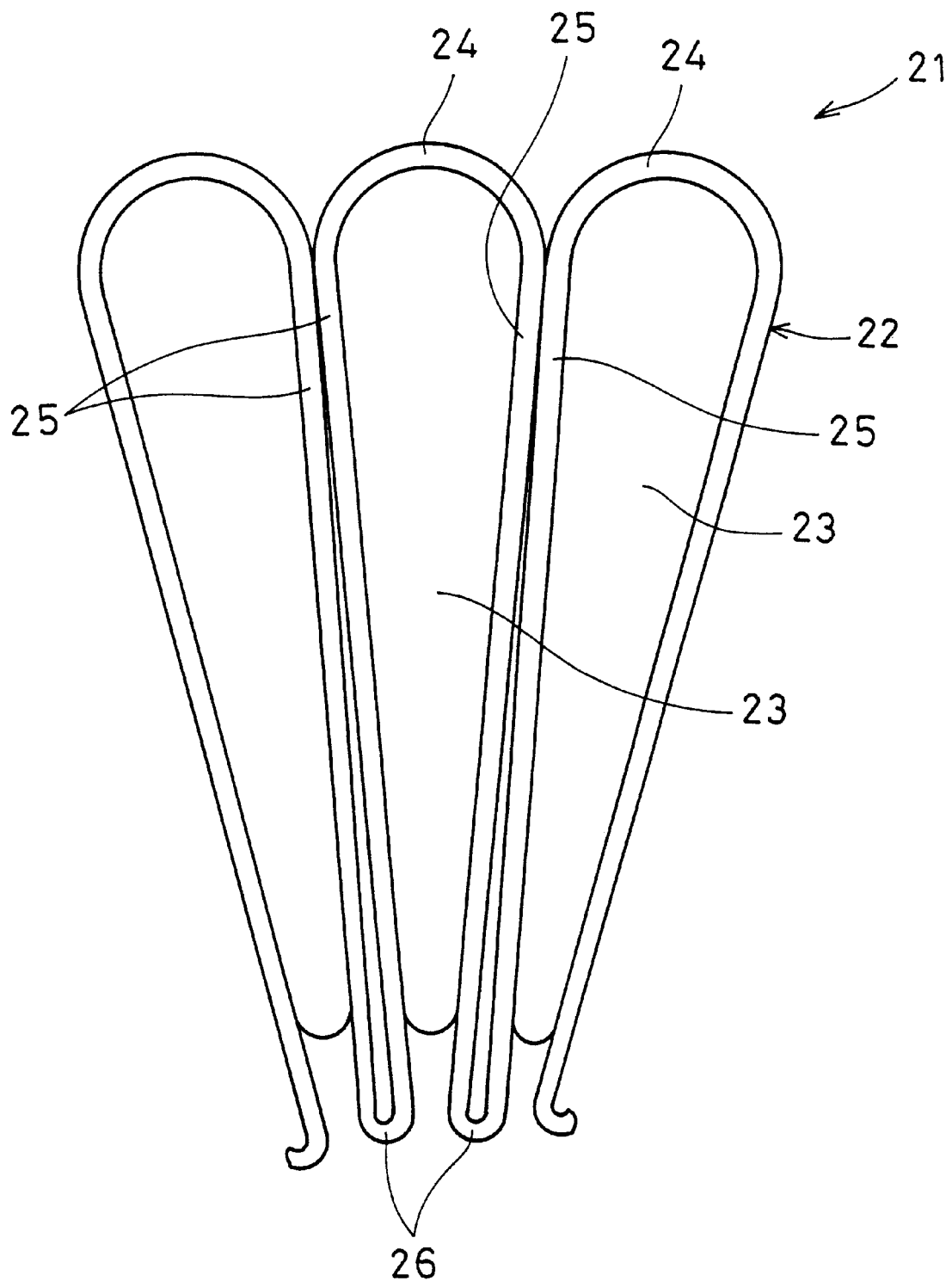
FIG. 20 is a view similar to FIG. 16 showing another operational condition of the vibration attenuating spring depicted in FIGS. 12–18.

When an excessive torque variation is generated in the damper mechanism 109 upon passing through the resonant point in the low RPM region, the phase angle of the vibration attenuating spring 21 is increased. In accordance with this, the rigidity of the lever portions 25 is increased and at the same time the amount of elastic deformation of the elastic members 23 is increased to thereby generate the large internal friction. By the large friction generated at this time, an excessive torque variation is attenuated. More specifically, the vibration attenuating spring 21 is moved from the condition shown in FIG. 16 through the condition shown in FIG. 19 to the condition shown in FIG. 20. As it is changed from the condition shown in FIG. 19 to the condition shown in FIG. 20, the deformation of the radially inward bent portions 26 is considerable so that the elastic members 23 are firmly clamped by the lever portions 25 on both sides to be elastically deformed. At this time, the large internal friction is generated in the elastic members 23. The excessive vibrations are attenuated by the characteristics of high rigidity and large internal friction. In the condition where the phase angle is kept at maximum as shown in FIG. 20, the bent portions 24 of the leaf spring 22 are brought into contact with each other in the circumferential direction. In this condition, the elastic members 23 are brought into contact with each other through the lever portions 25 in the circumferential direction in series to thereby prevent the bent leaf spring 21 from elastically bending exceeding a predetermined angle. Namely, the elastic members 23 function as stops for the damper mechanism 109.

When the driver steps the clutch pedal in, one end of the release device 108 causes the lever portions 123b of the diaphragm spring 123 to move toward the engine. As a result, the outer circumferential portion of the elastic portion 123a is separated away from the annular projection portions 122b of the pressure plate 122. Then, the biasing force of the joint portions 128a of the coupling plate 128 causes the pressure plate 122 to be separated away from the clutch coupling portion 131 of the clutch disc assembly 104. As a result, the torque transmission from the second flywheel 102 to the clutch disc assembly 104 is interrupted. In the above-described release operation, since the conical spring 129 imparts the load to the diaphragm spring 123 on the transmission side, the release load is decreased and becomes flat to thereby reduce the step force to the pedal.

ADVANTAGEOUS EFFECTS

Since the vibration attenuating spring 21 provides the functions of both the elastic members and the friction generating mechanism of the prior art by the combination of the leaf spring 22 and the elastic members 23, the structure is compact and a reliable function is ensured for dampening vibrations and reducing if not eliminating oscillations within the dampening mechanism. As a result, it is possible to reduce the dimension of the damper mechanism 109. Also, since the leaf spring 22 takes its shape by bending of an elongated plate member, it is possible to shorten the width W dimension of the vibration attenuating spring 21 in comparison with the conventional coil spring damper mechanisms. As a result, it is possible to shorten the axial dimension of the damper mechanism and the modular clutch 101 as a whole.

Furthermore, in this embodiment, by providing the bent portions where the elastic members are disposed and the bent portions where the elastic members are not disposed, the portions having a high rigidity and the portions having a low rigidity are applied in series. More specifically, the radially outward bent portions 24 become the high rigidity portions and the radially inward bent portions 26 become the low rigidity portions. As a result, in the damper mechanism 109, a small resistance is obtained by the radially inward bent portions 26 in the range in which the twist angle is small, and a large resistance is obtained by the elastic members 23 of the radially outward bent portions 24 in the range in which the twist angle is large.

Since the vibration attenuating spring 21 attains the vibratory attenuation characteristics in the same manner in the prior art only by the combination of the leaf spring 22 and the plurality of elastic members 23, it is unnecessary to provide a separate mechanism and structure which creates viscous resistances. As a result, it is possible to eliminate the seal mechanism for the arcuate spaces 120, and the damper mechanism 109 is greatly simplified.

MODIFICATION

Alternatively, the vibration attenuating spring 21 may be preformed extending in an arcuate shape in a compression free condition (prior to installation into the modular clutch 101).

In any of the previously described embodiment, and subsequently described embodiments (below), the rigidity of the elastic members is obtained by making the elastic members from same material. However, in embodiments where a plurality of elastic members are employed within portions of an elongated vibration attenuating spring, it is possible to use elastic members made of differing materials and having different compression characteristics in order to provide the present invention with a greater degree of variation in compression responses. For instance, perhaps every alternate elastic member in a vibration attenuating spring could be made of a softer or harder material that the remaining elastic members.

NINTH EMBODIMENT

Figure 21:
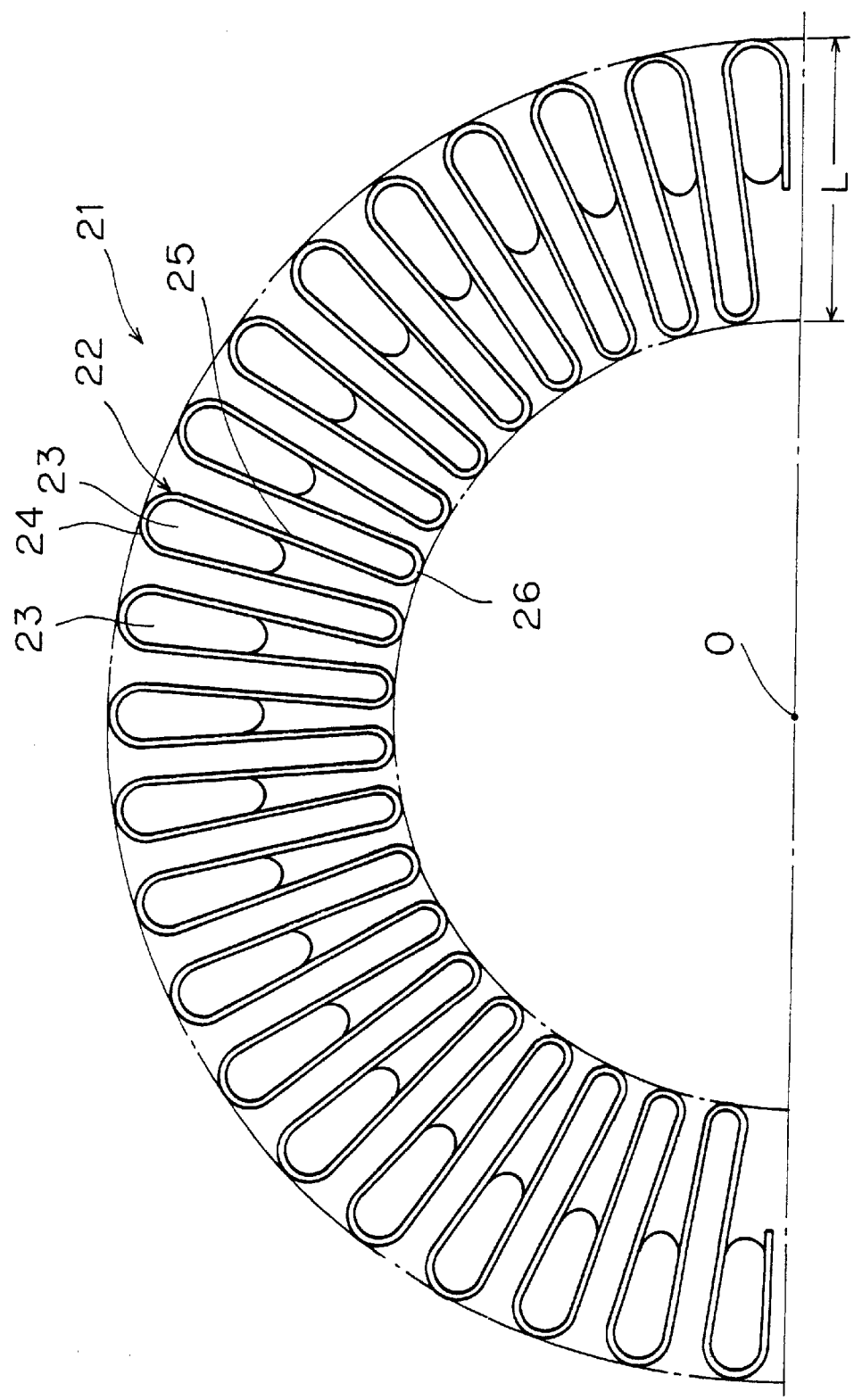
FIG. 21 is a view similar to FIG. 15 showing a vibration attenuating spring in accordance with a ninth embodiment of the present invention.

A ninth embodiment of the present invention is depicted in FIG. 21. The vibration attenuating spring 21 shown in FIG. 21 has a structure similar to that of the vibration attenuating spring 21 described with respect to the eighth embodiment. Only the differences therebetween will now be described. A radial length of each of the elastic member 23 of the vibration attenuating spring 21 is equal to or less than a radial length L of the leaf spring 22. The vibration attenuating spring 21 has a rigidity lower than that of the vibration attenuating spring according to the eighth embodiment. The other effects are the same as those of the eighth embodiment.

TENTH EMBODIMENT

Figure 22:
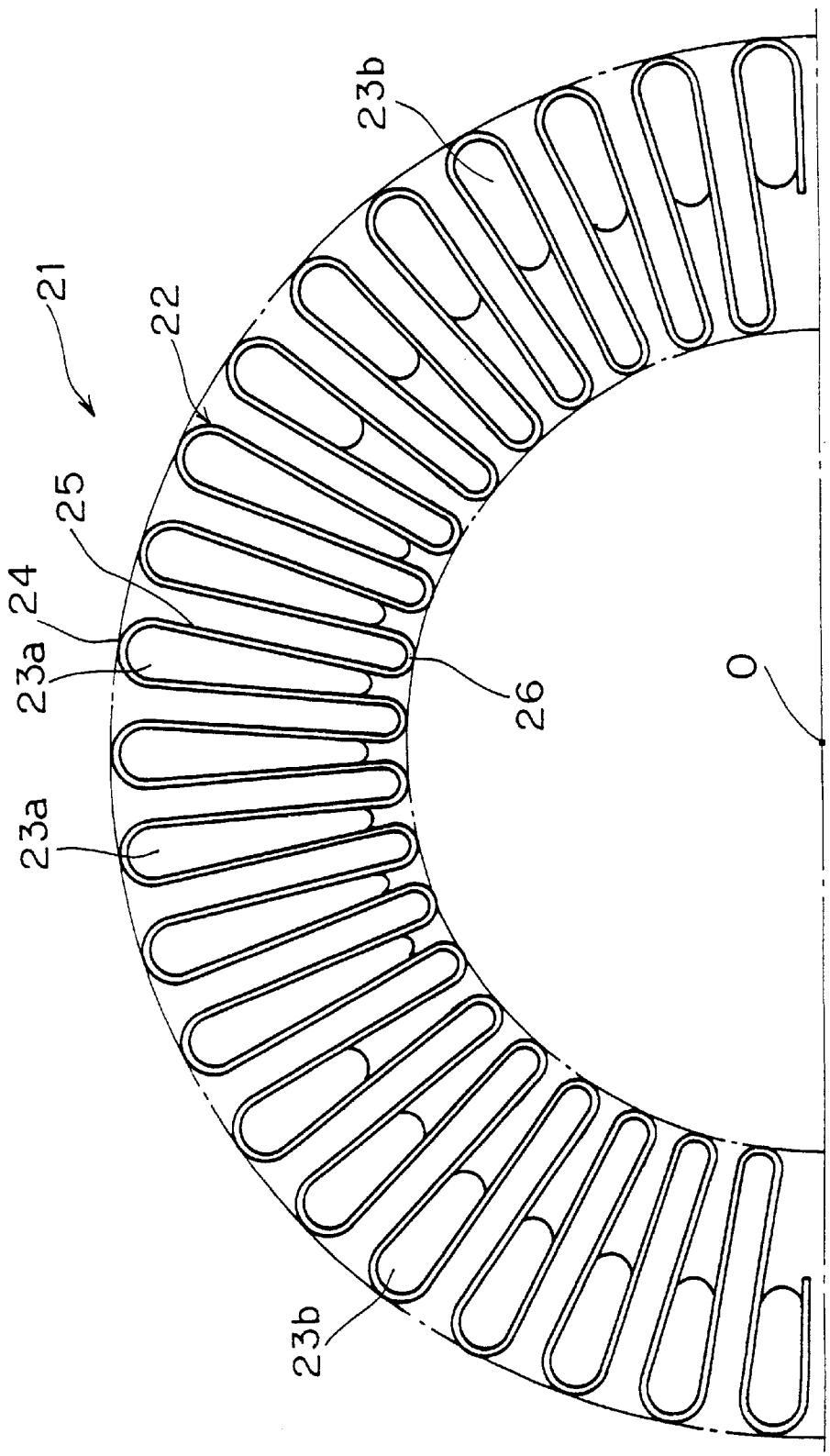
FIG. 22 is a view similar to FIG. 15 showing a vibration attenuating spring in accordance with a tenth embodiment of the present invention.

In a tenth embodiment of the present invention shown in FIG. 22, the vibration attenuating spring 21, includes elastic members 23a and 23b that have different shapes and sizes. It is thus possible to differentiate the rigidities of the respective parts of the vibration attenuating spring 21.

In the vibration attenuating spring 21 shown in FIG. 22, a plurality of first elastic members 23a having a long length in the radial direction are disposed in the central portion in the circumferential direction of the leaf spring 22, whereas a plurality of second elastic members 23b having a short length in the radial direction on both sides in the circumferential direction of the leaf spring 22. With such a structure, the vibration attenuating spring 21 has a lower rigidity at both ends in the circumferential direction than the central portion. As a whole, the rigidity thereof is lower than that of the eighth embodiment.

The elastic members having the different shapes are thus arranged so that the members different in rigidity are connected in series with each other as a whole. As a result, it is possible to obtain the higher rigidity region and the lower rigidity region with regard to compression characteristics.

The operation of the vibration attenuating spring 21 upon the vibration transmission will be described. When the minute twist vibrations caused by the torque variation of the engine are transmitted, the portions on both sides in the circumferential direction of the vibration attenuating spring 21 are mainly elastically deformed to obtain the low rigidity. Thus, the minute twist vibrations are hardly transmitted on the flywheel 102 side due to the low rigidity/small resistance characteristics.

When an excessive torque variation is generated in the damper mechanism 109 upon passing through the resonant point in the low RPM region, the phase angle of the vibration attenuating spring 21 is increased. In accordance with this, the rigidity of the lever portions 25 is increased and at the same time the amount of elastic deformation of the central portion, in the circumferential direction, of the elastic members 23 is increased to thereby generate the large internal friction. The large friction generated at this time causes the excessive torque variation to be attenuated.

ELEVENTH EMBODIMENT

Figure 23:
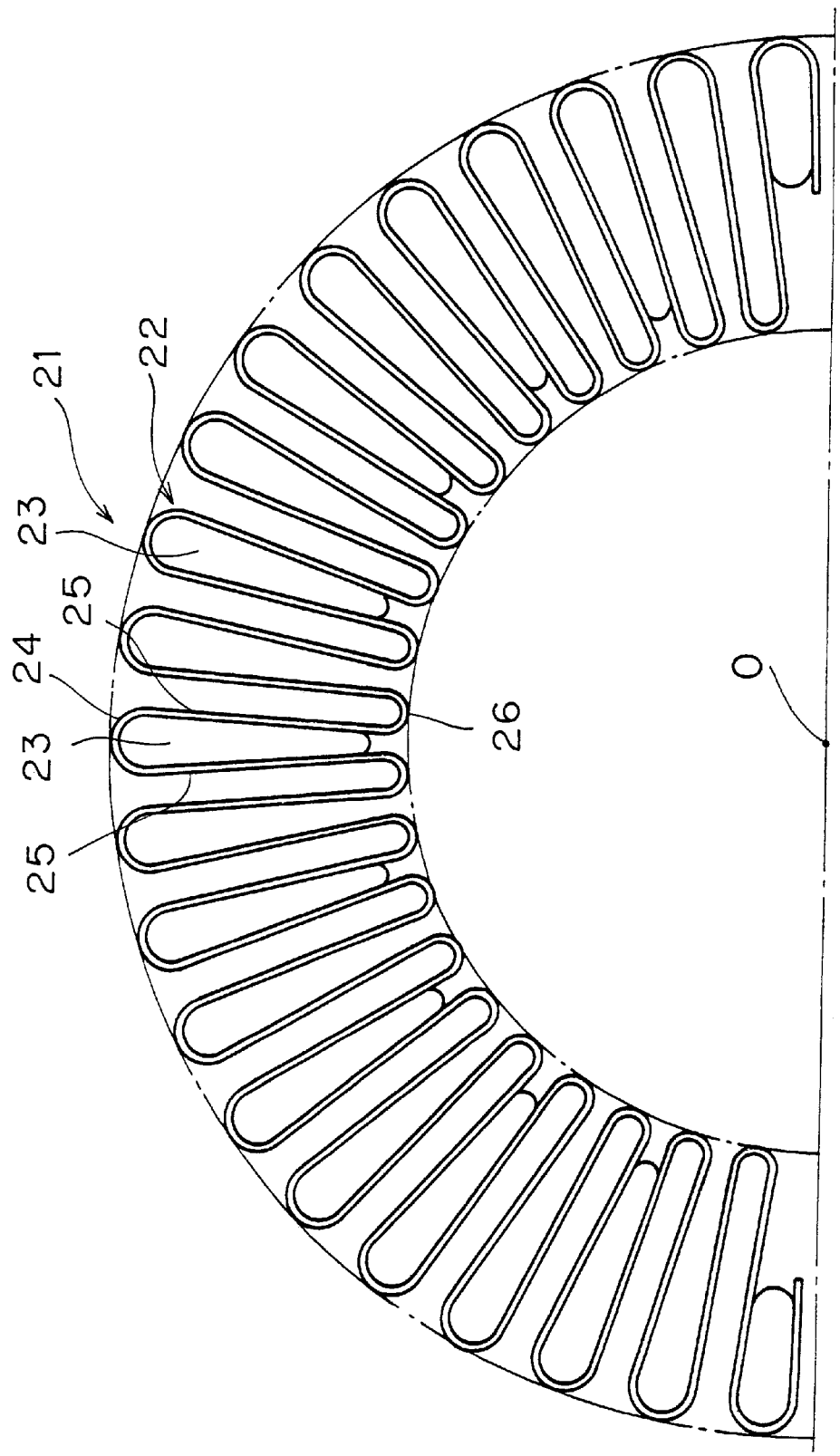
FIG. 23 is a view similar to FIG. 15 showing a vibration attenuating spring in accordance with a eleventh embodiment of the present invention.
Figure 24:
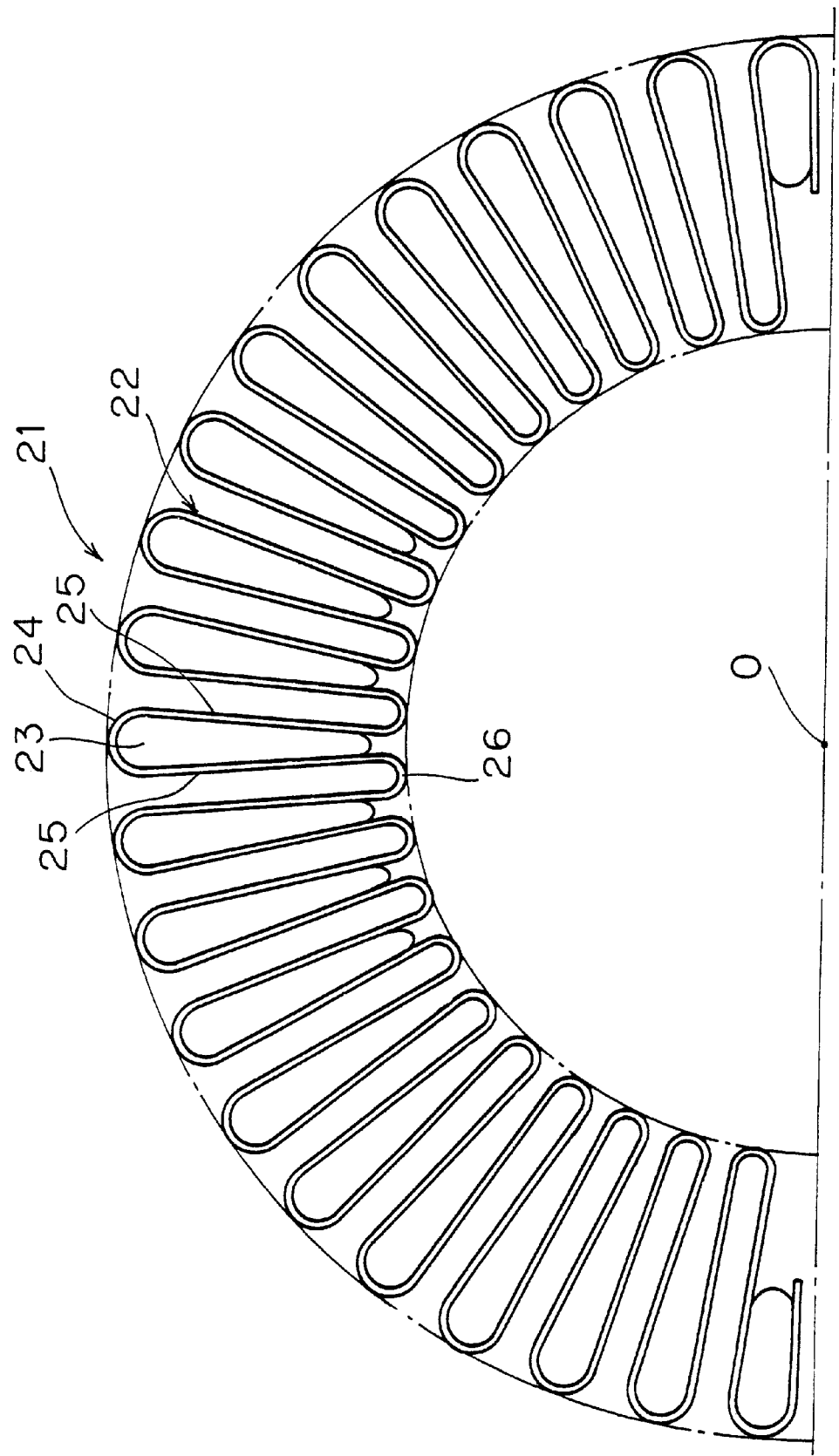
FIG. 24 is a view similar to FIG. 15 showing a vibration attenuating spring in accordance with a twelfth embodiment of the present invention.

In an eleventh embodiment of the present invention, as shown in FIG. 23, the vibration attenuating spring 21 includes elastic members 23 disposed alternatingly in every other respective radially outward bent portions 24 in the circumferential direction. The rigidity of the vibration attenuating spring 21 is lower than that of the eighth embodiment due to the radially outward bent portions 24 in which no elastic member 23 is disposed.

By arranging the elastic members in every two bent portions 24, it is possible to reduce the rigidity at the bent portions where the elastic members are not disposed.

The operation of the vibration attenuating spring 21 upon the twist vibration transmission will be described.

When the minute twist vibrations caused by the torque variation of the engine are transmitted, in the vibration attenuating springs 21, the radially inward bent portions 26 and the radially outward bent portions 24 where the elastic members 23 are not disposed are mainly elastically deformed to obtain the low rigidity. Thus, the minute twist vibrations are hardly transmitted on the flywheel 102 side due to the low rigidity/small resistance characteristics.

When an excessive torque variation is generated in the damper mechanism 109 upon passing through the resonant point in the low RPM region, the phase angle of the vibration attenuating spring 21 is increased. In accordance with this, the rigidity of the lever portions 25 is increased and at the same time the amount of elastic deformation of the elastic members 23 is increased to thereby generate the large internal friction. The large friction generated at this time causes the excessive torque variation to be attenuated.

TWELFTH EMBODIMENT

In a twelfth embodiment of the present invention, as shown in FIG. 14, a vibration attenuating spring 21 includes elastic members 23 in only some of a plurality of radially outward bent portions 24, specifically in the central portion in the circumferential direction of the leaf spring 22. There are no elastic members disposed within the plurality of radially outward bent portions 24 on either end portions in the circumferential direction of the leaf spring 22. With such a structure, the vibration attenuating spring 21 has a lower rigidity at both ends in the circumferential direction than the central portion. As a whole, the rigidity thereof is lower than that of the eighth embodiment.

No elastic members are thus arranged in a certain region at all to thereby form portions having a low rigidity. As a result, it is possible to obtain the higher rigidity region and the lower rigidity region in the compression characteristics.

The operation of the vibration attenuating spring 21 upon the twist vibration transmission will be described. When the minute twist vibrations caused by the torque variation of the engine are transmitted, the portions on both sides in the circumferential direction of the vibration attenuating spring 21 are mainly elastically deformed to obtain the low rigidity. Thus, the minute twist vibrations are hardly transmitted on the flywheel 102 side due to the low rigidity/small resistance characteristics.

When an excessive torque variation is generated in the damper mechanism 109 upon passing through the resonant point in the low RPM region, the phase angle of the vibration attenuating spring 21 is increased. In accordance with this, the rigidity of the lever portions 25 is increased and at the same time the amount of elastic deformation of the central portion, in the circumferential direction, of the elastic members 23 is increased to thereby generate the large internal friction. The large friction generated at this time causes the excessive torque variation to be attenuated.

THIRTEENTH EMBODIMENT

Figure 25:
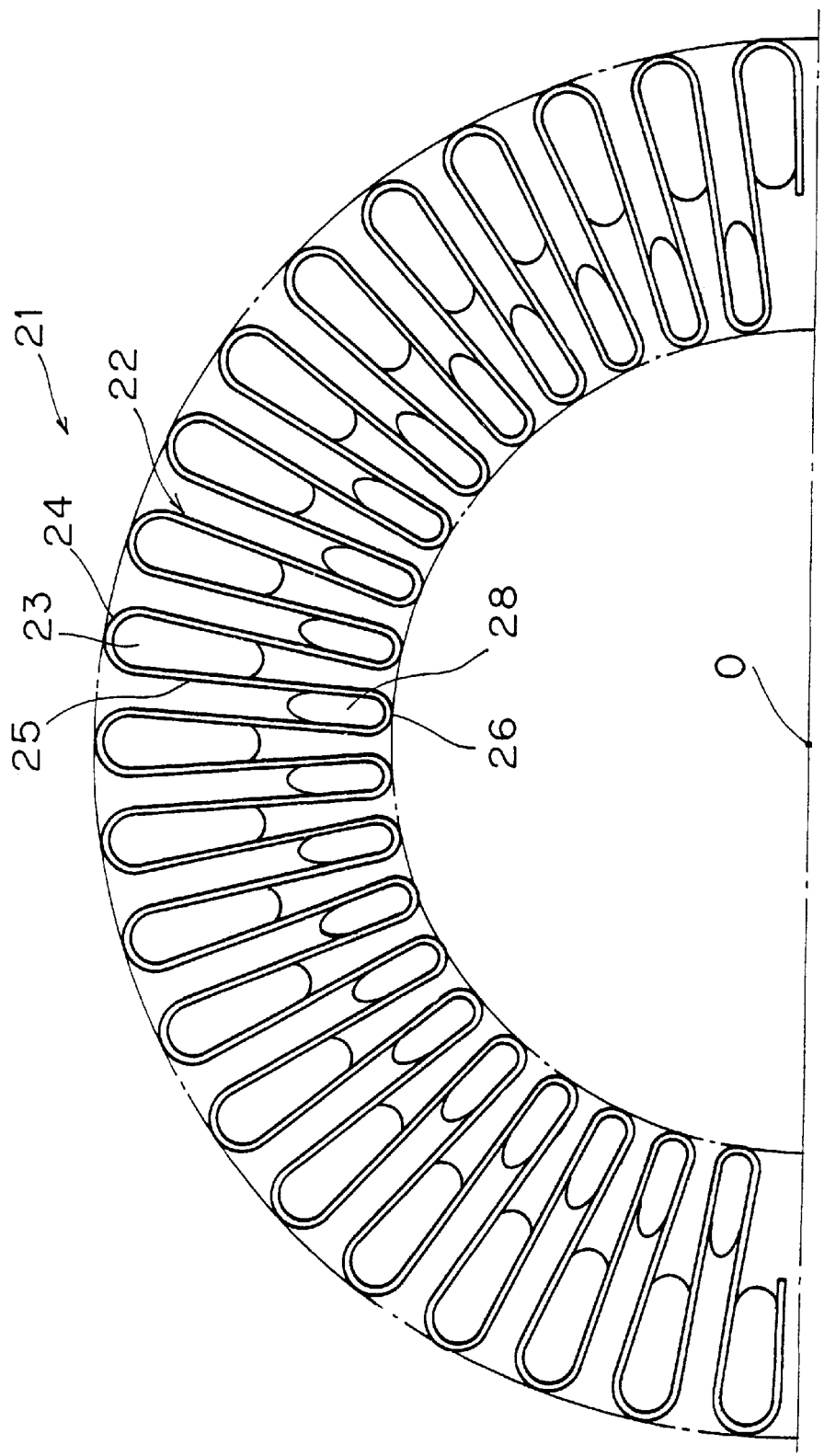
FIG. 25 is a view similar to FIG. 15 showing a vibration attenuating spring in accordance with a thirteenth embodiment of the present invention.

In a thirteenth embodiment of the present invention, as shown in FIG. 25, the vibration attenuating spring 21 is provided the outer elastic members 23 disposed inside of the radially outward bent portions 24 and inner elastic members 28 disposed within the radially inward bent portions 26. The radial length and the circumferential length of the outer elastic members 23 are longer than those of the inner elastic members 28. The size and shape of the outer and inner elastic members 23 and 28 are not limited to those shown in this embodiment. Various combinations of sizes and shapes are possible.

FOURTEENTH EMBODIMENT

Figure 26:
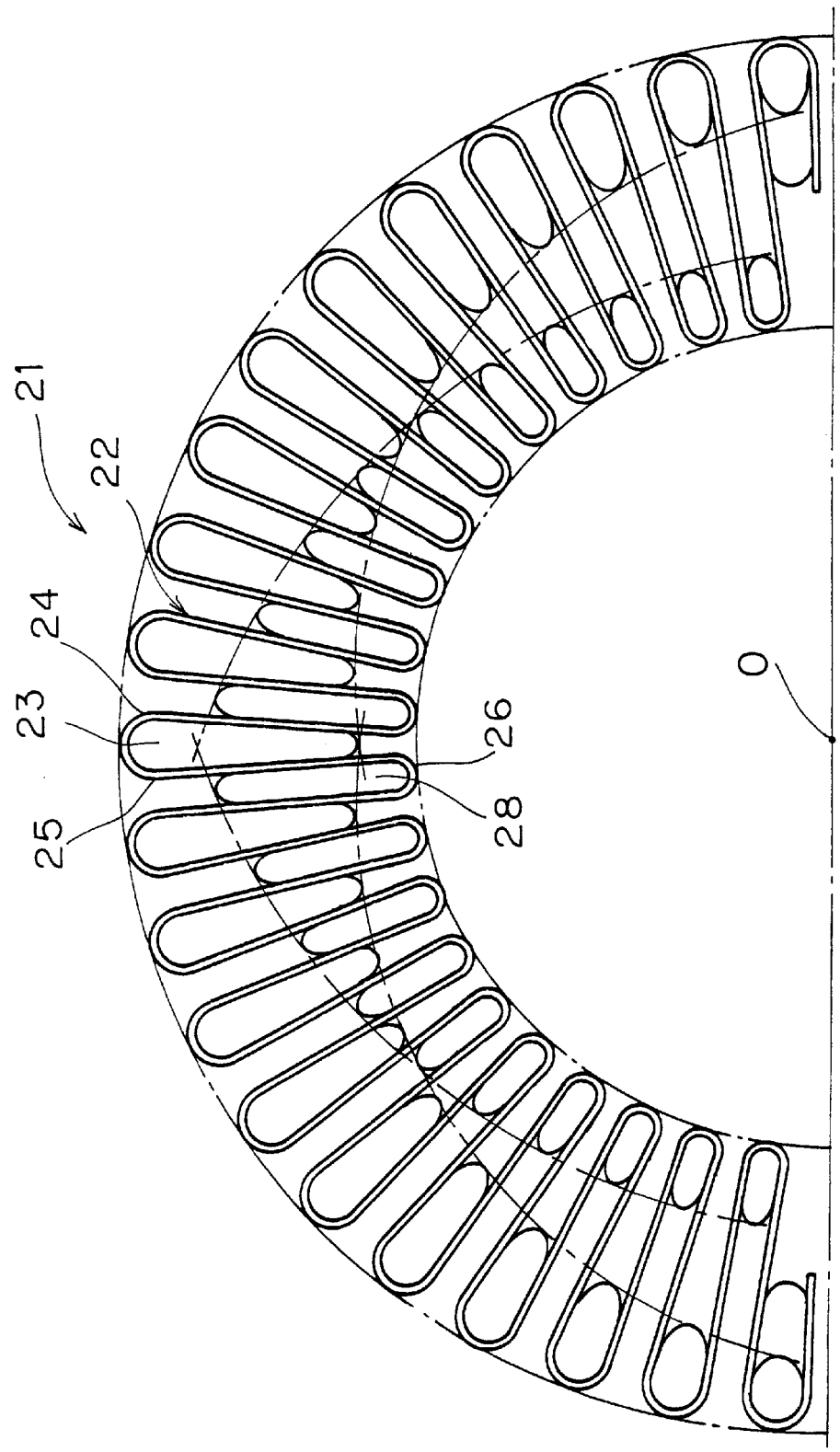
FIG. 26 is a view similar to FIG. 15 showing a vibration attenuating spring in accordance with a fourteenth embodiment of the present invention.

In a fourteenth embodiment of the present invention, as shown in FIG. 26, the vibration attenuating spring 21 is similar to the thirteenth embodiment in that there are provided the outer elastic members 23 disposed inside of the radially outward bent portions 24 and the inner elastic members 28 disposed within the radially inward bent portions 26. However, the outer elastic members 23 are all of different length. For instance, in a middle portion in the circumferential direction of the spring 21, the elastic members 23 have a generally long length in the radial direction and the length of each of the other the elastic members 23 becomes shorter as one moves away from the circumferential center of the spring 21. In a similar manner, the inner elastic members 28 are radially longest at the middle portion in the circumferential direction of the spring 21 and become shorter in length as one moves away from the middle portion. As a result, in the middle portion in the circumferential direction of the spring 21, the outer elastic members 23 and the inner elastic members 28 become heavier and larger in the radial direction and overlap one another in the circumferential direction. The overlap is smaller in the radial direction toward ends of the spring 21 in the circumferential direction. The overlap is non-existent toward both ends of the spring 21.

Thus, it is possible to change the rigidity of each part by changing the shape of the elastic members according to their positions.

In the vibration attenuating spring 21, the rigidity is lowest at the ends in the circumferential direction of the spring 21 and increases gradually toward the center in the circumferential direction of the spring 21.

The operation of the vibration attenuating spring 21 upon the twist vibration transmission will be described in detail. When the minute twist vibrations caused by the torque variation of the engine are transmitted, the portions on both sides in the circumferential direction of the vibration attenuating spring 21 are mainly elastically deformed to obtain the low rigidity. Thus, the minute twist vibrations are hardly transmitted on the flywheel 102 side due to the low rigidity/small resistance characteristics.

When an excessive torque variation is generated in the damper mechanism 109 upon passing through the resonant point in the low RPM region, the phase angle of the vibration attenuating spring 21 is increased. In accordance with this, the rigidity of the lever portions 25 is increased and at the same time the amount of elastic deformation of the central portion, in the circumferential direction, of the elastic members 23 is increased to thereby generate the large internal friction. The large friction generated at this time causes the excessive torque variation to be attenuated.

FIFTEENTH EMBODIMENT

Figure 27:
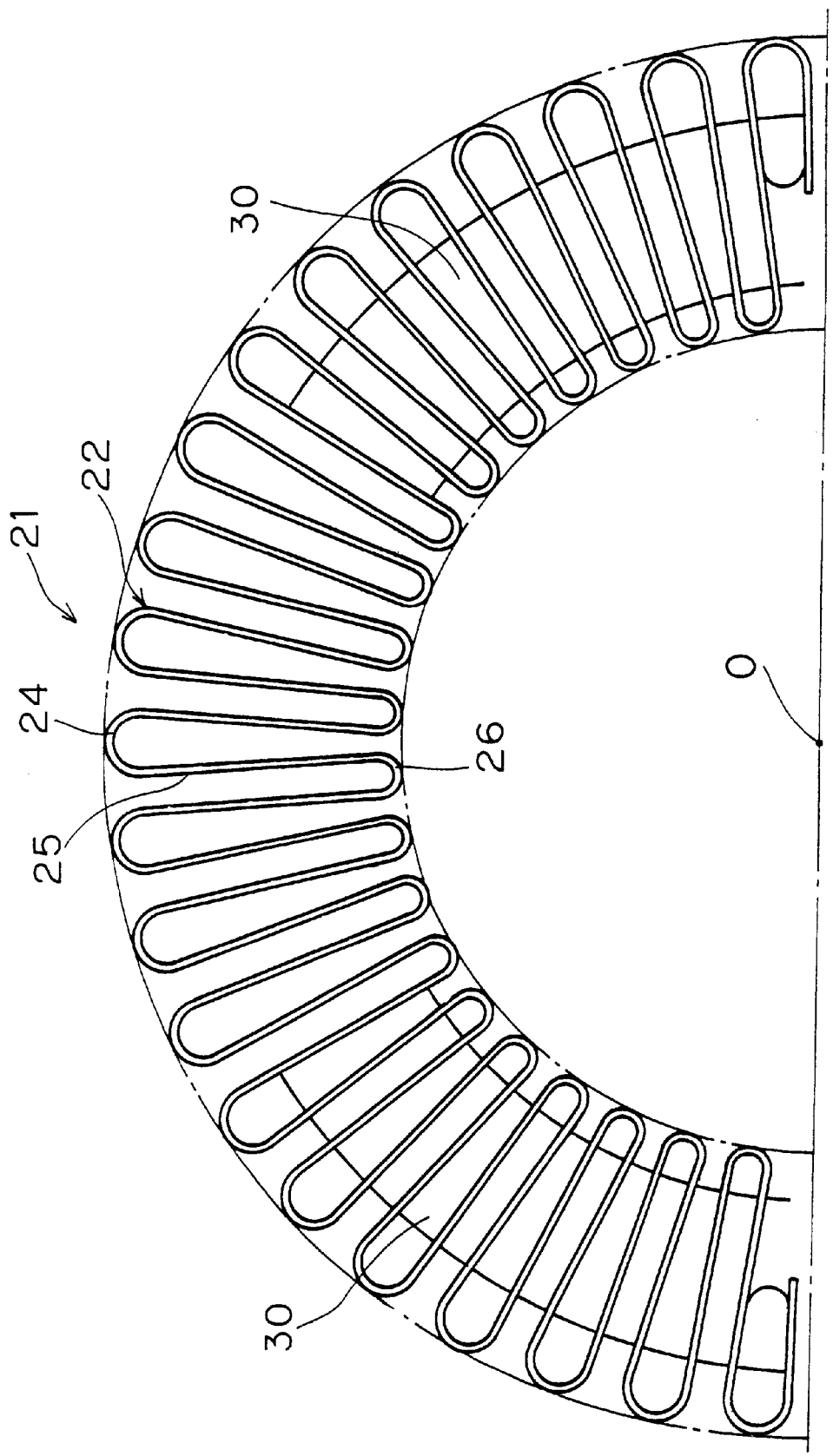
FIG. 27 is a view similar to FIG. 15 showing a vibration attenuating spring in accordance with a fifteenth embodiment of the present invention.

In a fifteenth embodiment of the present invention, as shown in FIG. 27, the vibration attenuating spring 21 includes a plurality of elastic members 30 that are disposed at in portions at either circumferential end of the spring 21. The elastic members 30 extend in the radial direction and are disposed between respective lever portions 25. The elastic members 30 are molded to the respective lever portions 25. However, the ends of the elastic members 30 are spaced apart the bent portions 24 and 26.

The spring 21 may be divided into three approximately equal sections. The two end sections include the elastic members 30, and the mid section has no elastic members 30. In this embodiment of the vibration attenuating spring 21, the rigidity at the circumferential ends of the spring 21 is higher than the rigidity in the mid section in the circumferential direction of the spring 21.

Thus, the elastic members are molded partially in the circumferential direction so that the portions having different rigidities may be formed in series. As a result, it is possible to obtain the portions having a low rigidity and the portion having a high rigidity with respect to the compression characteristics.

The operation of the vibration attenuating spring 21 upon the twist vibration transmission will now be described. When the minute twist vibrations caused by the torque variation of the engine are transmitted, the portion in the middle in the circumferential direction of the vibration attenuating spring 21 is mainly elastically deformed to obtain the low rigidity. Thus, the minute twist vibrations are hardly transmitted on the flywheel 102 side due to the low rigidity/small resistance characteristics.

When an excessive torque variation is generated in the damper mechanism 109 upon passing through the resonant point in the low RPM region, the phase angle of the vibration attenuating spring 21 is increased. In accordance with this, the rigidity of the lever portions 25 is increased and at the same time the amount of elastic deformation of both sides, in the circumferential direction, of the elastic members 23 is increased to thereby generate the large internal friction. The large friction generated at this time causes the excessive torque variation to be attenuated.

SIXTEENTH EMBODIMENT

Embodiments sixteen, seventeen, eighteen and nineteen are further examples of applications of the vibration attenuating springs described above with respect to the eighth embodiment through the fifteenth embodiment, inclusive. Specifically, the various embodiments of the vibration attenuating springs described above may also be used in a variety of different devices, such as a damper mechanism, a clutch disk and a torque convertor.

Figure 28:
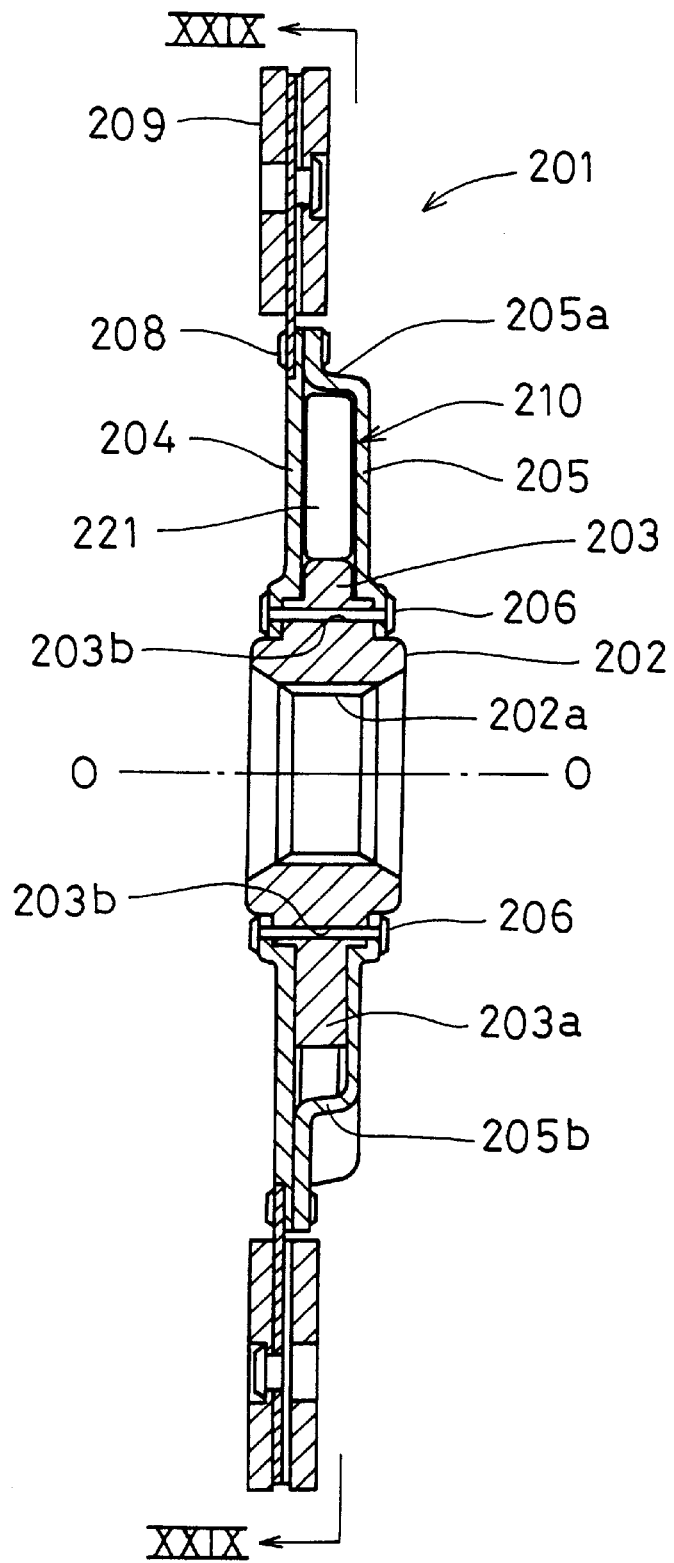
FIG. 28 is a longitudinal sectional view of a clutch disc assembly having a vibration attenuating spring in accordance with a sixteenth embodiment of the present invention.
Figure 29:
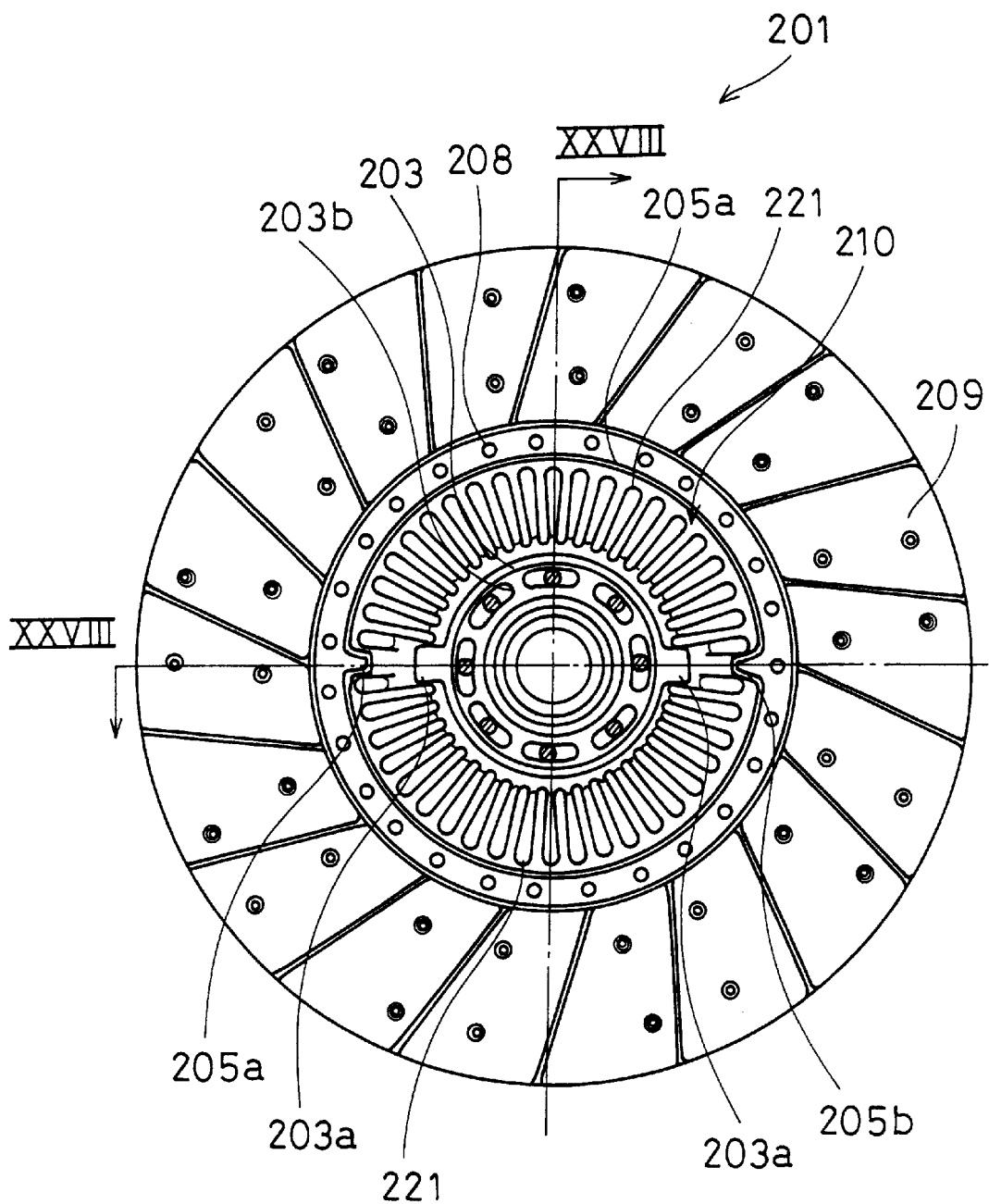
FIG. 29 is a cross-sectional view taken along the line XXIX—XXIX of FIG. 28.

A sixteenth embodiment is shown in FIGS. 28 and 29 where a clutch disc assembly 201 includes the vibration attenuating springs described above. In FIGS. 28 and 29, O—O designates a centerline about which the clutch disc assembly is rotatable.

A spline hub 202 which may be connected to an output shaft (not shown) is disposed at the center of the clutch disc assembly 201. A spline hole 202a that is engaged with an outer spline portion of the output shaft (not shown) is provided in the central portion of the spline hub 202. Also, a flange portion 203 extending radially outwardly is formed integrally with the spline hub 202. As shown in FIG. 29, two projections 203a are formed at two diametrically opposite positions on the outer circumference of the flange portion 203. A plurality of oblong holes 203b which pass out in the axial direction and extend long in the circumferential direction are formed at a predetermined interval in the flange portion 203.

Substantially disc-like pressed side plates 204 and 205 are disposed on the outer circumferential side of the spline hub 202. The side plates 204 and 205 are disposed at a predetermined interval in the axial direction with their inner circumferential portions being disposed on both sides of the flange portion 203. The inner circumferential portions of the side plates 204 and 205 are fixed to each other by a plurality of stop pins 6 which are inserted into the oblong holes 203b of the flange portion 203.

A bent portion 205a bent toward the side plate 204 is formed in the outer circumferential portion of the side plate 205. The bent portion 205a is fixed to the outer circumferential portion of the side plate 204 by rivets 208 together with the clutch disc 209 (frictional plate). Also, in the bent portion 205a, two retainer portions 205b formed to be recessed inwardly by drawing work are formed in correspondence with the projections 203a of the flange portion 203 at two positions.

With such an arrangement, the side plates 204 and 205 disposed on the surfaces on both sides of the spline hub 201 define an annular spring receiving chamber 210 sealed at its outer circumferential portion. The annular spring receiving chamber 210 is divided into two substantially semicircular arcuate chambers by the projections 203a and the retainer portion 205b.

The vibration attenuating spring 221 is disposed in each arcuate chamber. The structure and effect of the vibration attenuating spring 221 are the same as those of the eighth embodiment, and therefore, the explanation therefor will be omitted. Further, the vibration attenuating springs disclosed in the ninth through fifteenth embodiments may be used in this clutch disc assembly 201.

SEVENTEENTH EMBODIMENT

Figure 30:
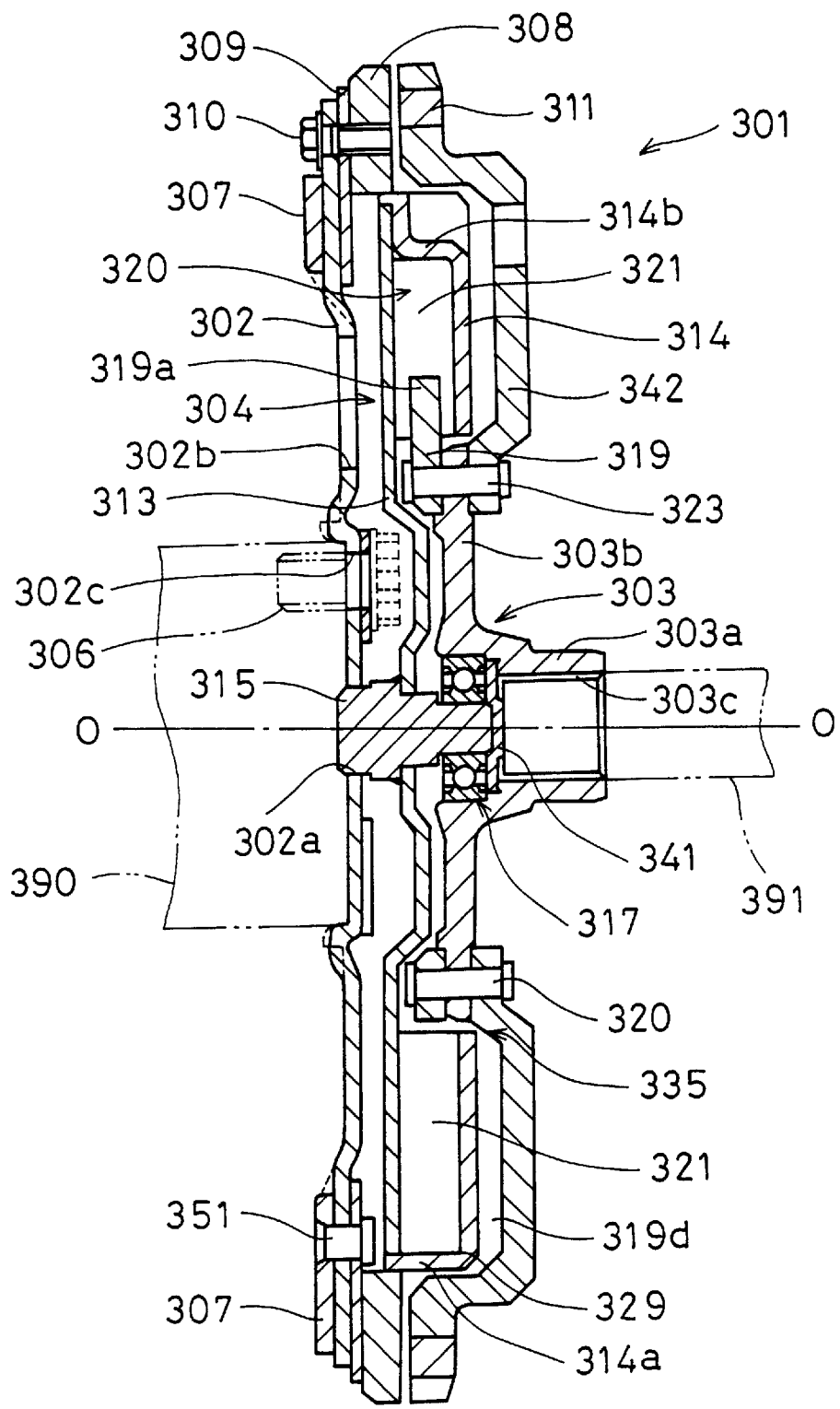
FIG. 30 is a longitudinal sectional view showing a damper device having a vibration attenuating spring in accordance with a seventeenth embodiment of the present invention.

A seventeenth embodiment of the present invention is shown in FIG. 30. A damper device 301 is used for transmitting the torque from the crankshaft 390 on the engine side to the main drive shaft 391 on the transmission side. In FIG. 30, the engine (not shown) is disposed on the left side of the drawing and the transmission (not shown) is disposed on the right side of the drawing. Furthermore, line O—O in FIG. 30 denotes the rotary axis of the damper device 301.

The damper device 301 is mainly composed of a flexible plate 302, a ring member 308 fixed to the flexible plate 302, a hub flange 303 and a damper 304.

The flexible plate 302 is a substantially disc-like member that is flexible in the bending direction and has a high rigidity in the rotational direction. The flexible plate 302 has a center hole 302a at the center. Also, the flexible plate 302 has a plurality of round holes 302b formed at equal intervals in the circumferential direction in the middle in the radial direction. A plurality of bolt holes 302c are formed at equal intervals in the circumferential direction on the inner circumferential side of the round holes 302b. The inner circumferential edge of the flexible plate 302 is fixed to an end of the crankshaft 390 by the bolts 306 passing through the bolt holes 302c. Furthermore, a plurality of arcuate inertia members 307 are fixed on the outer circumferential portion, on the engine side, of the flexible plate 302 by rivets 351. The inertia members 307 increase the inertia moment of the damper device 301. Also, since the inertia members 307 take the shapes obtained by dividing an annular member in the circumferential direction, the flexing in the bending direction (about the end of the crankshaft) of the flexible plate 302 is ensured. The outer circumferential edge of the flexible plate 302 is fixed to the ring member 308 through the disc-like plate 309 by the plurality of bolts 310. The inertia members 307 have cutaway portions corresponding to the bolts 310.

The hub flange 303 is composed of a boss 303a and a flange 303b formed integrally with the outer circumference of the boss 303a. The spline holes 303c engaged with the spline teeth of the main drive shaft 391 extending from the transmission side are formed in the center of the boss 303a.

The damper 304 is mainly provided with the first input plate 313, the second input plate 314, the driven plate 319 and the pair of vibration attenuating spring 321.

The first input plate 313 and the second input plate 314 are disc-like pressed members. The inner circumferential edge of the first input plate 313 further extends radially inwardly of the inner circumferential edge of the second input plate 314. The second input plate 314 has at its outer circumferential portion a cylindrical wall 314a fixed to the outer circumferential edge of the first input plate 313 and extending on the engine side. Also, the cylindrical wall 314a is welded to the inner circumference of the ring member 308. Two retainer portions 314b that are formed by drawing work so as to be recessed inwardly are formed at two radially opposite positions in the cylindrical wall 314a. Thus, the first and second input plates 313 and 314 are rotated together with the ring member 308. Namely, the plates 313 and 314 function as parts of the input members. The first input plate 313 and the second input plate 314 form the annular spring receiving chamber 320 sealed at its outer circumference. Since the first and second input plates 313 and 314 are the pressed disc-like plates, the length in the axial direction of the damper 304 is short. Since the ring member 308 is fixed to the outer circumferential portions of the plates 313 and 314, it is possible to keep a sufficient inertia moment for the input members without increasing the axial dimension of the damper 304.

The driven plate 319 is a disc-like member with its inner circumferential edge being coupled with the flange 303b of the hub flange 303 by the plurality of rivets 323. Thus, the driven plate 319 is rotated together with the hub flange 303. Namely, the driven plate 319 serves as a flange of the hub flange 303, i.e., a part of the output member. Two support portions 319a that project radially outwardly are formed at two radially opposite positions of the driven plate 319.

The interior of the annular spring receiving chamber 320 is divided into a pair of arcuate chambers by the retainer portions 314a of the second input plates 314 and the support portions 319a of the driven plate 319. The vibration attenuating springs 321 are disposed within the respective arcuate chambers. The structure and effect of the vibration attenuating spring 321 are generally the same as those of the eighth embodiment, and therefore, the explanation therefor will be omitted.

The center hole of the inner circumferential edge of the first input plate 313 is engaged with the boss 315 and fixed thereto by welding. The outer circumferential surface 315a on the engine side of the boss 315 is inserted into the center hole 302a of the flexible plate 302. A bearing 317 is disposed between the outer circumferential surface on the transmission side of the boss 315 and the inner circumferential portion of the boss 303a of the hub flange 303. The bearing 317 is used for rotatably support the boss 315 and the hub flange 303 to be rotatable relative to each other. An inner race of the bearing 317 is fixed to a groove of the boss 315. An outer race of the bearing 317 is fixed to the inner circumference of the boss 303. Thus, the boss 315 is positioned at the center hole 302a of the flexible plate 302 further for positioning the bearing 317. As a result, the flexibility of the flexible plate 302, the boss 315 and the bearing 317 is enhanced.

The hub flange 303 is coupled with the main drive shaft 391 of the transmission. For this reason, the hub flange 303 is hardly shifted. An extremely large force is not applied to the bearing 317. Furthermore, since the flexible plate 302 absorbs the bending vibrations, the bending load applied to the bearing 317 is small. For this reason, the diameter of the bearing 317 may be decreased to the extent that the bearing 317 may be disposed inside of the pitch circle of the cranks bolts 306. It is difficult to make the bearing small in size if the flexible plate is not used together. Even if it is possible to make the bearing small in size, it is necessary to use a bearing that is specially high in mechanical strength. This would be expensive.

The inertia member 342 (inertia mass) is provided on the transmission side of the flange 303b of the hub flange 303. The inertia member 342 is a disc-like member for covering the transmission side of the second input plate 314. The inner circumferential edge of the inertia member 342 is fixed to the flange 303b and the driven plate 319 by the rivets 323. Also, since the inertia member 342 is the disc-like member, the overall size of the damper device 301 is compact in the axial direction. The provision of the inertia member 342 increases the inertia moment of the output mechanism. Furthermore, a ring gear 311 for starting the engine is welded to the outer circumference of the inertia member 342. Since the inertia member 342 is the disc-like member, the ring gear 311 may readily be fitted. For this reason, the cost is reduced. The ring gear 311 is the member welded on the outer circumference of the ring member 308 in the conventional manner. However, according to this embodiment, it is moved from the input mechanism to the output mechanism, it is possible to increase the inertia moment of the output mechanism with ease. If the inertia moment of the output mechanism is increased, it is possible to reduce the resonance frequency in the drive system including the damper device 301 not more than the idle RPM of the automotive vehicle (i.e., practical RPM). The conventionally used ring gear 311 is used to reduce the cost.

The vibration attenuating spring disclosed in the ninth through fifteenth embodiments may be used in this damper mechanism 301.

EIGHTEENTH MBODIMENT

Figure 31:
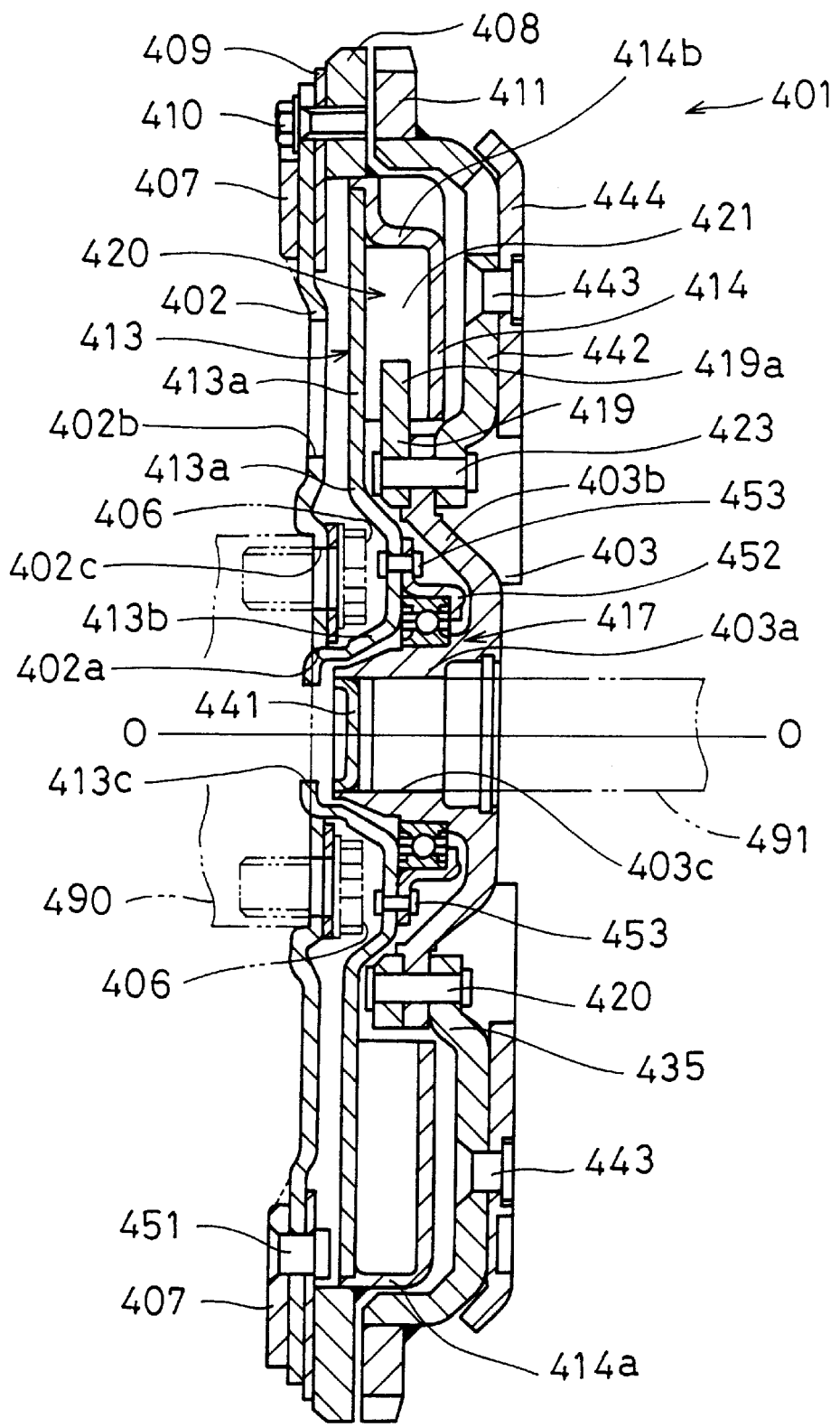
FIG. 31 is a longitudinal sectional view showing a damper device having a vibration attenuating spring in accordance with an eighteenth embodiment of the present invention.

An eighteenth embodiment of the present invention is shown in FIG. 31. In FIG. 31, a damper device 401 is used for transmitting the torque from the crankshaft 490 on the engine side to the main drive shaft 491 on the transmission side and for attenuating the twist vibrations. In FIG. 31, the engine (not shown) is disposed on the left side of the drawing and the transmission (not shown) is disposed on the right side of the drawing. Furthermore, line O—O in FIG. 31 denotes the rotary axis of the damper device 401.

The damper device 401 is mainly composed of a flexible plate 402, a ring member 408 fixed to the flexible plate 402, a hub flange 403 and a damper 404.

The flexible plate 402 is a substantially disc-like member that is flexible in the bending direction and has a high rigidity in the circumferential direction. The flexible plate 402 has a center hole 402a at the center. Also, the flexible plate 402 has a plurality of window holes 402b formed at equal intervals in the circumferential direction in the middle in the radial direction. A plurality of bolt holes 402c are formed at equal intervals in the circumferential direction on the inner circumferential side of the window holes 402b. The inner circumferential edge of the flexible plate 402 is fixed to an end of the crankshaft 490 by the crank bolts 406 passing through the bolt holes 402c. Furthermore, a plurality of arcuate inertia members 407 are fixed on the outer circumferential portion, on the engine side, of the flexible plate 402 by rivets 451. The inertia members 407 increase the inertia moment of the damper device 401. Also, since the inertia members 407 take the shapes obtained by dividing an annular member in the circumferential direction, the warpage in the bending direction of the flexible plate 402 is ensured. The outer circumferential edge of the flexible plate 402 is fixed to the ring member 408 through the disc-like plate 409 by the plurality of bolts 410. The inertia members 407 have cutaway portions corresponding to the bolts 410.

The hub flange 403 is composed of a boss 403a and a flange 403b formed integrally with the outer circumference of the boss 403a. The boss 403a extends toward the engine. The spline holes 403c engaged with the spline teeth of the main drive shaft 491 extending from the transmission side are formed in the center of the boss 403a. A cap-like member 441 for covering the center hole is fixed to the center hole of the boss 403a on the engine side.

The damper 404 is mainly provided with the first input plate 413, the second input plate 414, the driven plate 419 and the vibration attenuating spring 421.

The first input plate 413 and the second input plate 414 are disc-like pressed members. The first input plate 413 is composed of a disc portion 413a and a hollow cap 413b projecting from the central portion of the disc portion 413a toward the engine. The hollow cap 413b is formed integrally from the center of the disc portion 413a by drawing work. A center hole 413c is formed at the center of the hollow cap 413b. The second input plate 414 extends toward the engine at the outer circumferential portion and has a cylindrical wall 414a fixed to the outer circumferential edge of the first input plate 413. Also, the cylindrical wall 414a is welded to the inner circumference of the ring member 408. Thus, the first and second input plates 413 and 414 are rotated together with the ring member 408. Namely, the plates 413 and 414 function as the input members. Also, in the cylindrical wall 414a, two retainer portions 414b formed so as to be recessed inwardly by drawing work are formed at two radially opposite positions.

As described above, the first input plate 413 and the second input plate 414 form the annular spring receiving chamber 420 sealed at its outer circumference. Since the first and second input plates 413 and 414 are the pressed disc-like plates, the length in the axial direction of the damper 404 is short. Since the ring member 408 is fixed to the outer circumferential portions of the plates 413 and 414, it is possible to keep a sufficient inertia moment for the input members without increasing the axial dimension of the damper 404.

The driven plate 419 is a disc-like member with its inner circumferential edge being coupled with the flange 403b of the hub flange 403 by the plurality of rivets 423. Thus, the driven plate 419 is rotated together with the hub, flange 403. Namely, the driven plate 419 serves as a flange of the hub flange 403, i.e., a part of the output member. Two support portions 419a that extend radially outwardly are formed at two radially opposite positions of the driven plate 419.

The interior of the annular spring receiving chamber 420 is divided into a pair of arcuate chambers by the retainer portions 414a of the second input plates 414 and the support portions 419a of the driven plate 419. The vibration attenu-ating springs 421 are disposed within the respective arcuate chambers. The structure and effect of the vibration attenuating spring 421 are generally the same as those of the eighth embodiment, and therefore, the explanation therefor will be omitted.

The hollow cap 413b of the first input plate 413 is inserted into the center hole 402a of the flexible plate 402. The first input plate 413 is positioned and centered by a flexible plate 402 fixed to the crankshaft 490 (i.e., the centering portion on the crankshaft side).

The boss 403a of the hub flange 403 is disposed within the hollow cap 413b of the first input plate 413. The boss 403a is substantially received in the axial dimension of the damper 401 (i.e., first and second input plates 413 and 414). As a result, the damper device 404 is compact in the axial direction. A bearing 417 is disposed between the inner circumference of the disc portion 413a of the first input plate 413 and the outer circumference of the boss 403a of the hub flange 403. An outer race of the bearing 417 is fixed to the first input plate 413 by an annular support member 452 and rivets 453. Thus, the bearing 417 is positively supported to the first input plate 413. The boss 403a is inserted into an inner race of the bearing 417 and has a portion that is in contact with end face on the transmission side of the inner race.

Thus, the first input plate 413 is positioned (centered) to the center hole 402a of the flexible plate 402 and the first input plate 413 in turn supports the bearing 417. With this arrangement, the co-axial relationship of the flexible plate 402, the first input plate 413, the bearing 417 and the hub flange 403 is enhanced.

The hub flange 403 is coupled with the main drive shaft 491 of the transmission. For this reason, the hub flange 403 is hardly shifted. An extremely large force is not applied to the bearing 417. Furthermore, since the flexible plate 402 absorbs the bending vibrations, the bending load applied to the bearing 417 is smaller. For this reason, the diameter of the bearing 417 may be decreased to the extent that the bearing 417 may be disposed inside of the pitch circle of the cranks bolts 406. It is difficult to make the bearing small in size if the flexible plate is not used together. Even if it is possible to make the bearing small in size, it is necessary to use a bearing that is specially high in mechanical strength.

Also, in this embodiment, the boss 403a of the hub flange 403 is inserted into the hollow cap 413b of the first input plate 413. As a result, the axial dimension of the overall damper device 401 is shortened. Furthermore, in this structure, since the bearing 417 causes the inner circumferential portion of the first input plate 413 interposed to the outer circumference of the boss 403a, the diametrical dimension of the bearing 417 may be further reduced. Thus, the cost is reduced.

The first inertia member 442 is provided on the transmission side of the flange 403b of the hub flange 403. The first inertia member 442 is a disc-like member for covering the transmission side of the second input plate 414. The inner circumferential edge of the first inertia member 442 is fixed to the flange 403b and the driven plate 419 by the rivets 423. A second inertia member 444 is fixed to the first inertia member 442 on the transmission side by rivets 443. The second inertia member 444 is a disc-like member that is in contact with the first inertia member 442 entirely on the transmission side. The provision of the first inertia member 442 and the second inertia member 444 increases the inertia moment of the output mechanism. Since the first and second inertia members are disc-like members, the axial dimension of the overall damper mechanism 401 is reduced. Furthermore, a ring gear 411 for starting the engine is welded to the outer circumference of the first inertia member 442. The ring gear 411 is the member welded on the outer circumference of the ring member 408 in the conventional manner. However, according to this embodiment, it is moved from the input mechanism to the output mechanism, it is possible to increase the inertia moment of the output mechanism with ease. If the inertia moment of the output mechanism is increased, it is possible to reduce the resonance frequency in the drive system including the damper device 401 not more than the idle RPM of the automotive vehicle (i.e., practical RPM). The conventionally used ring gear 411 is used to reduce the cost.

The vibration attenuating spring described with respect to the ninth through fifteenth embodiments may also be used in this damper mechanism 401.

NINETEENTH EMBODIMENT

Figure 32:
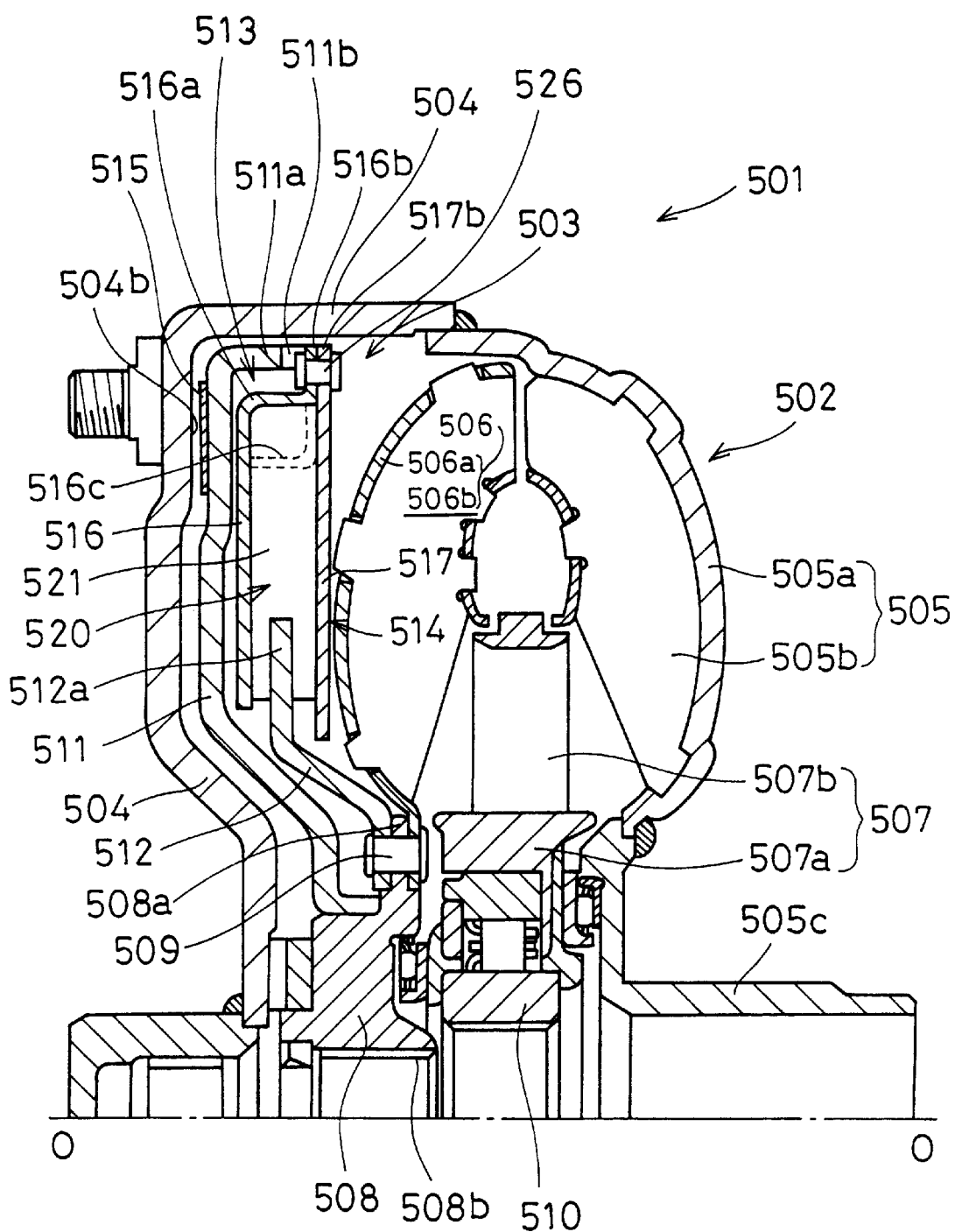
FIG. 32 is a longitudinal sectional view showing a torque convertor having a vibration attenuating spring in accordance with a nineteenth embodiment of the present invention.

A nineteenth embodiment of the present invention Is shown in FIG. 32. In FIG. 32, a torque convertor 501 has a center line O—O which denotes the rotary axis of the torque convertor 501. An engine (not shown) is disposed on the left side of FIG. 32 and the transmission (not shown) is disposed on the right side of the drawing.

The torque convertor 501 is mainly composed of a torque convertor body 502 and a lockup device 503. A front cover 504 coupled to the engine member (not shown) has at its outer circumference a cylindrical projection 504a projecting toward the transmission. The projection 504a is fixed to an impeller shell 505a. The front cover 504 forms the working oil chamber filled with the working oil in its interior together with the impeller shell 505a.

The torque convertor body 502 is mainly composed of the impeller 505, a turbine 506 driven by the flow of the fluid from the impeller 505, and a stator 507.

The inner circumferential edge of the impeller shell 505a of the impeller 505 is fixed to the impeller hub 505c. A plurality of impeller blades 505b are fixed to the interior of the impeller shell 505a. The turbine 506 is disposed at a diametrically opposite position to the impeller 505. The turbine 506 is composed of a turbine shell 506a, and a plurality of turbine blades 506b fixed to the turbine shell 506a. The inner circumferential edge of the turbine shell 506a is fixed to the flange portion 508a of the turbine hub 508 by a plurality of rivets 509. The turbine hub 508 has, on the inner circumferential side, a spline hole 508b engaged with the input shaft (not shown) of the transmission.

The stator 507 is interposed between the inner circumferential portion of the impeller 505 and the inner circumferential portion of the turbine 506 The stator 507 is used to adjust the direction of the working oil to be returned from the turbine 506 to the impeller 505 to thereby increase the torque. The stator 507 is composed of an annular stator carrier 507a and a plurality of stator blades 507b provided on the outer circumferential surface of the stator carrier 507a. The stator carrier 507a is coupled with the inner race 510 through a one-way clutch mechanism. The inner race 510 is connected to the stationary shaft (not shown) extending from the transmission side.

The lockup device 503 is interposed between the front cover 504 and the turbine 506. The lockup device 503 is composed of a disc-like piston 511 and a damper mechanism 514.

The radially inward circumferential edge of the piston 511 is supported to the outer circumferential surface of the turbine hub 508 so that the piston 511 is slidable in the axial direction and in the circumferential direction. An annular frictional member 515 is attached to the surface, facing the frictional surface 504b of the front cover 504, of the outer circumferential portion of the piston 511. The piston 511 has, at its outer circumferential edge, an sleeve-like outer circumferential wall 511a extending rearwardly in the axial direction (in the right direction of FIG. 32). A plurality of cutaways 511b are formed at equal intervals in the circumferential direction in the outer circumferential wall 511a.

The damper mechanism 514 is mainly composed of a pair of first and second side plates 516 and 517 disposed at a predetermined interval in the axial direction, a driven plate 512 and a pair of vibration attenuating springs 521.

The first side plate 516 has, in its outer circumferential portion, a cylindrical wall 516a fixed to the outer circumferential edge of the second side plate 517 and extending toward the transmission. Also, two retainer portions 516c machined by drawing work inwardly are formed at radially opposite positions in the cylindrical wall 516a. The first side plate 516 and 517 have the projections 516b and 517b projecting radially outwardly at a predetermined interval in the circumferential direction, at the position where the cylindrical wall 516a is in contact with the second side plate 517. The projections 516b and 517b are fixed to each other by a plurality of rivets 526 and slidably engaged with cutaway portions 511b of the piston 511 in the axial direction.

Thus, the first side plate 516 and the second side plate 517 form an annular spring receiving chamber 520 sealed at the outer circumferential portions. The pair of vibration attenuating springs 521 and the driven plate 512 are received in the annular spring receiving chamber 520.

The driven plate 512 is a disc-like member in which two projections 512a projecting radially outwardly are formed at radially opposite two positions corresponding to the retainer portion 516c. The inner circumferential edge of the driven plate 512 is fixed to the flange portion 508a of the turbine hub 508 by rivets 509.

The interior of the annular spring receiving chamber 520 is divided into a pair of arcuate chambers by the retainer portions 516c of the first side plate 516 and the projections 512a of the driven plate 512. The vibration attenuating springs 521 are disposed in the respective arcuate chambers. The structure and effect of the vibration attenuating spring 521 are the same as those of the eighth embodiment, and therefore, the explanation therefor will be omitted.

It is possible to install any of the vibration attenuating springs disclosed in the ninth to fifteenth embodiments in the torque convertor 501.

In the vibration attenuating spring according to the present invention, with the simple spring elements composed of the leaf springs and the elastic members, the conventional spring member and friction generating mechanism may be realized. It is possible to obtain the high performance with a high function with a simple structure.

TWENTIETH EMBODIMENT

Figure 33:
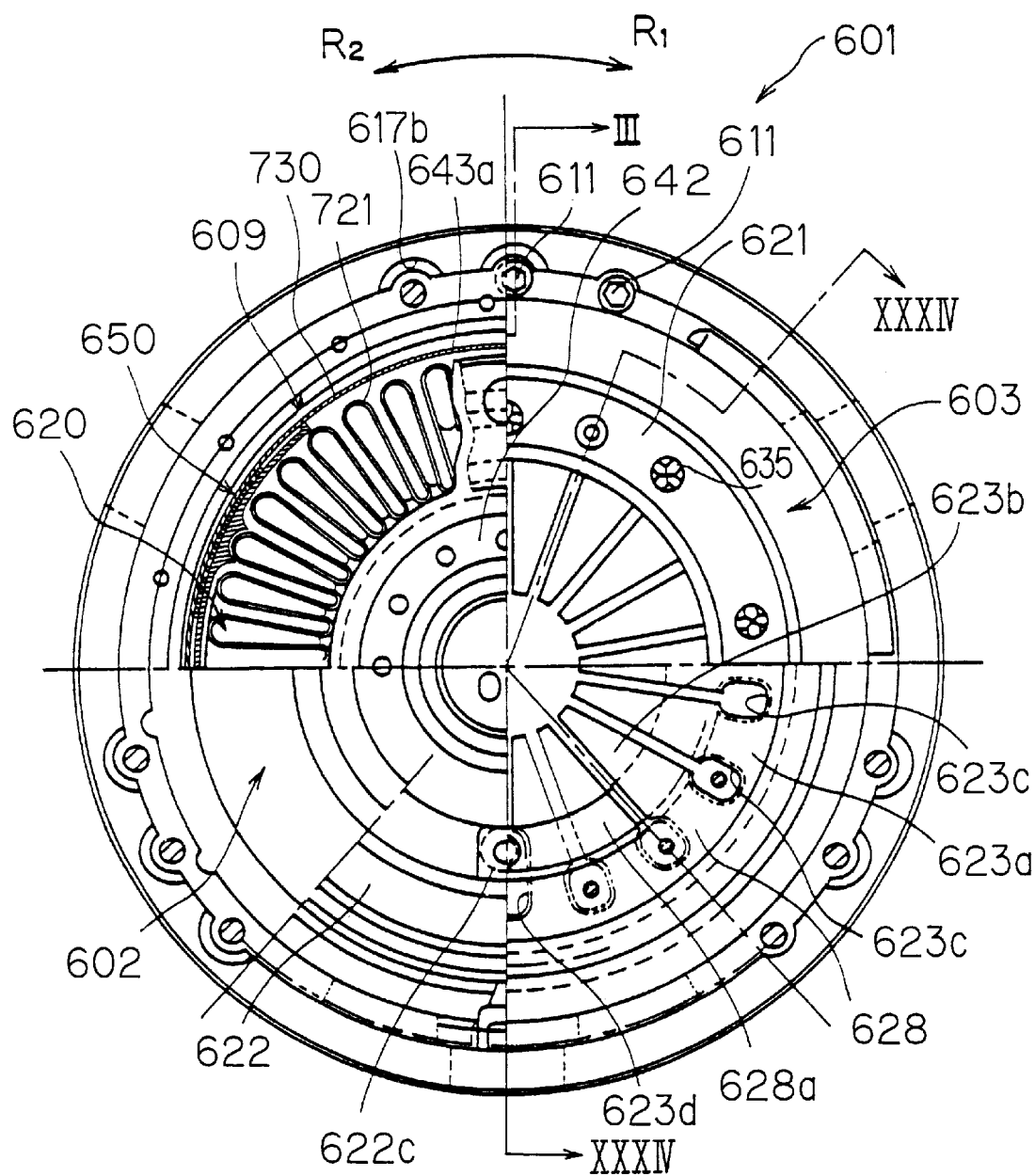
FIG. 33 is a multiple cutaway view showing details of a clutch mechanism in which a vibration attenuating spring is installed in accordance with a twentieth embodiment of the present invention.
Figure 34:
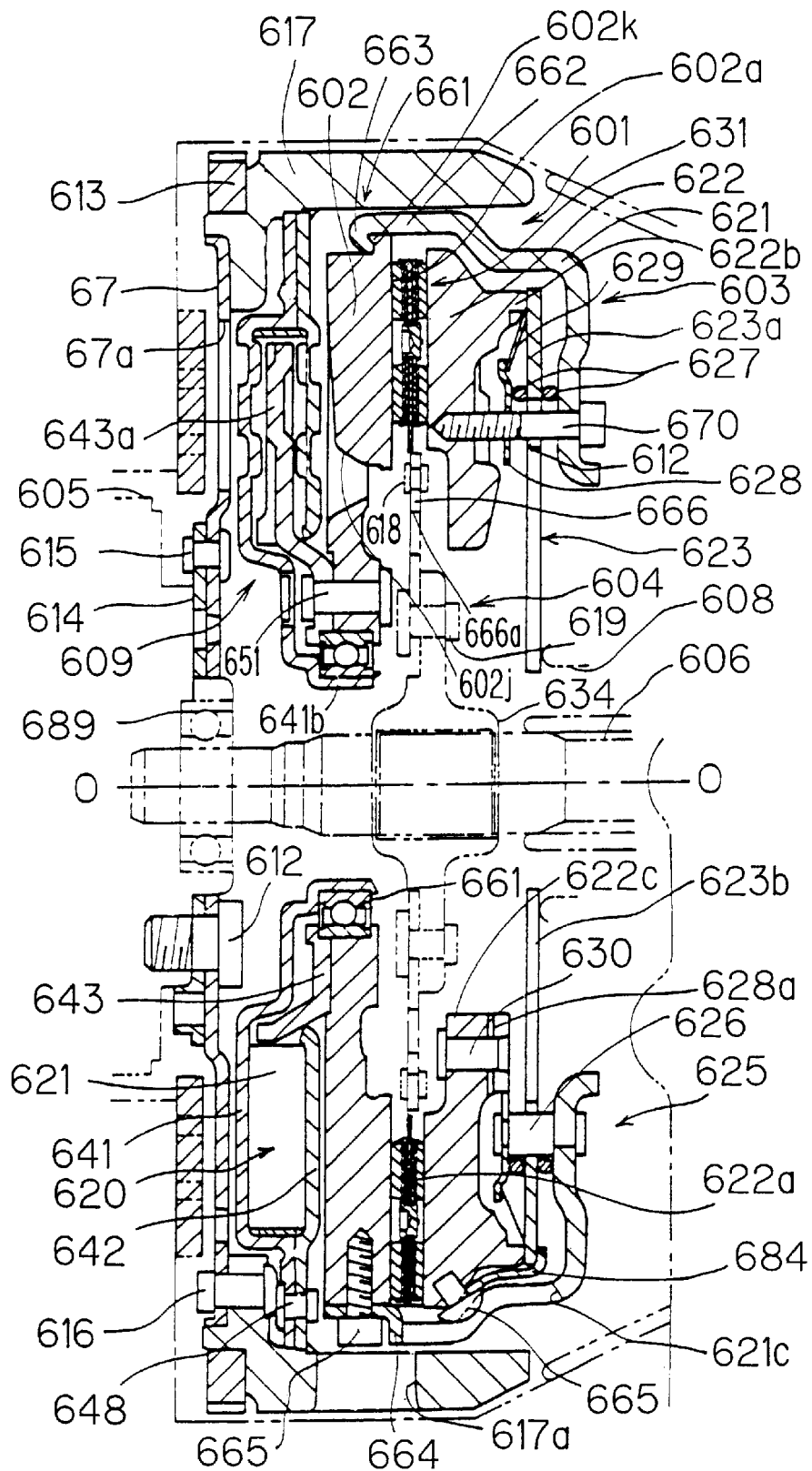
FIG. 34 is a cross-sectional view taken along the line XXXIV—XXXIV in FIG. 33.
Figure 35:
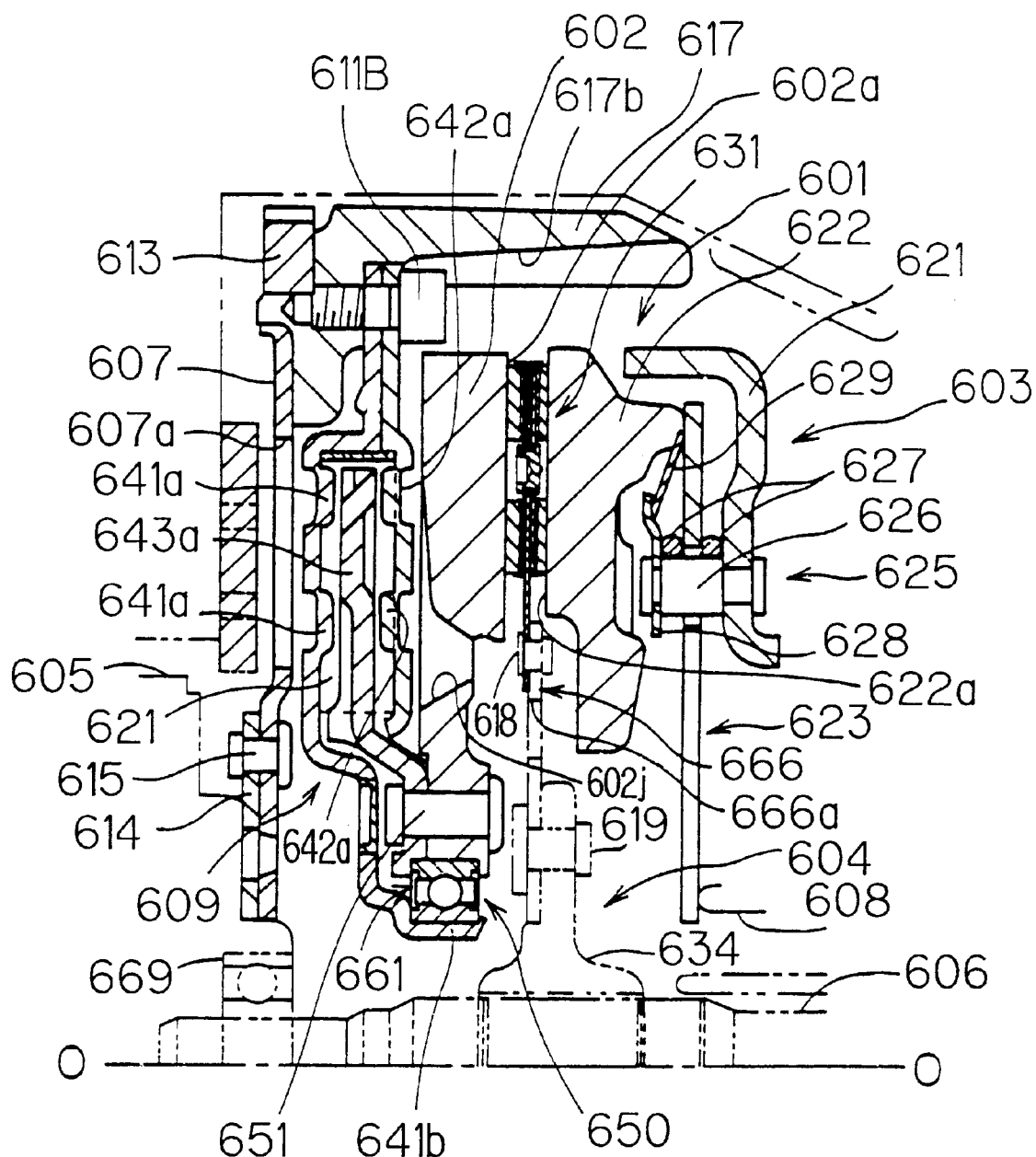
FIG. 35 is a cross-sectional view taken along the line XXXV–O in FIG. 33.

A twentieth embodiment of the present invention is shown in FIGS. 33 through 47. A modular clutch 601 shown in FIGS. 33 to 35 is mainly composed of a flexible plate 607, an inertia member 617, a second flywheel 602, a clutch cover assembly 603, a clutch disc assembly 604, and a damper mechanism 609. An engine (not shown) is disposed on the left side of FIGS. 34 and 35, and a transmission (not shown) is disposed on the right side. The left side of FIGS.

34 and 35 will hereinafter be referred to as the engine side and the right side as the transmission side for orientation purposes.

The modular clutch 601 is a device for selectively transmitting torque from a crankshaft 605 of the engine to a main drive shaft 606 extending from the transmission side. In FIGS. 34 and 35, the line O—O denotes a rotary axis of the modular clutch 601.

A flexible plate 607 and an inertia member 617 (first flywheel) are provided at an end of the crankshaft 605. The flexible plate 607 is a disc-like pressed plate member, and a disc-like plate member 614 is fixed to the inner circumferential portion of the flexible plate 607 by rivets 615. The inner circumferential portion of the flexible plate 607 is fixed to the crankshaft 605 on the engine side together with a plate member 614 by a plurality of bolts 612 arranged in the circumferential direction. A plurality of round holes 607a are formed at equal intervals in the circumferential direction in an intermediate portion, in the radial direction, of the flexible plate 607. The flexible plate 607 has a high rigidity in the circumferential direction but may be elastically flexible in the bending direction (about the end of the crankshaft 605).

The inertia member 617 is fixed to the outer circumferential periphery of the flexible plate 607 by rivets 616. The inertia member 617 is a sleeve-like member extending long in the axial direction. Also, a ring gear 613 is fixed to the inertia member 617. Three operating holes 617a are formed at equal intervals in the circumferential direction for communicating the inner circumferential side and the outer circumferential side.

Thus, the flexible plate 607 and the inertia member 617 are provided on the crankshaft 605 side in advance, and the rest portion of the modular clutch 601 is mounted relative to these components.

The damper mechanism 609 is mainly composed of a first input plate 641 and a second input plate 642 which are used as an input member (first rotary member), a driven member 643 which is used as an output member (second rotary member), a vibration attenuating spring 721 disposed between the input member and the output member for performing the torque transmission and the vibration attenuation, and a sliding frictional resistance reducing mechanism disposed on an outer circumferential portion of the spring. The first input plate 641 is a disc-like pressed plate member disposed on a side of the flexible plate 607. The outer circumferential portion of the first input plate 641 is in contact with the inner circumferential surface of the inertia member 617. Also, the intermediate portion, in the radial direction, of the first input plate 641 becomes a projection projecting toward the transmission to form an annular recess as viewed from the transmission side. The second input plate 642 is a disc-like pressed plate member disposed on the side of the first input plate 641. An outer circumferential edge of the second input plate 642 is in contact with the inner circumferential surface of the inertia member 617. Also, the outer circumferential portion of the second input plate 642 and the outer circumferential portion of the first input plate 641 are in contact with each other and are fixed to each other by rivets 648. The inner circumferential portion of the first input plate 641 extends inwardly beyond the inner circumference of the second input plate 642. The inner circumferential portion of the first input plate 641 is formed on the transmission side into an inner circumferential projection 641b projecting in the form of a sleeve.

Moreover, the outer circumferential portions of the first and second input plates 641 and 642 are fixed to the inertia member 617 by three bolts 611 at three positions at equal intervals in the circumferential direction. The bolts 611 are installed from the transmission side. Also, grooves 617b are formed in the inertia member 617 at positions corresponding to the respective bolts 611.

Arcuate spaces formed by the annular recess portion of the first input plate 641 and the second input plate 642 define damper receiving chambers 620. A sleeve-shaped support ring 730 is disposed around the outer circumferential of the damper receiving chamber 620. The support ring 730 is formed so as to be rotated together with the first and second plates 641 and 642 as the first rotary member. The support ring 730 forms an outer circumferential inner wall of the damper receiving chamber 620, but the support ring 730 is optional. It is also possible to form the outer circumferential inner wall of the damper receiving chamber 620 by the first and second input plates 641 and 642 and dispensing with the support ring 730. A pair of inner walls of sides of the damper receiving chamber 620 are formed by the first input plate 641 and the second input plate 642. The pair of vibration attenuating springs 721 and a sliding frictional resistance reducing mechanism 650 are disposed within the damper receiving chamber 620.

Figure 36:
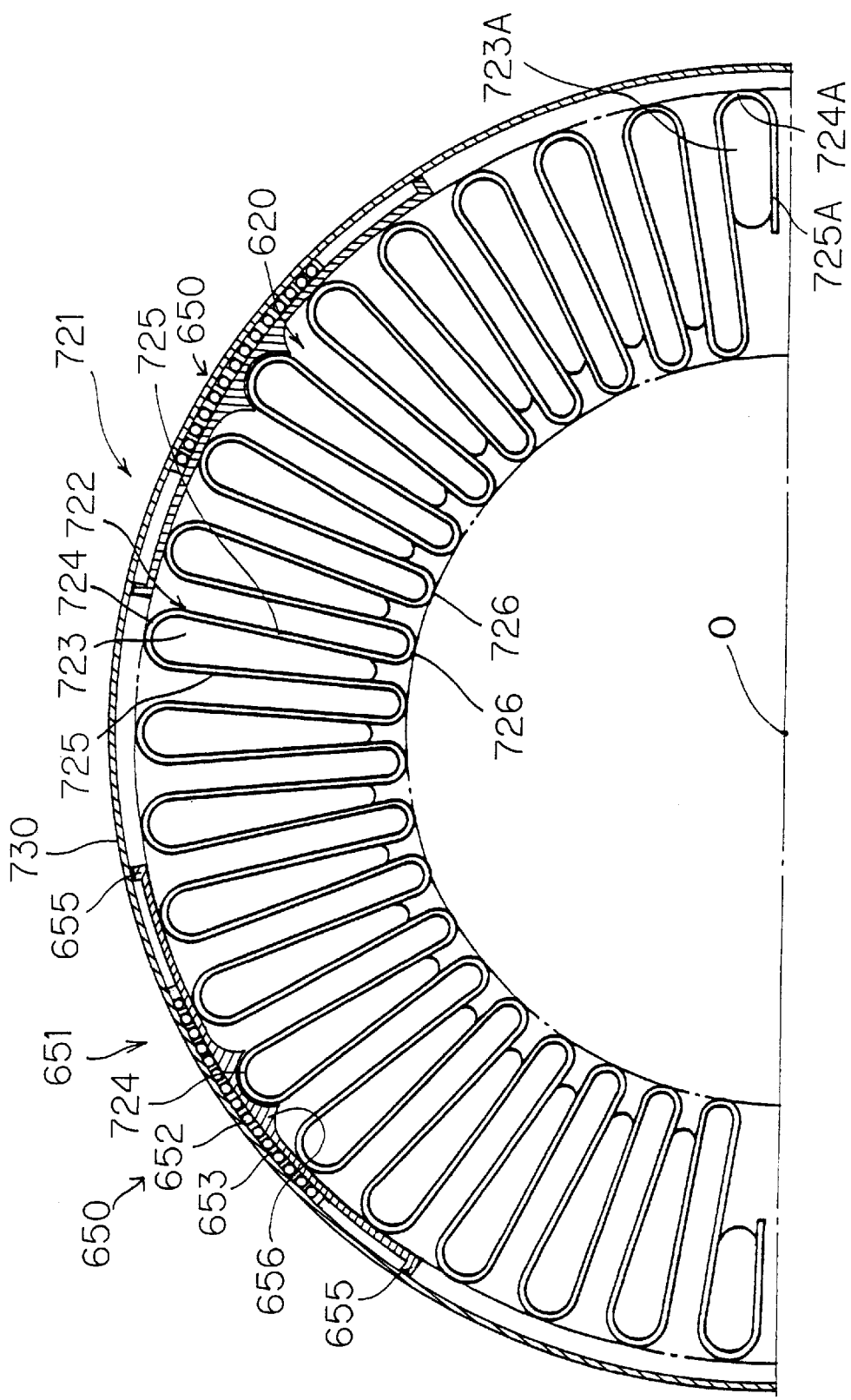
FIG. 36 is a fragmentary cross-sectional view showing the vibration attenuating spring depicted in FIGS. 33, 34 and 35, with portions of the clutch mechanism removed for clarity.

The vibration attenuating spring 721 disposed in the damper receiving chamber 620 is described below. The vibration attenuating spring 721 forms a damper for attenuating twist vibrations caused by the torque variation of the engine as well as transmitting the torque in the damper mechanism 609. As shown in FIG. 36, the vibration attenuating spring 721 is disposed in the damper receiving chamber 620 in such a state that the vibration attenuating spring 721 is bent in the form of arcuate shape. The vibration attenuating springs 721 may extend in the linear direction or in the arcuate shape in a free condition. The vibration attenuating springs 721 is composed of a leaf spring 722 extending in the circumferential direction and a plurality of elastic members 723 provided in the leaf spring 722. The leaf spring 722 is formed of metal, specifically, spring steel. The leaf spring 722 extends through about 180° in the circumferential direction by alternatively folding a single elongated ribbon-shaped member. As shown in FIGS. 36 to 39, since the leaf spring 722 is formed by bending the elongated ribbon-shaped member alternatively, the leaf spring 122 is composed of a plurality of radially outwardly bent first portions 724, a plurality of radially inwardly bent second portions 726 and a plurality of lever portions 725 connecting the first and second bent portions 724 and 726 to each other. The leaf spring 722 has a constant width W and a constant thickness T over the full length thereof. A length L of the lever portions 725 of the leaf spring 722 in the longitudinal direction (in the radial direction) is equal to or somewhat shorter than the radial length of the damper receiving chamber 620. The width W of the leaf spring 722 is somewhat smaller than or substantially equal to the dimension of the axial direction of the damper receiving chamber 620. A diameter of the first bent portions 724 is greater than that of the second bent portions 726. Also, a pair of lever portions 725 extend from the individual bent portions 724 or 726 extend in a linear form toward the opposite bent portions 724 or 726 and are slanted to be gradually close to each other toward the opposite bent portions 724 or 726.

Figure 37:
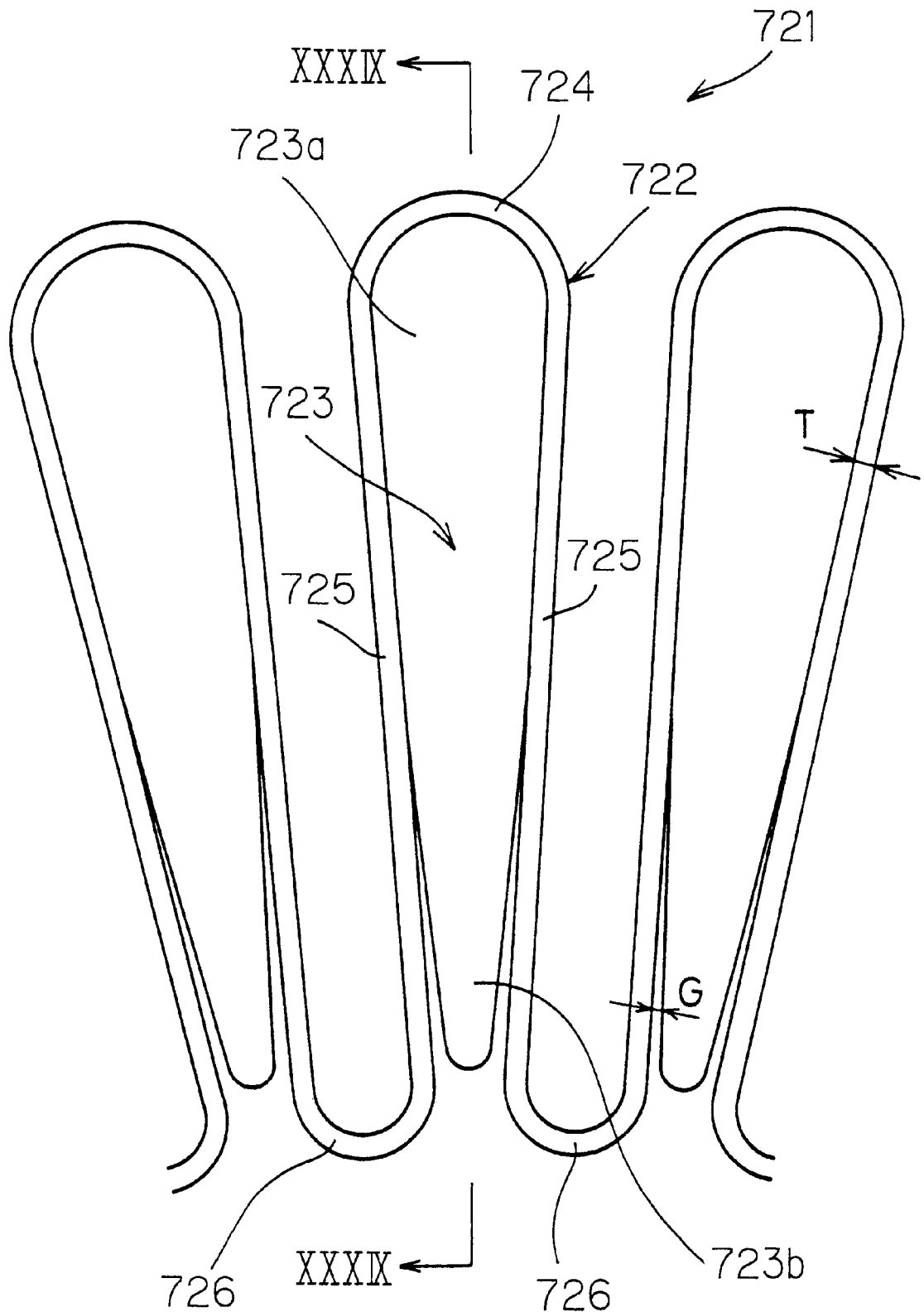
FIG. 37 is a fragmentary, view of a portion of the vibration attenuating spring depicted in FIG. 36, shown on an enlarged scale.
Figure 38:
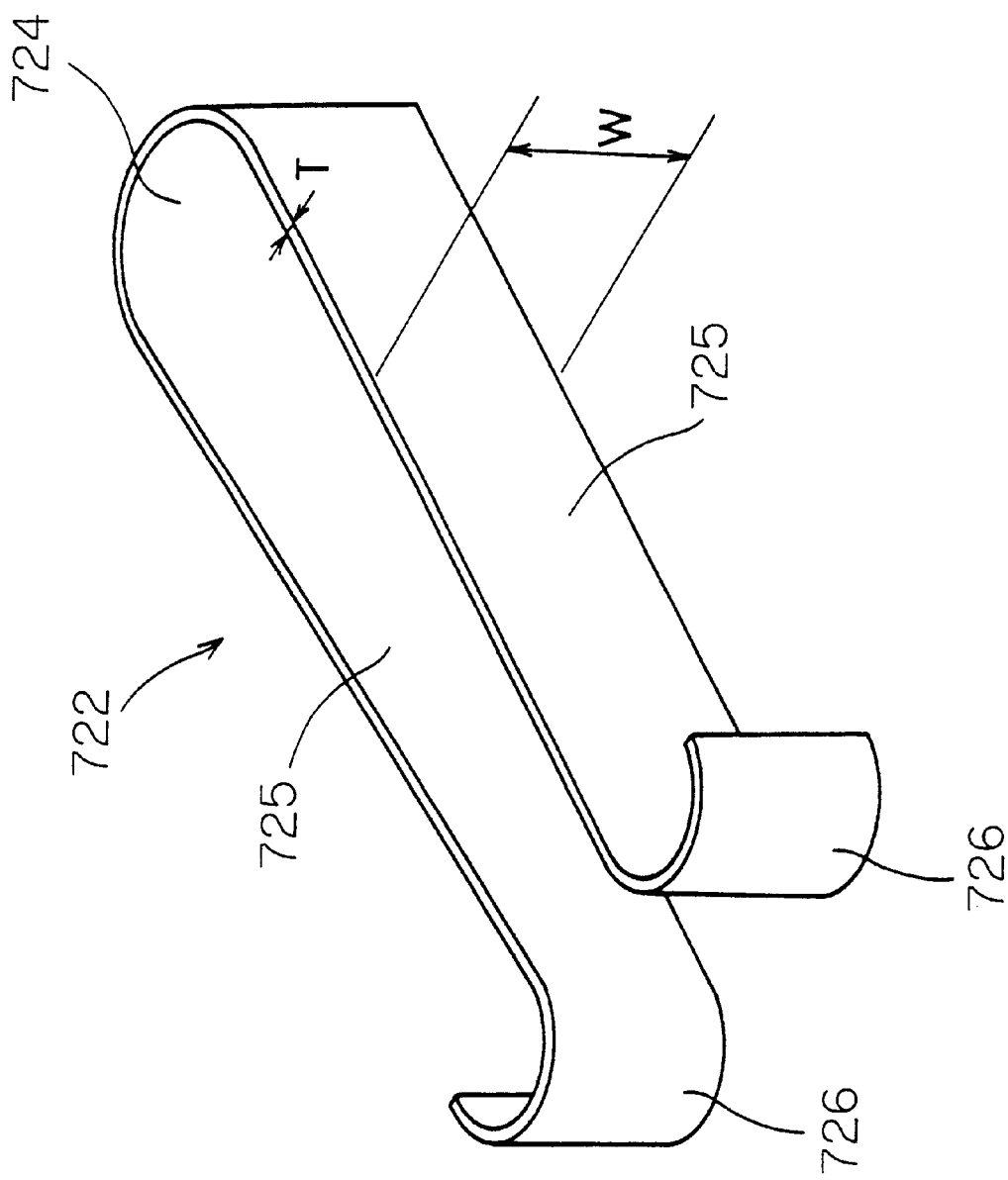
FIG. 38 is a fragmentary perspective view showing details of the vibration attenuating spring depicted in FIGS. 36 and 37.

The plurality of elastic members 723 are disposed inside of the first bent portions 724, i.e., between the pair of the associated lever portions 725 extending from both ends of the first bent portions 724. The elastic members 723 are made of, for example, rubber, and are molded to the inner surfaces, on the bent portions 724, of the leaf spring 722. The elastic members 723 extend radially at a full length along the lever portions 725 on both sides. As shown in FIG. 37, each of the elastic members 723 has the portion, on the bent portion 724, defined by the contact portion 723a and the portion extending from the contact portion 723a in a direction in which the lever portions 725 extend, defined by the projecting portion 723b. The contact portion 723a is in the form along the bent portions 724 and is molded to the inner surface of the bent portions 724 and the sides of the lever portions 725 on the bent portion 724 side. A gap G is defined between each of the pair of lever portions 725 and the projecting portion 723b on either side. The width, in the circumferential direction, of the projecting portion 723b gradually decreases moving toward the end thereof, and the gap G between the projecting portion 723b and each lever portion 725 is gradually larger toward the end of the projecting portion 723b.

Figure 39:
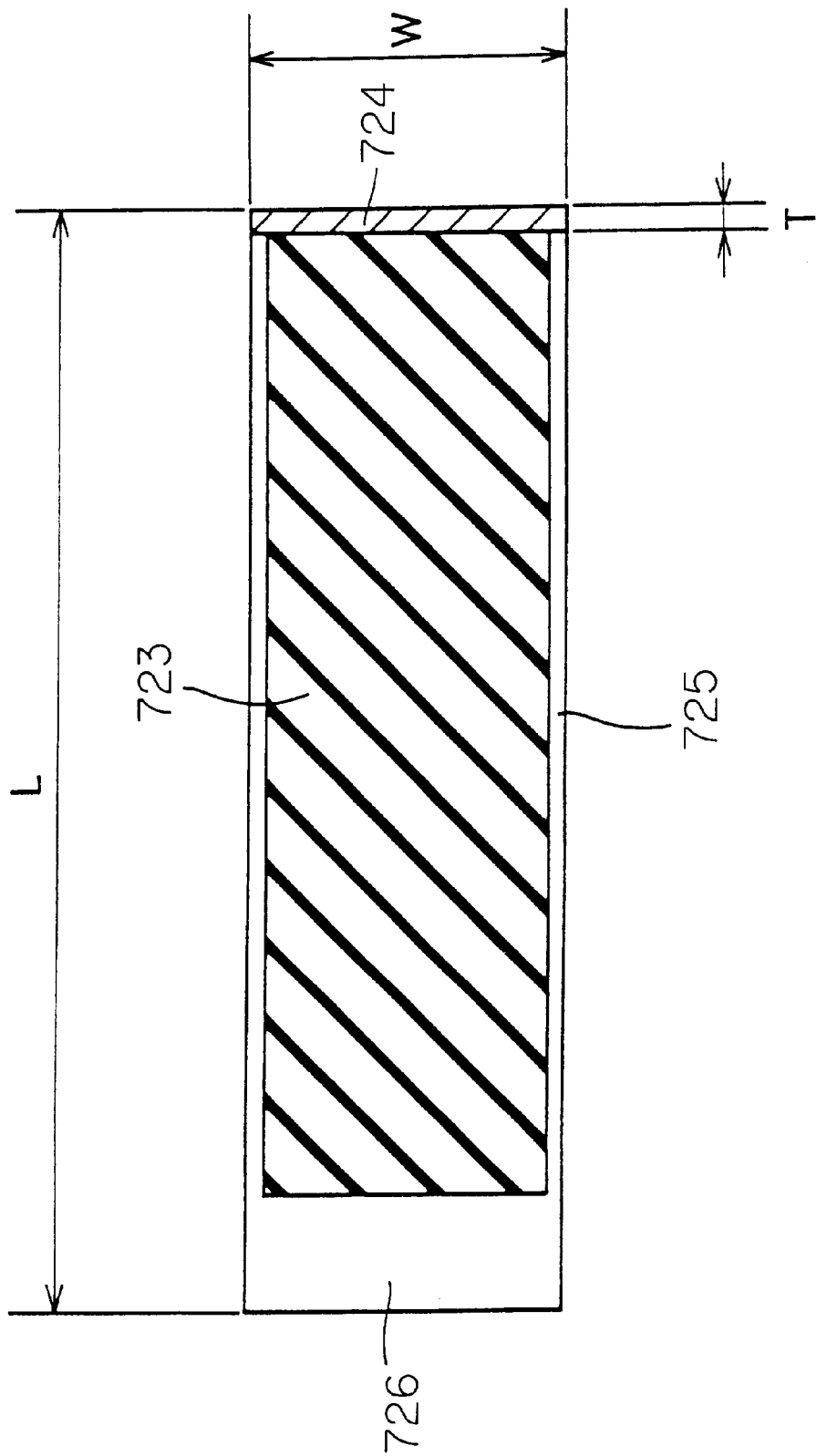
FIG. 39 is a cross-sectional view taken along the line XXXIX—XXXIX of FIG. 37.
Figure 42:
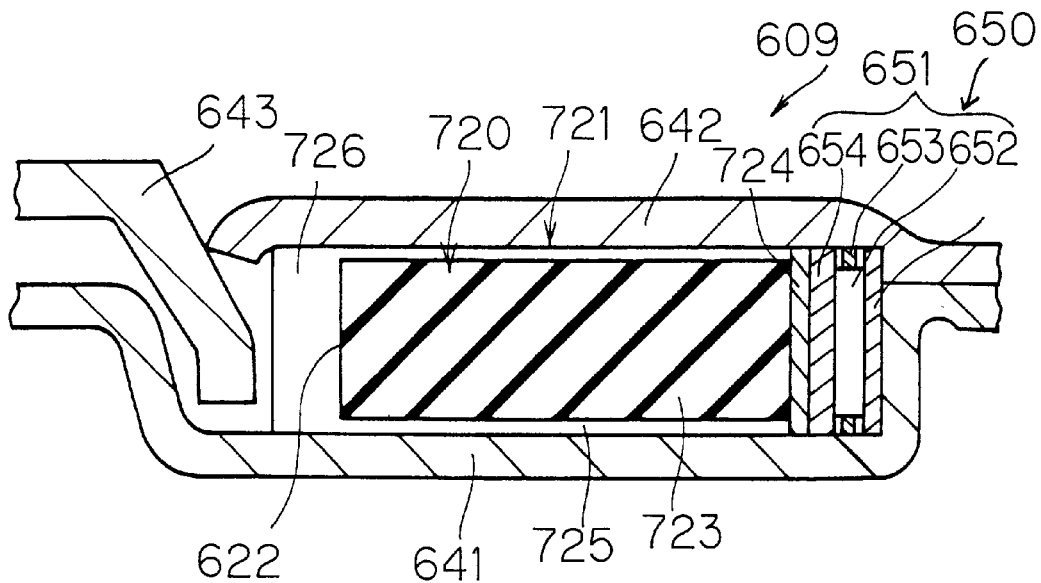
FIG. 42 is a fragmentary, cross-sectional view showing another operational condition of the vibration attenuating spring within portions of the clutch mechanism depicted in FIGS. 33–39.

As shown in FIG. 39, a width, in the width W direction, of the elastic member 723 is somewhat shorter than that of the leaf spring 722. For this reason, as shown in FIG. 42, the end faces, in the axial direction, of the elastic member 723 are close to the inner walls on both sides of the elastic member 723, i.e., the first and second input plates 641 and 642. The elastic member 723 has substantially the same length in the width W direction as that of the leaf spring 722 and may be in contact with the first and second input plates 641 and 642.

The vibration attenuating spring 721 may alternatively be formed with a plurality of spring elements, such as that shown in FIG. 1 where a single first bent portion, a pair of lever portions and a single elastic member are connected to act in series in the circumferential direction. The individual spring element is an independent member. A plurality of independent spring elements may be connected to act in series.

Returning to the embodiment depicted in FIGS. 33 through 47, in the vibration attenuating spring 721 described above, the first bent portions 724 having a high rigidity due to the arrangement of the elastic members 723 and the second bent portions 726 having a low rigidity due to the lack of elastic members 723 are arranged in series in an alternating manner.

Referring to FIG. 36, at each end of the two opposite ends of each vibration attenuating spring 721, the lever portion 725A extends from the radially outwardly bent portion 724A to the intermediate portion, in the radial direction, of the regular lever portion, and the elastic member 723A having substantially the same length as that of the shorter lever portion 725A is disposed in the radially outwardly bent portion 724A. Incidentally, the lever portions at both ends in the circumferential direction may extend to the radially inward side and the radial dimension of the elastic members at both ends in the circumferential direction may extend in the same manner as the other elastic members.

The sliding frictional resistance reducing mechanism 650 is a mechanism for reducing a frictional resistance between the vibration attenuating spring 721 and the outer circumferential inner wall (support ring 730) of the damper receiving chamber 620 particularly for the purpose of avoiding the degradation of the minute twist vibration reducing function while suppressing the generation of the large sliding frictional resistance when the minute twist vibrations caused by fluctuations and changes in combustion of the engine. The sliding frictional resistance reducing mechanism 650 is composed of a plurality of needle bearings 651 arranged between the outer circumference of the vibration attenuating spring 721 and the outer circumferential inner wall (support ring 730) of the damper receiving chamber 620. Two needle bearings 51 are arranged for each vibration attenuating spring 721, that is, four needle bearings are arranged in total.

As shown in detail in FIGS. 44, 45, 46 and 47, each needle bearing 51 is composed of a plurality of metallic rollers 652, a retainer 653 for rotatably support the rollers 652, and a retainer 654 fixed to the outer circumferential bent portion of the bent leaf spring 619, for supporting the rollers 652 and the retainer 653.

The rollers 652 are formed into cylindrical shapes extending in the axial direction and have a rotary axis extending in the axial direction of the flywheel. The retainer 653 is formed into a plate-shape extending in an arcuate manner with a plurality of roller receiving holes 653a. The rollers 652 are rotatably arranged within the roller receiving holes 653a of the retainer 653. Also, the rollers 652 project outwardly beyond the inner circumferential surface and the outer circumferential surface of the retainer 653. The retainer 654 is made of metal and extends long in the circumferential direction in an arcuate manner beyond the retainer 653. The retainer 654 is arranged inside the retainer 653. The rollers 652 are in contact with the outer circumferential surface of the retainer 654. Incidentally, the rollers 652 are also in contact with the outer circumferential inner wall of the damper receiving chamber 620. The retainer 654 has limit portions 655 for limiting the movement of the retainer 653 on both sides in the circumferential direction. A gap in the circumferential direction is kept between both ends in the circumferential direction of the retainer 653 and the limit portions 655 in a free condition. Also, support projections 656 engaged not to be rotatable relative to the bent portions 724 of the leaf spring 722 are formed on the inner circumferential side of the retainer 654.

With such an arrangement described above, the needle bearing 651 follows the compression motion in the circumferential direction of the vibration attenuating spring 721 and is slidable to the outer circumferential inner wall. The rollers 652 are moved in the circumferential direction together with the retainer 653 while rotating between the support ring 730 and the retainer 654. In the conventional example in which the bent leaf spring is in direct contact with the outer circumferential inner wall, a large sliding frictional resistance is generated. In contract, according to the invention, by replacing the conventional sliding friction by the rolling friction, it is possible to realize a large friction reduction. As a result, no waste frictional resistance is generated when the minute vibrations are transmitted. The vibration attenuating performance is enhanced.

The driven member 643 is a disc-like member having a pair of engagement portions 643a extending radially outwardly and integrally from the disc-like portion. The two engagement portions 643a extend in the damder receiving chamber 620 at two diametrically opposite positions. The engagement portions 643a are in contact with both ends, respectively in the circumferential direction, of the pair of vibration attenuating springs 721. Also, the first and second input plates 641 and 642 have support portions 641a and 642a projecting at two radially opposite positions in the axial direction and come into contact with both ends, in the circumferential direction, of the vibration attenuating springs 721.

The second flywheel 602 is disposed on the transmission side inside of the inertia member 617. The second flywheel

602 has a flat frictional surface 602a on the transmission side at its outer circumferential portion. Also, communication holes 602j are formed in the second flywheel 602 for communicating both surfaces on the inner circumferential side of the frictional surface 602a. The driven member 643 is fixed to the inner circumferential edge of the flywheel 602 by rivets 660. The inner circumferential portions of the second flywheel 602 and the driven member 643 are supported to the inner circumferential projections 641b of the first input plate 641 through bearings 661. Three engagement portions 602k are formed at three positions at equal intervals in the circumferential direction, on the engine side, on the outer circumferential surface of the flywheel 602. The engagement portions 602k project radially outwardly (see FIG. 34). Also, the end portion, on the engine side, of each of the engagement portions 602k is slanted to be deepened radially inwardly.

The clutch cover assembly 603 is mainly composed of a clutch cover 621, a pressure plate 622, a diaphragm spring 623, a coupling plate 628, stud pins 626, two wire rings 627 and a conical spring 629.

The clutch cover 621 is a dish-like plate having a large hole in the middle and has three extension portions 662 extending toward the flywheel 602 at three positions at equal intervals in the circumferential direction on its outer circumferential portion and having a predetermined width. An inwardly bent portion 663 is formed at an end of each extension portion 662. The bent portion 663 is engaged with the associated engagement portion 602k of the second flywheel 602. Thus, the clutch cover 621 is unmovable toward the transmission relative to the flywheel 602. Also, a cutaway extending in the circumferential direction is formed at the end of the extension portion 662. A plate 664 is fixed to the outer circumferential surface 602b of the second flywheel 602 by a bolt 665. Thus, the clutch cover 621 is unrotatable relative to the flywheel 602. Also, the bolt seat for the flywheel 602 is dispensed with so that the flywheel 602 is smaller in the radial direction.

The pressure plate 622 is an annular member disposed within the clutch cover 621. A pressure surface 622a confronting the frictional surface 602a of the flywheel 602 is formed in the pressure plate 622. Also, an annular projection portion 622b projecting toward the transmission is formed in the surface, opposite the pressure surface 622a, of the pressure plate 622. Furthermore, the flange portions 622c extending radially inwardly are formed in the pressure plate 622.

The diaphragm spring 623 is a disc-like member which is disposed between the bottom portion of the clutch cover 621 and the pressure plate 622. The diaphragm spring 623 is formed of an annular elastic portion 623a and a plurality of lever portions 623b extending inwardly from the annular portion 623a. First holes 623c are formed on the outer circumferential side between the plurality of lever portions 623b. Also, three second holes 623d are formed at three positions at equal intervals in the circumferential direction in the respective slits. The second holes 623d extend radially inwardly more than the first holes 623c and extend in the vicinity of the flange portion 622c of the pressure plate 622. The annular elastic portion 623a is supported at both sides at its inner circumferential edge by the wire rings 627 to be described later and is brought at its outer circumferential portion into contact with the annular projection portions 622b of the pressure plate 622. Under this condition, the elastic portion 623a biases the pressure plate 622 toward the flywheel 602.

A support structure 625 for supporting the diaphragm spring 623 will be described. A plurality of stud pins 626 fixed to the inner circumferential edge of the bottom portion of the clutch cover 621 extend toward the pressure plate 622 through the first holes 623c of the diaphragm spring 623. A coupling plate 628 (to be described later) is fixed to the other end of each stud pin 626. The wire rings 627 are disposed between the coupling plate 628 (to be described later) and the diaphragm spring 623 and the bottom portion of the clutch cover 621 and the diaphragm spring 623 in the outer circumferential side of each stud pin 626, respectively. Namely, the inner circumferential portion of the elastic portion 623a of the diaphragm spring 623 is clamped between the pair of wire rings 627.

The coupling plate 628 is an annular plate member. Three joint portions 628a extending in the circumferential direction R1 (FIG. 33) in the form of arcuate shapes are formed integrally with the inner circumferential portion of the coupling plate 628. An end of each joint portion 628a is fixed to a flange portion 622c of the pressure plate 622 by a rivet 622c. The position of the rivet 622c corresponds to the second hole 623d of the diaphragm spring 623. The joint portion 628a has a high rigidity in the circumferential direction but is flexible in the axial direction. The joint portion 628a biases the pressure plate 622 in a direction away from the second flywheel 602.

The conical spring 629 is disposed at the circumferential portion of the coupling plate 628. The inner circumferential edge of the conical spring 629 is supported to the coupling plate 628. The outer circumferential edge of the conical spring 629 biases the outer circumferential edge of the diaphragm spring 623, i.e., the portion, close to the annular projection portion 622b of the pressure plate 622, of the diaphragm spring 623 in a direction away from the pressure plate 622.

As described above, the coupling plate 628 connects the clutch cover 621 and the pressure plate 622 to each other and supports the conical spring 629. As described above, a plurality of functions are imparted to the coupling plate 628 to thereby reduce the number of the mechanical parts.

A plurality of retainer members 684 are fixed to the pressure plate 622 by fastening pins 665. Their first ends clamp the outer circumferential edge of the diaphragm spring 623 in corporation with the annular projection portions 622b of the pressure plate 622. Incidentally, holes 621c are formed at positions of extension portions 662 corresponding to the retainer members 684.

The clutch disc assembly 604 is mainly composed of the above-described clutch coupling portion 631, hub 634, and plate 666. The clutch coupling portion 631 is interposed between the frictional surface 602a of the flywheel 602 and the pressure surface 622a of the pressure plate 622. The hub 634 is spline engaged with the main drive shaft 606 on the engine side. The inner circumferential portion of the plate 666 is fixed to the flange of the hub 634 by rivets 619. The outer circumferential portion of the plate 666 is fixed to the clutch coupling portion 631 by rivets 618. A plurality of holes 666a are formed at equal intervals in the circumferential direction in the plate 666.

The main drive shaft 606 extending from the transmission side is supported at its end to the crankshaft 605 through a bearing 669. The release device 608 is disposed around the main drive shaft 606 to be movable in the axial direction. The release device 608 is engaged at one end with the side surface, on the transmission side, of ends of the lever portions 623b of the diaphragm spring 623. When the release device 608 is moved on the engine side to thereby move the lever portions 623b on the engine side, the biasing force from the elastic portions 623a to the pressure plate 622 is released.

Incidentally, a bolt 670 is shown in FIG. 34, however, this bolt is not used when the modular clutch 601 is used. The bolt 670 is used for the purpose of assembling or disassembling the clutch cover assembly 603 relative to the flywheel 602. A plurality of bolts 670 are threadedly engaged with the pressure plate 622 while passing through holes formed in the inner circumferential side of the bottom portion of the clutch cover 621, further passing through the first holes 623c of the diaphragm spring 623, and further passing through the coupling plate 628.

Operation

The operation of the modular clutch 601 will now be described.

When the crankshaft 605 on the engine side is rotated, a torque is transmitted through the flexible plate 607 to the modular clutch 601. Then, the torque is transmitted through the damper mechanism 609 to the flywheel 602 and is outputted to the clutch disc assembly 604. The pressure plate 622 is rotated together with the clutch cover 621 through the coupling plate 628. Since the rotational drive of the pressure plate 622 is attained by the coupling plate 628 for connecting the inner circumferential portion of the pressure plate 622 and the inner circumferential portion of the clutch cover 621, it is unnecessary to form a cutaway portion for receiving the strap plate at the outer circumferential portion of the clutch cover 621 like the conventional structure.

Since the inertia member 617 is fixed to the first and second input plates 641 and 642, it is possible to sufficiently keep the inertia moment of the input system in the input/output system of the power that is separated into the input system and the output system through the vibration attenuating spring 721. As a result, it is possible to set the resonance frequency to be less than the idle RPM of the engine. Since the inertia member 617 is disposed on the outer circumferential portion, it is possible to thin in the axial direction the first and second input plates 641 and 642 which constitute the damper receiving chambers 620. As a result, it is possible to miniaturize the modular clutch 601 as a whole in the axial direction. Furthermore, since the inertia portion 617 extends long in the axial direction, the size of the overall structure is not enlarged in the radial direction. The reason why the overall structure is not enlarged in the radial direction even if the inertia member 617 is thus provided on the outer circumferential portion of the damper mechanism 609 is that the clutch mounting seat is dispensed with from the second flywheel 602 and the inertia member 617 may be disposed more radially inwardly.

In the case where the bending vibration is transmitted from the crankshaft 605, it is possible to absorb the vibration by the warpage of the flexible plate 607 in the bending direction.

When the twist vibrations are transmitted from the engine side, in the damper mechanism 609, the first and second input plates 641 and 642 and the driven member 643 are cyclically relatively rotated. At this time, the vibration attenuating spring 721 is compressed in the circumferential direction. In this case, since the attenuating springs 721 may be regarded as a plurality of spring elements arranged in series in the circumferential direction, it is possible to obtain the characteristics of low rigidity in the wide twist angle.

Figure 40:
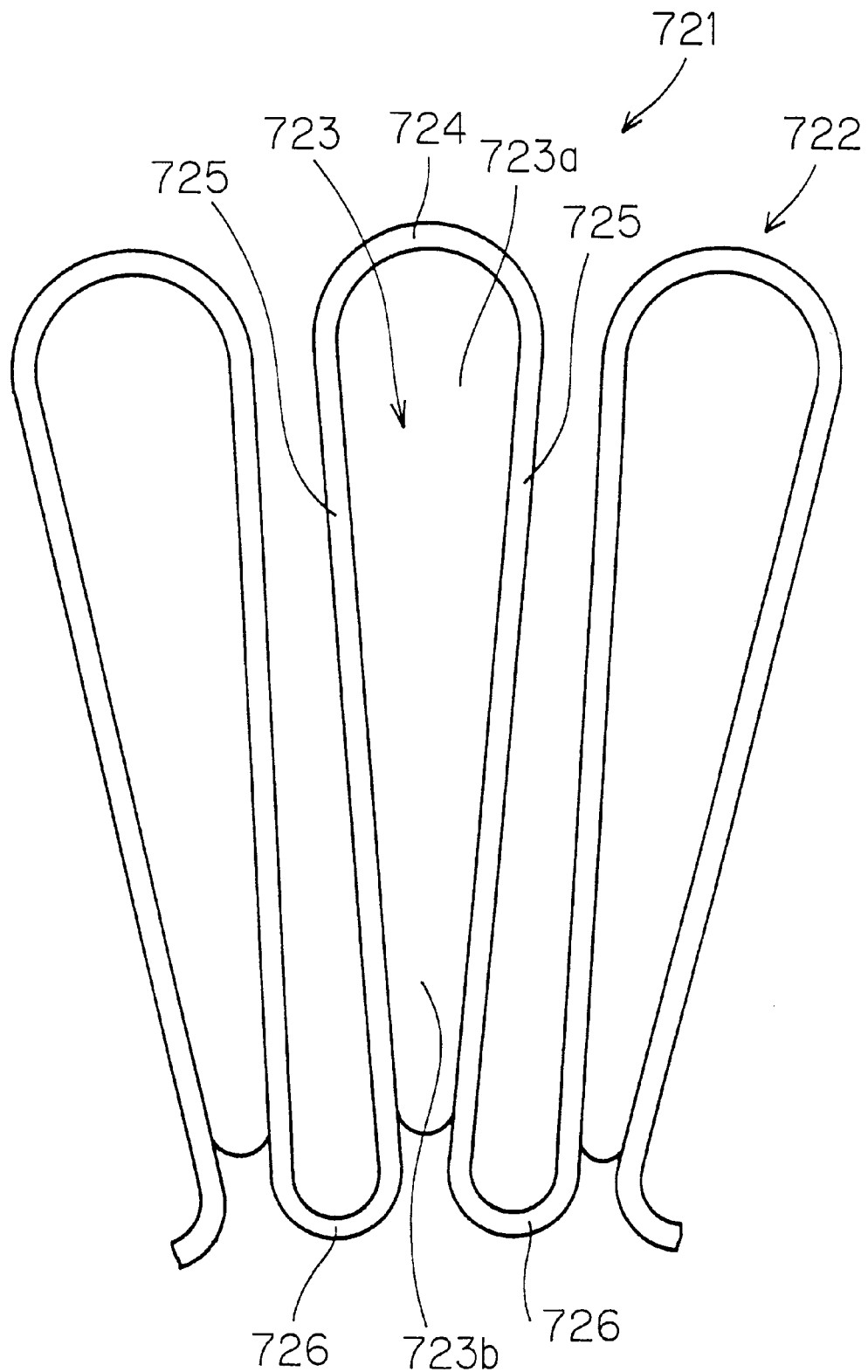
FIG. 40 is a view similar to FIG. 37, showing one operational condition of the vibration attenuating spring depicted in FIGS. 33–39.

The operation of each vibration attenuating spring 721 upon the twist vibration transmission will now be described in detail. When the minute twist vibrations caused by the torque variation of the engine are transmitted, each spring element of the vibration attenuating spring 721 is compressed in the circumferential direction from the condition shown in FIG. 37 to the condition shown in FIG. 40. In the vibration attenuating spring 721, during the shift from the position shown in FIG. 37 to the position shown in FIG. 40, the second bent portion 726 is mainly elastically deformed. The rigidity of the leaf spring at this time is low. In FIG. 40, the portions on the second bent portions 726 of the lever portions 725 are brought into contact with the projection portions 723b but the elastic members 723 are not firmly clamped by the lever portions 725 as a whole. For this reason, a large internal friction is not generated in the elastic members 723. Thus, the minute twist vibrations are hardly transmitted on the flywheel 602 side due to the low rigidity/small resistance characteristics.

In this case, the vibration attenuating spring 721 is compressed in the circumferential direction, and a force depressing in the circumferential direction due to the centrifugal force and a compression force is applied. However, the sliding frictional resistance is largely reduced, i.e., becomes very small between the outer circumferential inner wall of the damper receiving chamber 620 and the outer circumference of the vibration attenuating spring 721 by the sliding frictional resistance reducing mechanism 650 composed of the needle bearings 651. For this reason, the characteristics for reducing the minute twist vibrations are hardly degraded.

Figure 43:
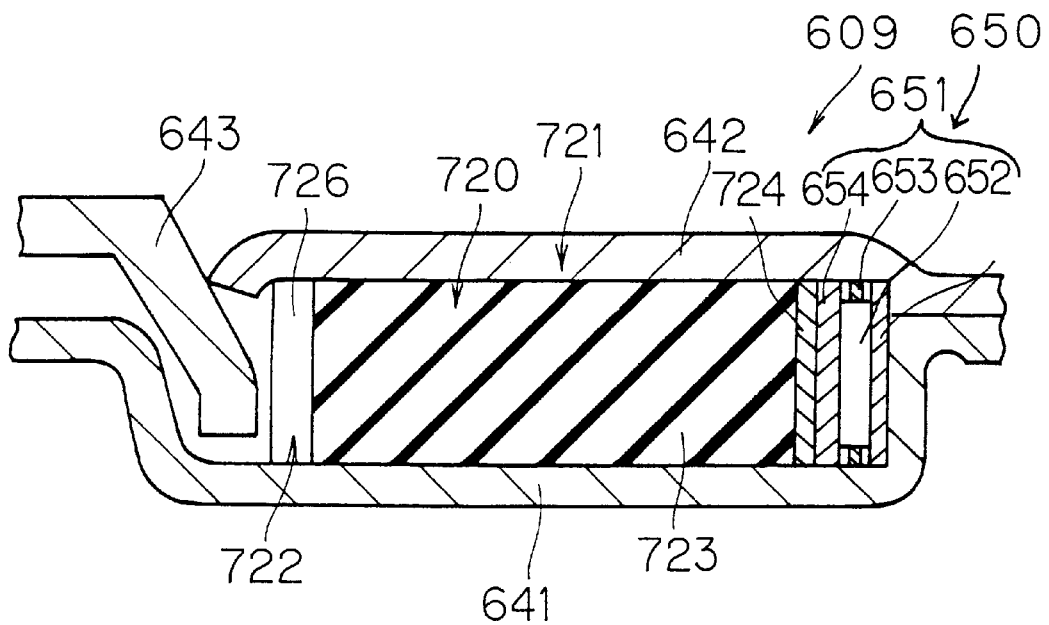
FIG. 43 is a fragmentary, cross-sectional view showing still another operational condition of the vibration attenuating spring within portions of the clutch mechanism depicted in FIGS. 33–39.
Figure 44:
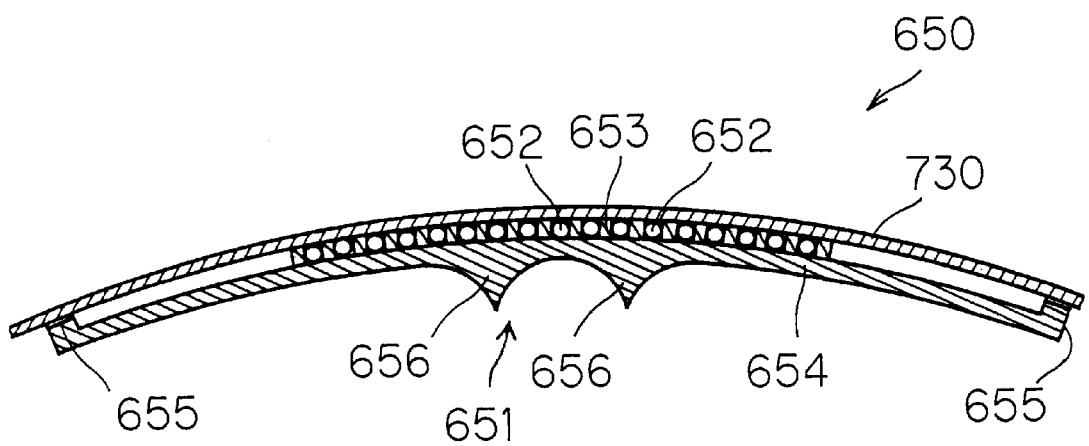
FIG. 44 is a fragmentary, cross-sectional view of the clutch mechanism depicted in FIG. 33, showing details of portions of a retainer and rollers depicted in FIG. 33, shown on an enlarged scale with portions of the clutch mechanism removed for clarity.
Figure 45:
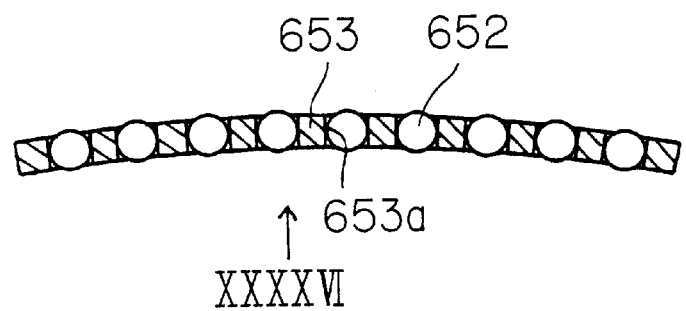
FIG. 45 is a fragmentary, cross-sectional view of the retainer and rollers depicted in FIG. 33, shown on a further enlarged scale with portions of the retainer removed for clarity.
Figure 46:
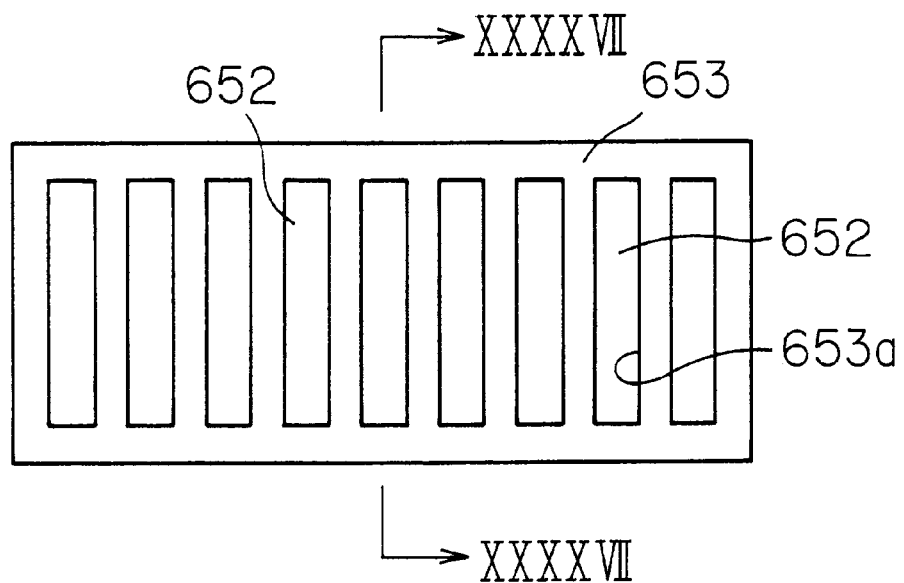
FIG. 46 is a side view of the retainer and rollers depicted in FIGS. 44 and 45 looking in the direction of the arrow XXXXVI in FIG. 45.
Figure 47:
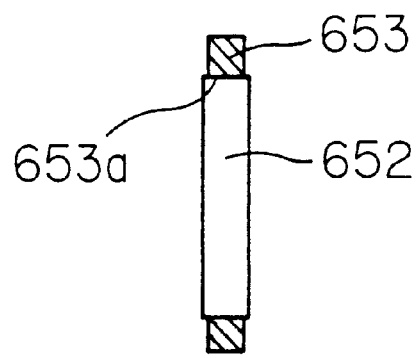
FIG. 47 is a cross-sectional view of the retainer and one roller taken along the line XXXXVII—XXXXVII in FIG. 46.

When an excessive torque change is generated in the damper mechanism 609 upon passing through the resonant point in the low RPM region, the phase angle of the vibration attenuating spring 721 is increased. In accordance with this, the rigidity of the lever portion 725 is increased and at the same time the amount of elastic deformation of the elastic members 723 is increased to thereby generate a high hysteresis torque. As a result, the excessive torque variation is attenuated. Stated more specifically, the vibration attenuating spring 721 takes the above-described operation from the condition shown in FIG. 37 through the condition shown in FIG. 40 to the condition shown in FIG. 41. Upon the shift from the condition shown in FIG. 40 to the condition shown in FIG. 41, the deformation of the first bent portions 726 is remarkable so that the elastic members 723 are firmly clamped by the lever portions 725 on both sides to be elastically deformed. At this time, the large internal friction is generated in the elastic members 723. Furthermore, the elastic member 723 is expanded in the axial direction due to the elastic deformation. For this reason, as shown in FIG. 43 (as compared to FIG. 42), the elastic member 723 contacts side inner walls of the damper receiving chamber 620, i.e., the first and second input plates 641 and 642 and takes the sliding movement in this condition. As the twist angle is increased, tee elastic deformation amount of the elastic member 723 is increased so that the pressure force to the first and second input plates 641 and 642 is increased. As a result, as the twist angle is increased, the sliding resistance between the elastic member 723 and the plates 641 and 642 is increased.

As described above, the friction between the elastic member and the plates 641 and 642 is added to the internal friction of the elastic member 723 so that a high hysteresis torque is generated. The excessive vibrations are attenuated by the characteristics of the high rigidity and high hysteresis torque at this time.

Figure 41:
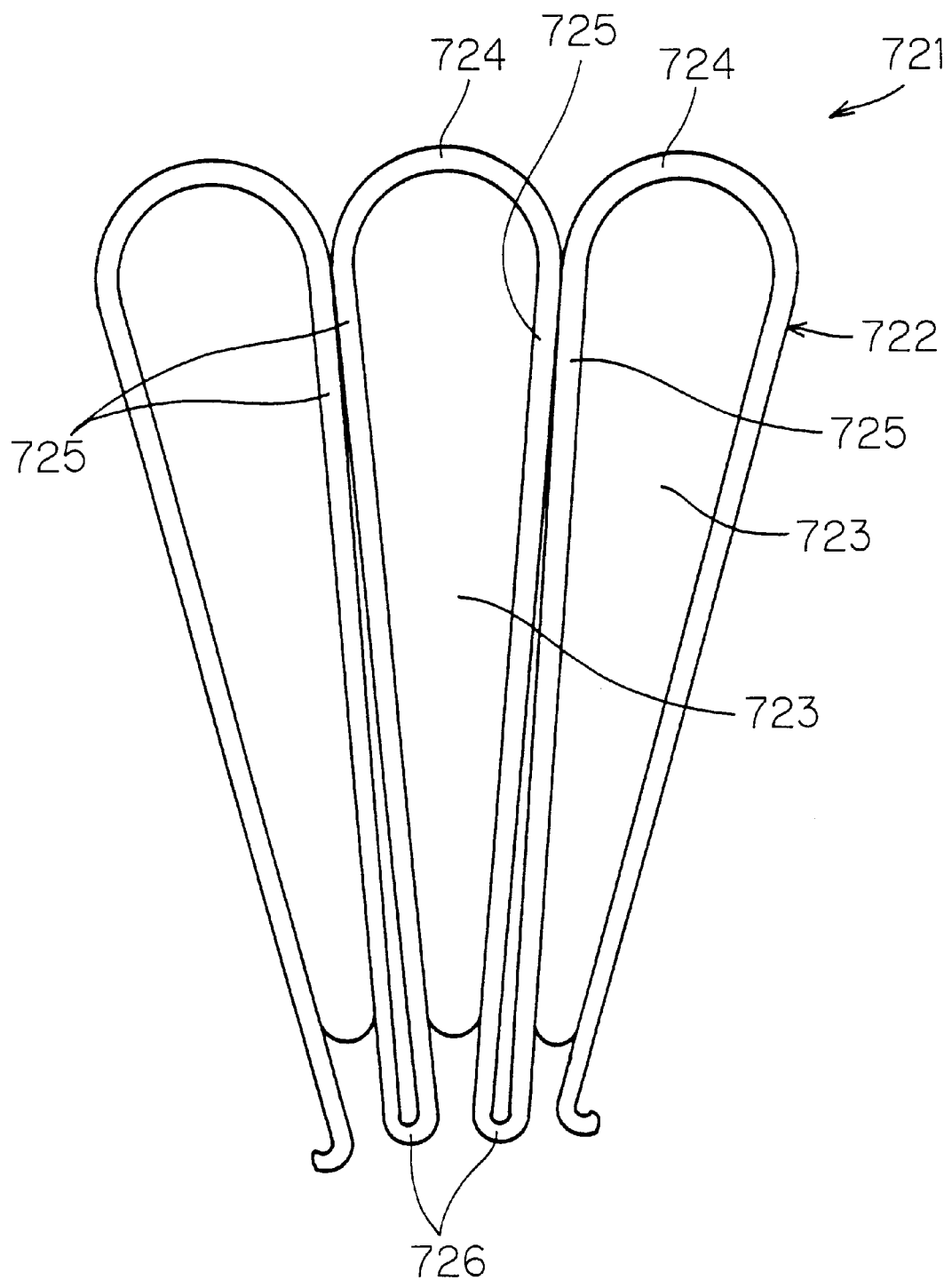
FIG. 41 is a view similar to FIGS. 37 and 40 showing another operational condition of the vibration attenuating spring depicted in FIGS. 33–39.

In the condition where the phase angle is kept at maximum as shown in FIG. 41, the first bent portions 724 of the leaf spring 722 are brought into contact with each other in the circumferential direction. In this condition, the elastic members 723 are brought into contact with each other in the circumferential direction in series to thereby prevent the bent leaf spring 721 from elastically bending exceeding a predetermined angle. Namely, the elastic members 723 function as stops for the damper mechanism 609.

When the driver steps the clutch pedal in, one end of the release device 608 causes the lever portions 623b of the diaphragm spring 623 to move toward the engine. As a result, the outer circumferential portion of the elastic portion 623a is separated away from the annular projection portions 622b of the pressure plate 622. Then, the biasing force of the joint portions 628a of the coupling plate 628 causes the pressure plate 622 to be separated away from the clutch coupling portion 631 of the clutch disc assembly 604. As a result, the torque transmission from the second flywheel 602 to the clutch disc assembly 604 is interrupted. In the above-described release operation, since the conical spring 629 imparts the load to the diaphragm spring 623 on the transmission side, the release load is decreased and becomes flat to thereby reduce the step force to the pedal.

Since the vibration attenuating spring 721 attains the functions of both the conventional elastic members and the friction generating mechanism by the combination of the leaf spring 722 and the elastic members 723, the structure is compact and a high function is ensured. As a result, it is possible to reduce the dimension of the damper mechanism 609. Also, since the leaf spring 722 takes a shape obtained by bending the plate, it is possible to shorten the width W dimension of the vibration attenuating spring 721 in comparison with the conventional coil spring. As a result, it is possible to shorten the axial dimension of the damper mechanism 609 and the modular clutch 601 as a whole.

The vibration attenuating spring 721 attains the large twist vibration attenuating functions with a simple structure of only the combination of the plurality of elastic members 723 with the leaf springs 722. Also, by providing the needle bearings 651 as the sliding friction resistance reducing members, the sliding resistance in the vibration attenuating spring 721 upon the minute vibration transmission is reduced as much as possible. As a result, the minute twist vibration attenuating function is realized.

In the damper mechanism 609, it is unnecessary to use the viscous resistance. As a result, the seal mechanism for the damper receiving chamber 620 is not required, and the damper mechanism 609 is considerably simplified.

Furthermore, in this embodiment, by providing the first bent portions 724 where the elastic members 723 are disposed and the second bent portions 726 where the elastic members 723 are not disposed, the portions having a high rigidity and the portions having a low rigidity are applied in series More specifically, the first bent portions 724 become the high rigidity portions and the second bent portions 726 become the low rigidity portions. As a result, in the damper mechanism 609, a small resistance is obtained by the second bent portions 726 in the range in which the twist angle is small, and a large resistance is obtained by the first bent portions 724 in the range in which the twist angle is large.

The rigidity of the elastic members is obtained by the same material as a prerequisite. However, it is possible to use the elastic members made of different materials and having different rigidities.

In the embodiment, the needle bearings are used as the sliding frictional resistance reducing members but any other structure may be used. For example, a structure in which rotary members such as balls and rollers that are not retained by a retainer are arranged to be rotatable on the outer circumferential surfaces of the slider may be used. In this case, the sliding frictional resistance would be high in comparison with the case where the retainer is provided. However, in comparison with the prior art, it is possible to ensure the enhancement of the minute twist vibration attenuating function.

In the vibration attenuating spring according to the present invention, since both functions of the conventional spring member and the friction generating mechanism are attained by simple spring elements each composed of a leaf spring and an elastic member, it is possible to obtain a high function performance with a compact structure. Furthermore, the plurality elastic members are disposed between the plurality of bent portions, and are elastically deformed by the leaf springs when the leaf springs are compressed in the circumferential direction. The elastic members are slid toward at least one of the pair of side walls. Thus, a large sliding resistance may be obtained in a wide range of the twist angle.

TWENTY-FIRST EMBODIMENT

Figure 49:
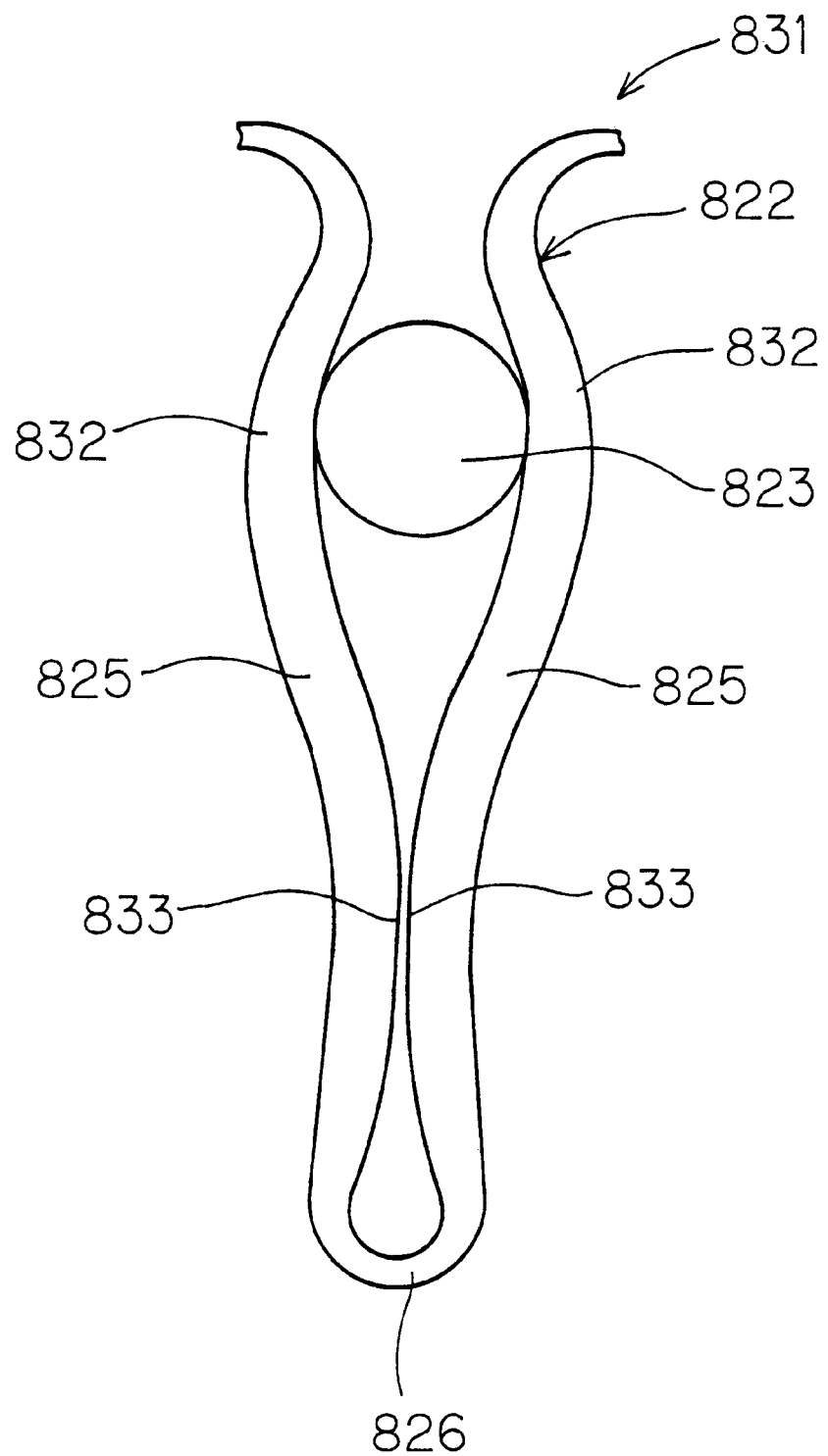
FIG. 49 is a fragmentary end view of a portion of the vibration attenuating spring depicted in FIG. 48, specifically the portion of the vibration attenuating spring in the box XXXXVIII in FIG. 48, shown on an enlarged scale.
Figure 50:
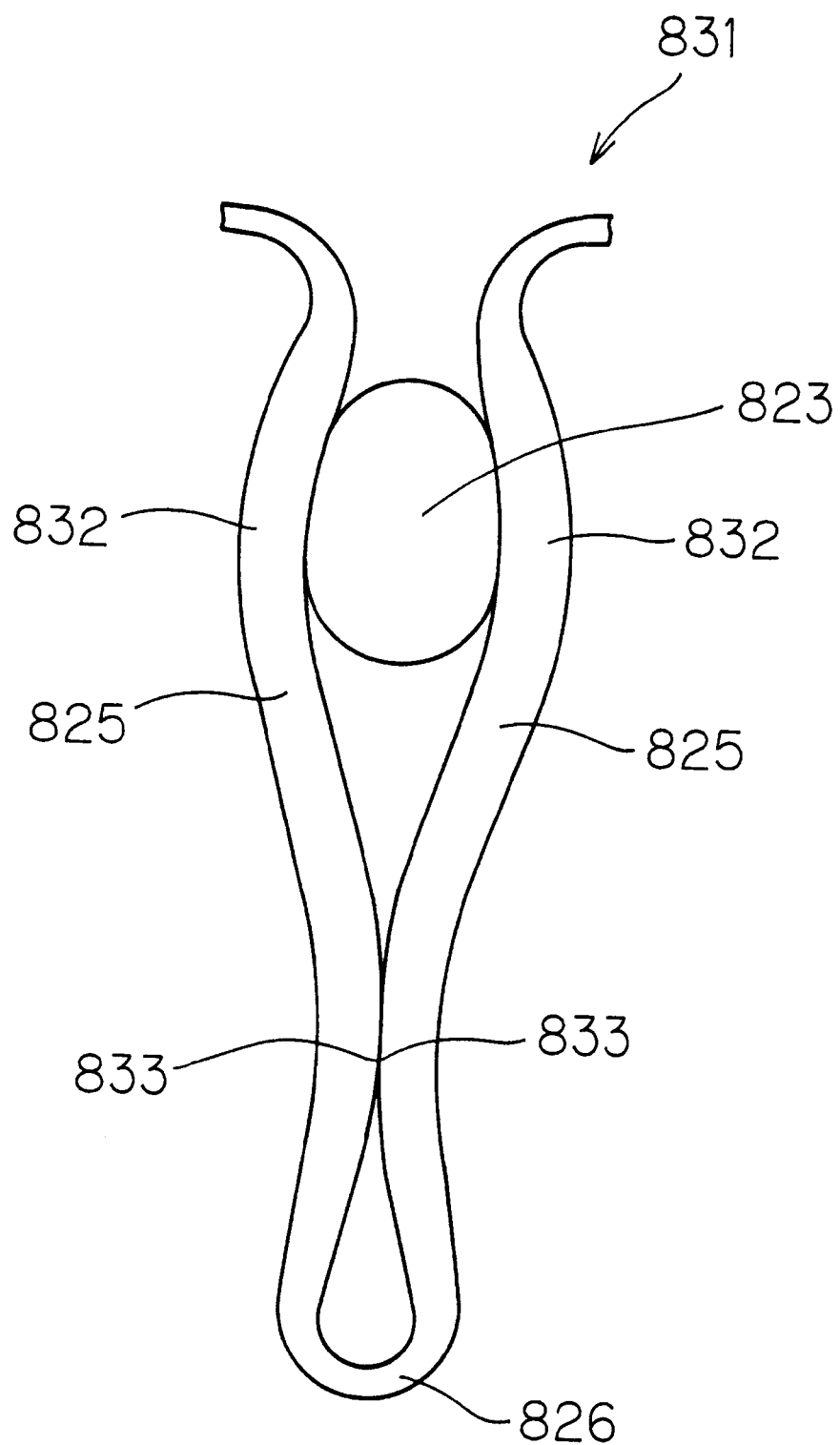
FIG. 50 is a fragmentary end view similar to FIG. 49, showing operation of the vibration attenuating spring with the spring in undergoing compression.

The modular clutch 601 and damper mechanism 609 shown in FIGS. 33 to 35 may be modified to include a vibration attenuating spring in accordance with a twenty-first embodiment of the present invention. The twenty-first embodiment is depicted in FIGS. 48, 49 and 50.

In the twenty-first embodiment a vibration attenuating spring 821 is disposed within a modular clutch 601. The modular clutch 601 was previously described above with respect to FIGS. 33 to 35. The modular clutch 601 includes a sliding frictional resistance reducing mechanism 50 and other components that are generally the same as those described above and therefore description of the same or similar components is omitted.

Figure 48:
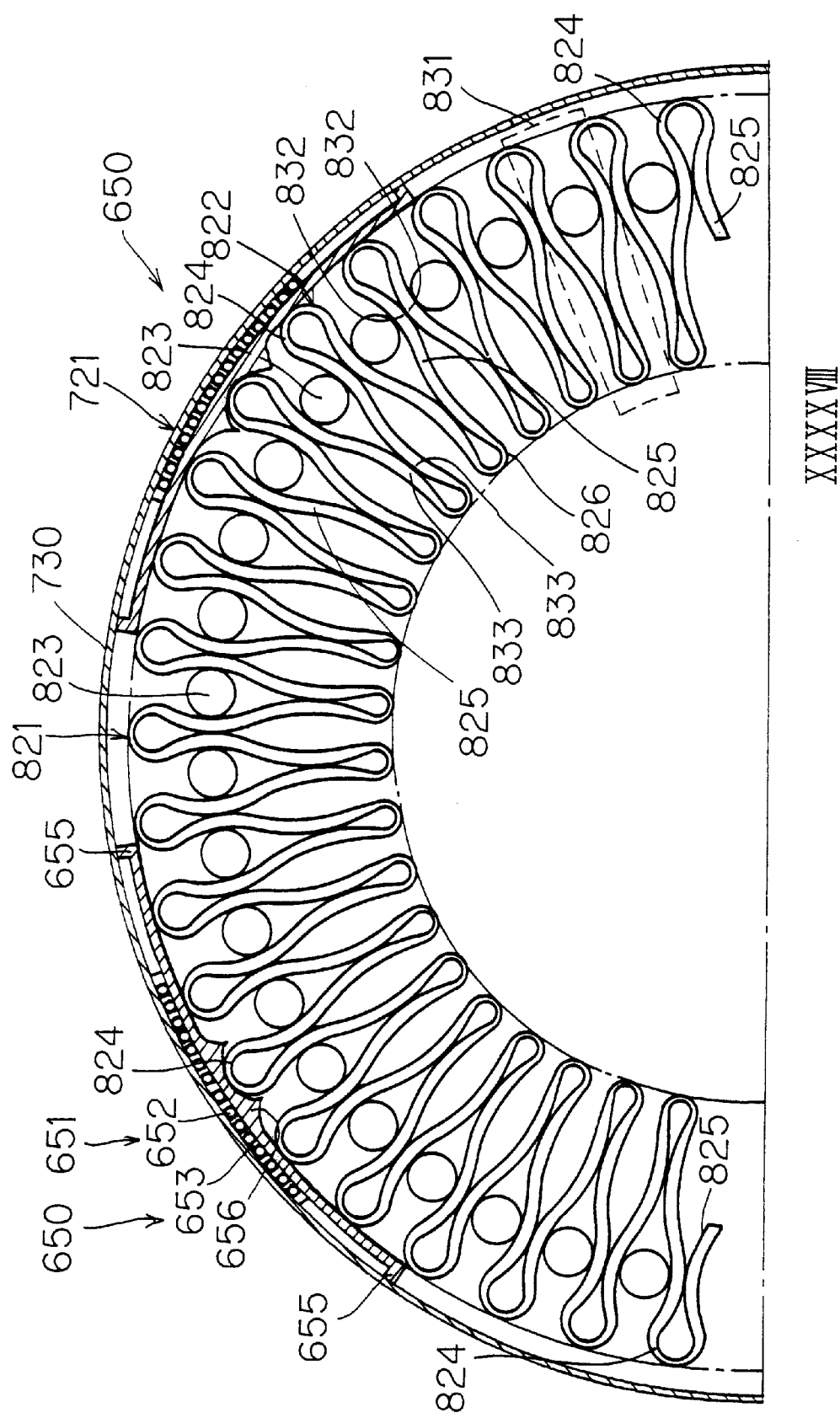
FIG. 48 is a fragmentary cross-sectional view similar to FIG. 36 showing a vibration attenuating spring in accordance with a twenty-first embodiment of the present invention.

A pair of vibration attenuating springs 821 and the sliding frictional resistance reducing mechanism 650 are disposed within the damper receiving chamber 620, although only one of each is depicted in FIG. 48.

The vibration attenuating spring 821 provides a damper for attenuating vibrations caused by torque variation of the engine as well as transmitting torque. As shown in FIG. 48, the vibration attenuating spring 821 is disposed in a damper receiving chamber with the vibration attenuating spring 821 bent in the form of arcuate shape. The vibration attenuating spring 821 includes a leaf spring 822 extending in the circumferential direction and a plurality of elastic members 823 provided in the leaf spring 822. The leaf spring 822 is made of metal, preferably, spring steel. The vibration attenuating spring 821 may be preformed to extend in linearly in the absence of compressive forces or alternatively may be preformed with the arcuate shape as shown in FIG. 48.

As shown on an enlarged scale in FIG. 48, the leaf spring 822 is formed by bending an elongated slender ribbon-shaped member in an alternating, sinusoidal like manner where the elongated slender member has a predetermined continuous width and extends in an arcuate form through about 180° arc. Since the leaf spring 822 is alternatively bent, as shown in FIG. 48, the leaf spring 822 is composed of a plurality of radially outwardly bent first ring portions 824, a plurality of radially inwardly bent second ring portions 826 and a plurality of lever portions 825 connecting the first and second ring portions 824 and 826 to each other. The leaf spring 822 has substantially the same axial length as that of the damper receiving chamber. Both ends, in the axial direction, of the leaf spring 822 are brought into contact with or close to the both opposite side inner wall surfaces.

The first ring portions 824 and the second ring portions 826 are arranged alternatingly in the circumferential direction. The first ring portions 824 and the second ring portions 826 are formed into open ring shapes. The end portions of the ring portions 824 and 825 are close to each other defining small gaps in the circumferential direction. A pair of lever portions 825 extend from each end of each of the first ring portions 824 and the second ring portions 826. Each pair of lever portions 825 extending from a single first or second ring portion 824 or 825 defines a gap which increases moving away from the respective first or second ring portion 824 or 825.

In the vicinity of end portions of each of the first ring portions 824 a first lever pivot 832 is defined. The first lever pivots 832 further define a joint between the first ring portion 824 and the lever portions 825. Each pair of adjacent first lever pivots 832 are close to each other with a small gap therebetween in the circumferential direction.

In the vicinity of end portions of each of the second ring portions 826 second lever pivots 833 are defined. The second lever pivots 833 further define a joint portion between the second ring portion 826 and the lever portions 825. A gap is defined between adjacent second lever pivots 833. Surfaces of the lever portions 825 extending between the first and second lever pivots 832 and 833 have smooth curved contour, in particular at the first lever pivots 832 and the second lever pivot 833, so that upon experiencing compression, contact between each pair of lever portions 825 extending from a single first or second ring portion 824 or 826 causes the corresponding lever portion 825 to undergo elastic deformation and pivot about the corresponding first and second lever pivots 832 and 833. The first ring portions 824 and the second ring portions 826 each have a non-uniform cross-section such that the thickness of the first and second ring portions 824 and 826 decreases from the first and second lever pivots 832 and 833 toward the central portions of the first and second ring portions 824 and 826. Further, as is shown in FIG. 48, a diameter of the first ring portions 824 is greater than that of the second ring portions 826.

Each elastic members 823 is made of rubber in the form of a cylindrical shape having substantially the same axial length as that of the damper receiving chamber 620 (see FIG. 34). As shown on an enlarged scale in FIG. 49, the elastic member 823 is arranged between the radially outward portions of the pair of lever portions 825. The elastic member 823 is neither movable in the radial direction nor in the circumferential direction since it is clamped between an adjacent pair of lever portions 825.

As shown in FIG. 48, at each end in the circumferential direction of the vibration attenuating spring 821, the lever portions 825 extend from the first ring portions 824 up to the radial intermediate portions of the spring receiving chamber 620.

With such an arrangement described above, the vibration attenuating spring 821 may be regarded as a elongated member composed of a plurality of the spring elements shown in FIG. 49 all of which are connected end to end to act in series in the circumferential direction. The spring element 831 is a leaf spring composed of the second ring portion 826 and the pair of lever portions 825 extending from the second ring portion 826, and the elastic member 823 clamped between the pair of lever portions 825 and elastically deformed between the pair of lever portions 825 when an external force is applied in a direction in which the pair of lever portions 825 are moved closer to each other.

OPERATION

The operation of the modular clutch 601 having the spring 821 as described above with respect to FIGS. 48 and 49 will now be described.

When the crankshaft on the engine side is rotated, a torque is transmitted through the flexible plate to the modular clutch 601. Then, torque is transmitted through the damper mechanism to the flywheel and is outputted to the clutch disc assembly. The pressure plate is rotated together with the clutch cover through the coupling plate. Since the rotational drive of the pressure plate is attained by the coupling plate for connecting the inner circumferential portion of the pressure plate and the inner circumferential portion of the clutch cover, it is unnecessary to form a cutaway portion for receiving the strap plate at the outer circumferential portion of the clutch cover like the conventional structure.

When the twist vibrations are transmitted from the engine side, in the damper mechanism 609, the first and second input plates 641 and 642 and the driven member 643 are cyclically relatively rotated. At this time, the vibration attenuating spring 821 is compressed in the circumferential direction. In this case, since the attenuating springs 821 may be regarded as a plurality of spring elements 831 arranged in series in the circumferential direction, it is possible to obtain the characteristics of low rigidity in the wide twist angle.

The operation of each vibration attenuating spring 821 upon the twist vibration transmission will now be described in detail. When minute twist vibrations caused by torque variation of the engine are transmitted, each spring element 831 of the vibration attenuating spring 821 is compressed in the circumferential direction from the condition shown in FIG. 49. Then, the pair of lever portions 825 are elastically deformed in a direction to be close to each other. At this time, the pair of lever portions 825 and the second ring portion 826 are elastically deformed about an apex of the second ring portion 826 which acts as a pivot or fulcrum. The rigidity of the leaf spring at this time is low. Also, the amount of elastic deformation is small. Therefore, the minute twist vibrations are hardly transmitted on the flywheel side due to the low rigidity/small resistance characteristics.

In this case, the vibration attenuating spring 821 is compressed in the circumferential direction, and a force depressing in the circumferential direction due to the centrifugal force and a compression force is applied. However, the sliding frictional resistance is largely reduced, i.e., becomes very small between the outer circumferential inner wall of the damper receiving chamber 620 and the outer circumference of the vibration attenuating spring 821 by the sliding frictional resistance reducing mechanism 650 composed of the needle bearings 651. For this reason, the characteristics for reducing the minute twist vibrations are hardly degraded. If the needle bearings 651 would not be arranged, a large sliding frictional resistance might be generated upon the minute twist vibration transmission and the minute twist vibrations might not be attenuated and would be transmitted to the transmission side.

When an excessive torque change is generated in the damper mechanism 609 upon passing through the resonant point in the low RPM region, the phase angle of the vibration attenuating spring 821 is increased. In accordance with this, the rigidity of the leaf spring is increased and at the same time the amount of elastic deformation of the elastic members 823 is increased to thereby generate a large frictional resistance. As a result, excessive vibration is attenuated. Stated more specifically, the vibration attenuating spring 821 takes the above-described operation from the condition shown in FIG. 49, and furthermore, the second lever pivots 833 are elastically brought into contact with each other. Thereafter, the lever portions 825 are elastically deformed about the second lever pivots 833 which act as a fulcrum. The actual pivot points of the lever portions 825 are shifted in a direction away from the second ring portion 826 in accordance with the increase of the deformation amount of the lever portions 825, as is indicated in FIG. 50. For this reason, the portions of the lever portions 825 that serve as the levers are shortened increasing rigidity. Furthermore, since the elastic members 823 are clamped by the pairs of the lever portions 825, the elastic deformation amount of the elastic members 823 is increased as shown in FIG. 50. As a result, a large internal friction is generated by the elastic members 823. The above-described high rigidity/large friction characteristics reduce the large twist vibrations. In the foregoing operation, since the spring elements 831 have the second lever pivots 833 that are brought into contact with each other, the stress distribution is uniform in the longitudinal direction of the lever portions 825. In the leaf spring having no lever pivots, the stress is concentrated on the apex of the ring portion. Also, since both the lever portions 825 and the elastic members 823 are elastically deformed, the stress is well diffused so that the service life of the leaf spring 822 is prolonged.

Since the vibration attenuating spring 821 attains the functions of both the elastic members and the friction generating mechanism only by the combination of the leaf spring 822 and the elastic members 823, the structure is compact and a high function is ensured. As a result, it is possible to reduce the dimension of the damper mechanism 609. Also, since the leaf spring 822 takes a shape obtained by bending the plate, it is possible to shorten the axial dimension of the vibration attenuating spring 821 in comparison with the conventional coil spring. As a result, it is possible to shorten the axial dimension of the damper mechanism and the modular clutch 601 as a whole.

Since the vibration attenuating spring 821 attains the vibratory attenuation characteristics in the same manner in the prior art only by the combination of the leaf spring 822 and the plurality of elastic members 823, it is unnecessary to use viscous resistance. As a result, it is possible to dispense with the seal mechanism for the damper receiving chamber 620, and the damper mechanism 609 is largely simplified.

TWENTY-SECOND EMBODIMENT

Figure 51:
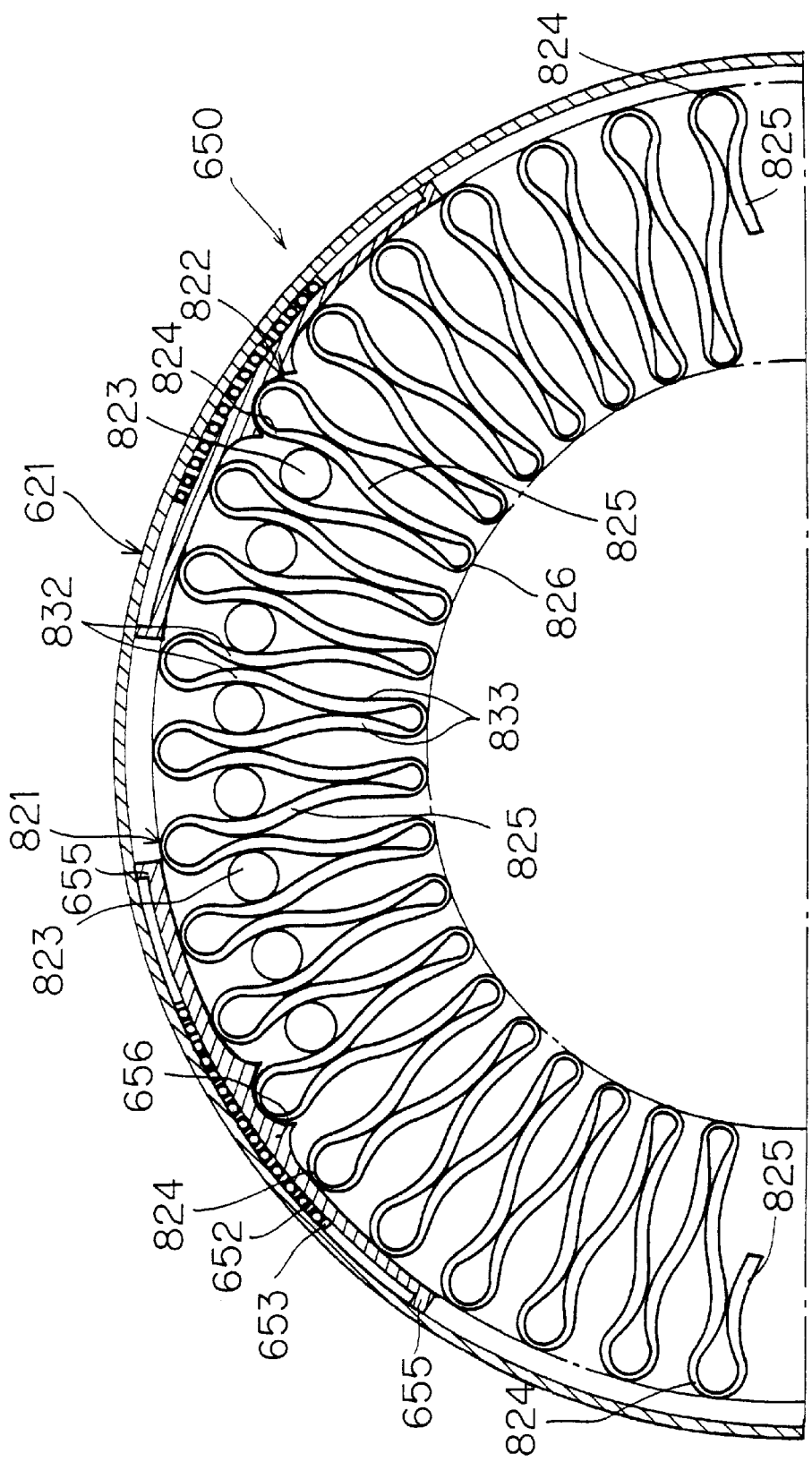
FIG. 51 is a fragmentary cross-sectional view similar to FIG. 48 showing a vibration attenuating spring in accordance with a twenty-second embodiment of the present invention.

In a vibration attenuating spring 821 shown in FIG. 51, the elastic members 823 are arranged only in the middle portion in the circumferential direction of the leaf spring 822. Specifically, the vibration attenuating spring 821 may divided into three circumferetial sections with only the mid-section being provided with elastic members 823. In other words, the elastic members 823 are not disposed in the circumferential end portions of the vibration attenuating spring 821. Thus, there are provided the portion where the elastic members 823 are arranged and the portion where the elastic members 823 are not arranged. As a result, it is possible to adjust- the characteristics of the vibration attenuating spring 821. In this embodiment, the overall rigidity is reduced in comparison with the foregoing embodiments.
MODIFICATION In the twenty-first and twenty-second embodiments, the rigidity of the elastic members is obtained by making all of the elastic members from the same material. However, it is possible to use the elastic members made of different material and having different rigidity. Thus, it is possible to adjust the characteristics of the vibration attenuating spring 821 as a whole.

TWENTY-THIRD EMBODIMENT

Figure 52:
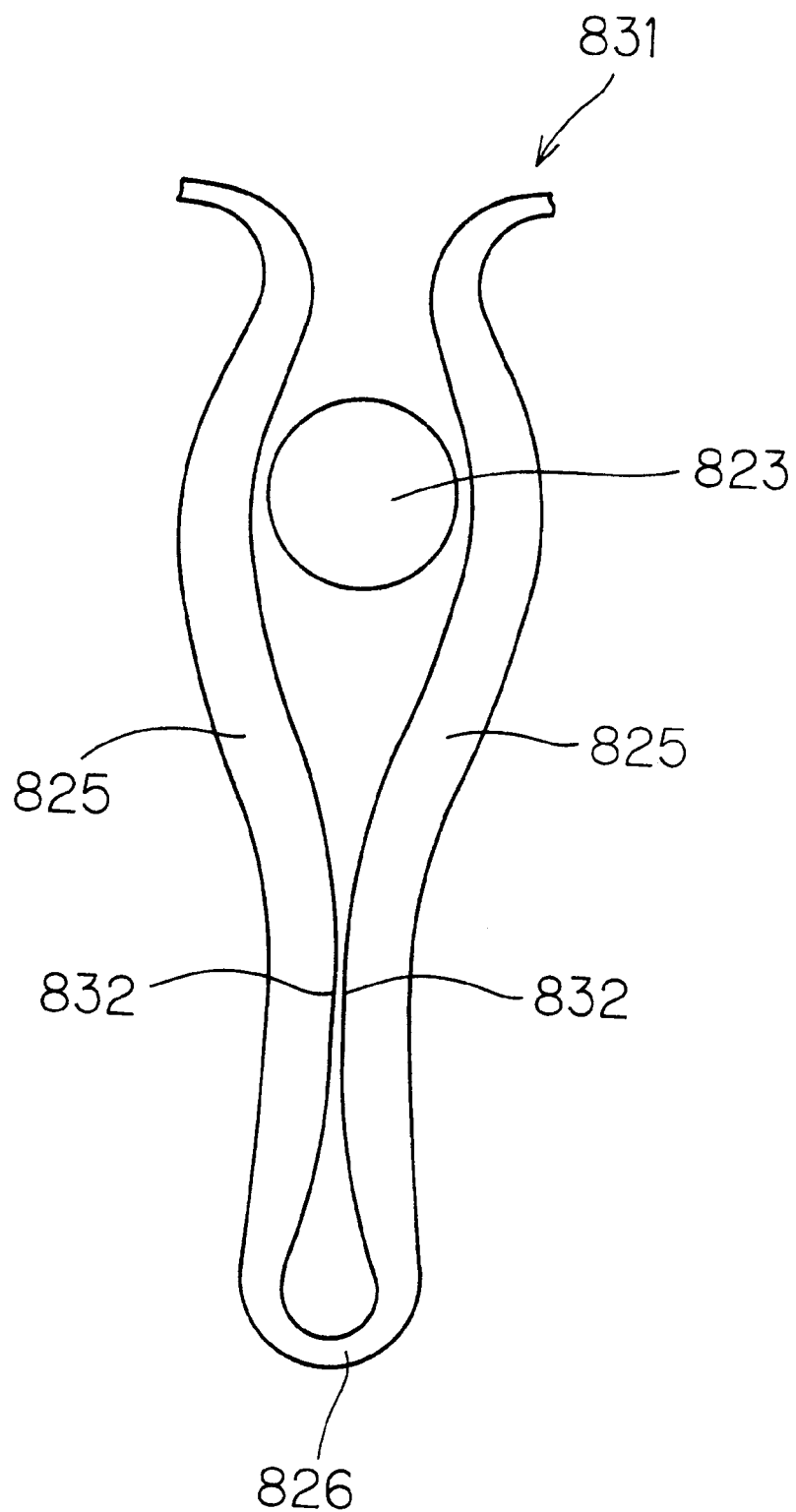
FIG. 52 is a fragmentary end view, similar to FIG. 49, showing a vibration attenuating spring according to a twenty-third embodiment of the present invention.

In the twenty-first and twenty-second embodiments described above, in a compression free condition, the elastic members 823 are in contact with the adjacent pair of lever portions 825. However, it is possible to configure the elastic members 823 to be movable in the circumferential direction between the pair of the lever portions 825 as shown in FIG. 52. Specifically, in a compression free condition, a gap is defined between the elastic member 823 and the pair of lever portions 825. In the twenty-third embodiment, the elastic members 823 are not compressed in a range where the twist angle of the damper mechanism 609 is small. For this reason, the elastic members 823 do not generate the resistance such as an internal friction for the minute twist vibrations in the small twist angle range.

TWENTY-FOURTH EMBODIMENT

Figure 53:
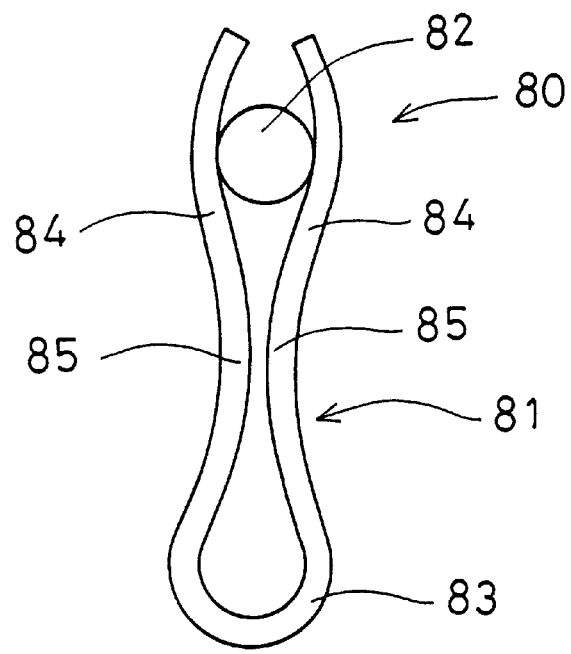
FIG. 53 is a plan end view showing a vibration attenuating spring in accordance with a twenty-fourth embodiment of the present invention.

A spring element 80 shown in FIG. 53 is used for the purpose of reducing the vibrations. The spring element 80 is composed of a leaf spring 81 and the elastic member 82. The leaf spring 81 is a member formed by bending and folding a leaf spring made of metal and having a constant width and a constant thickness. The leaf spring 81 is mainly composed of a ring portion 83 and a pair of lever portions 84 extending from both ends of the ring portion 83 opposite to the ring portion 83. The ring portion 83 is in the form of an open shape with two end portions which arc in a direction opposite to the arc of the ring portion 83. Each end of the ring portions 83 arc such that they extend away from each other as one moves away from the ring portion 83. The pair of lever portions 84 extend from opposite ends of the ring portions 83. The end portions of the ring portions 83 function as lever pivots 85 when the pair of lever portions 84 are elastically deformed in the direction close to each other. The opposite sides of the pair of pivots 85 are smoothly curved. The ends of the pair of lever portions 84 are bent in a direction such that the ends of the lever portions 84 extend toward each other. The elastic member 82 made of rubber in the form of a cylinder is clamped between the pair of lever portions 84.

When an external force is applied to the pair of lever portions 84 in a direction close to each other, the pair of the lever portion 84 and the ring portion 83 are elastically deformed about the apex of the ring portion 83 as a fulcrum. At this time, the low rigidity characteristics may be obtained. When and after the opposite lever pivots 85 are brought into contact with each other, the pair of lever portions 84 are elastically deformed about the lever pivots 85 as a fulcrum to thereby compress the elastic member 82. Also, the contact point between the lever pivots 85 of the lever portions 84 gradually move away from the ring portion 83 as compression increases. As a result, the lever length of the lever portions 84 is shortened thus increasing the rigidity. At this time, the high rigidity/large internal friction characteristics may be obtained. Thus, when the spring element 80 is used, the different characteristics are exhibited in accordance with a kind of vibrations to be effective for reducing the vibrations.

TWENTY-FIFTH EMBODIMENT

Figure 54:
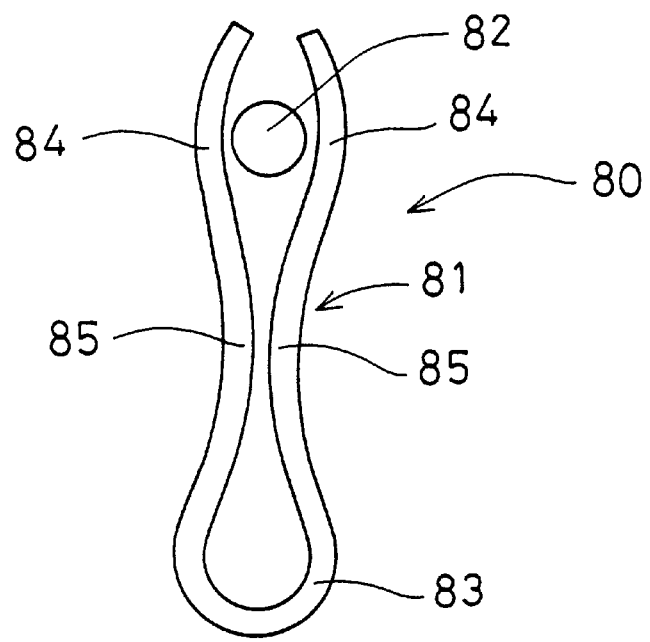
FIG. 54 is a plan view showing a vibration attenuating spring in accordance with a twenty-fifth embodiment of the present invention.

It is possible to arrange the elastic springs 82 to be movable in the circumferential direction bet-ween the pair of lever portions 84, as shown in FIG. 54. In this case, in the range of compression where the pair of the lever portions 84 are deformed slightly, the elastic members 82 are not compressed.

TWENTY-SIXTH EMBODIMENT

Figure 55:
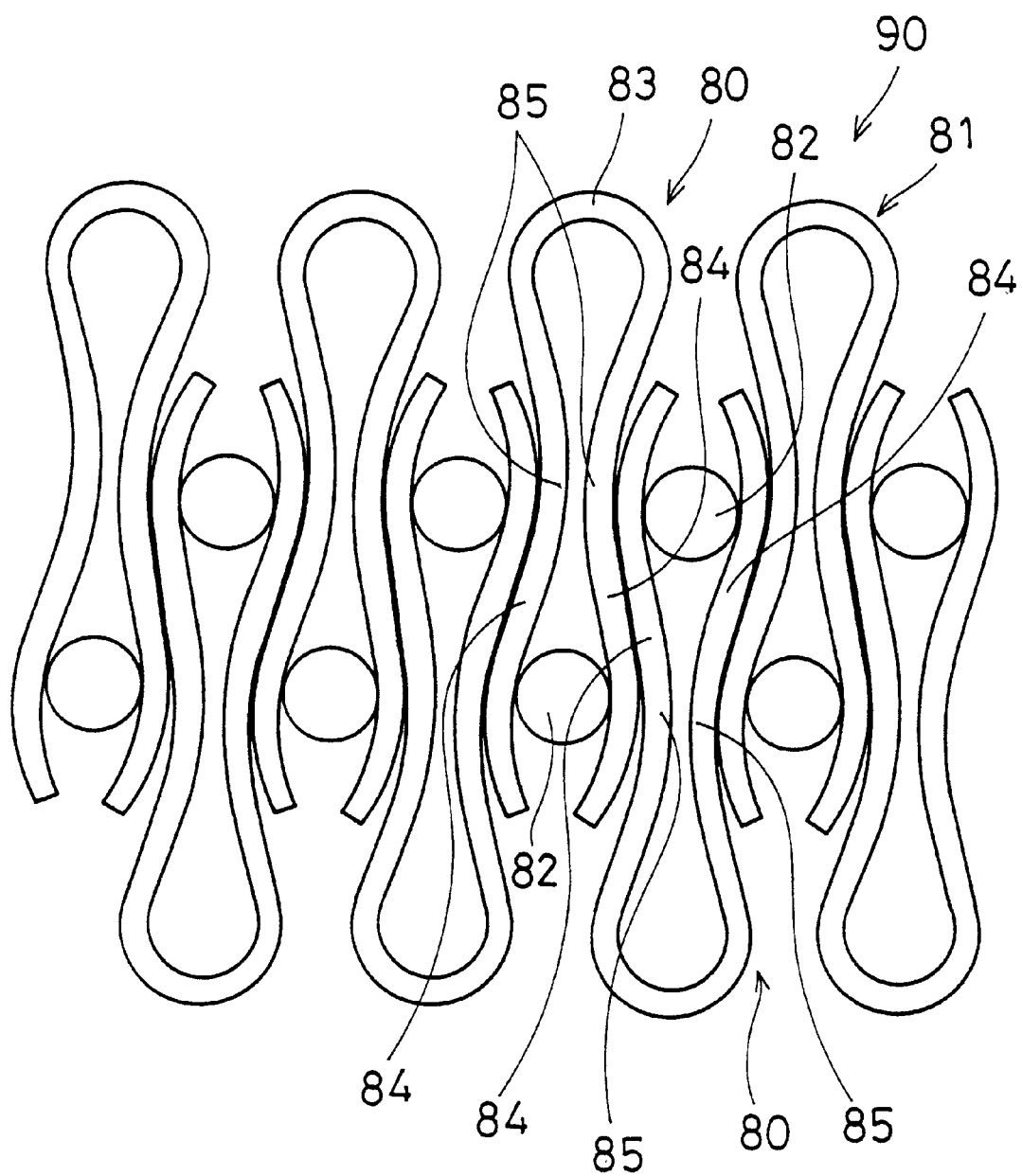
FIG. 55 is a plan view showing a vibration attenuating spring in accordance with a twenty-sixth embodiment of the present invention.

As shown in FIG. 55, it is possible to form the vibration attenuating spring 90 by connecting a plurality of spring elements 80 side to side such that they act in series with one another. Specifically, the ring portions 83 of the spring elements 80 are arranged to be in contact with each other in an alternating manner or in a staggered manner. Then, in function, the lever portions 84 are connected to each other. Thus, the spring elements 80 are arranged to be active in series whereby characteristics of large deformation amount and low rigidity may be obtained. Other effects are the same as the individual spring element 80. The vibration attenuating spring 90 may be applied to the damper mechanisms described above, for instance the twenty-first embodiment. The shape of the leaf spring 81 is adjusted so that the plurality of spring elements 80 are arranged in an arcuate form.

MODIFICATIONS

The shape of the elastic members is not limited to the cylindrical shape shown in the figures. The elastic members may also be fixed to the leaf spring and formed with a shape corresponding to the bent portions of the spring.

Each end portion (lever pivots) of each ring portion of the leaf spring may be in contact with each other in a compression free condition.

It is also possible to apply the damper mechanism according to the present invention to other power transmission devices, such as a clutch disc assembly, and a lockup clutch of a torque convertor, in addition to the flywheel assembly described above.

In the vibration attenuating spring according to the present invention, since both functions of the conventional spring member and the friction generating mechanism are attained by a simple spring element composed of a leaf spring and an elastic member, it is possible to obtain the high functional performance with a simple structure. The pair of lever portions are elastically deformed about each ends as pivots in a condition both ends of the ring portion are in contact with each other. Simultaneously, the elastic member clamped between the pair of the lever portions is elastically deformed so that the stress is more evenly distributed to the leaf spring and the elastic member. For this reason, the possibility of stress concentration on portions of the leaf spring is reduced.

TWENTY-SEVENTH EMBODIMENT

Figure 56:
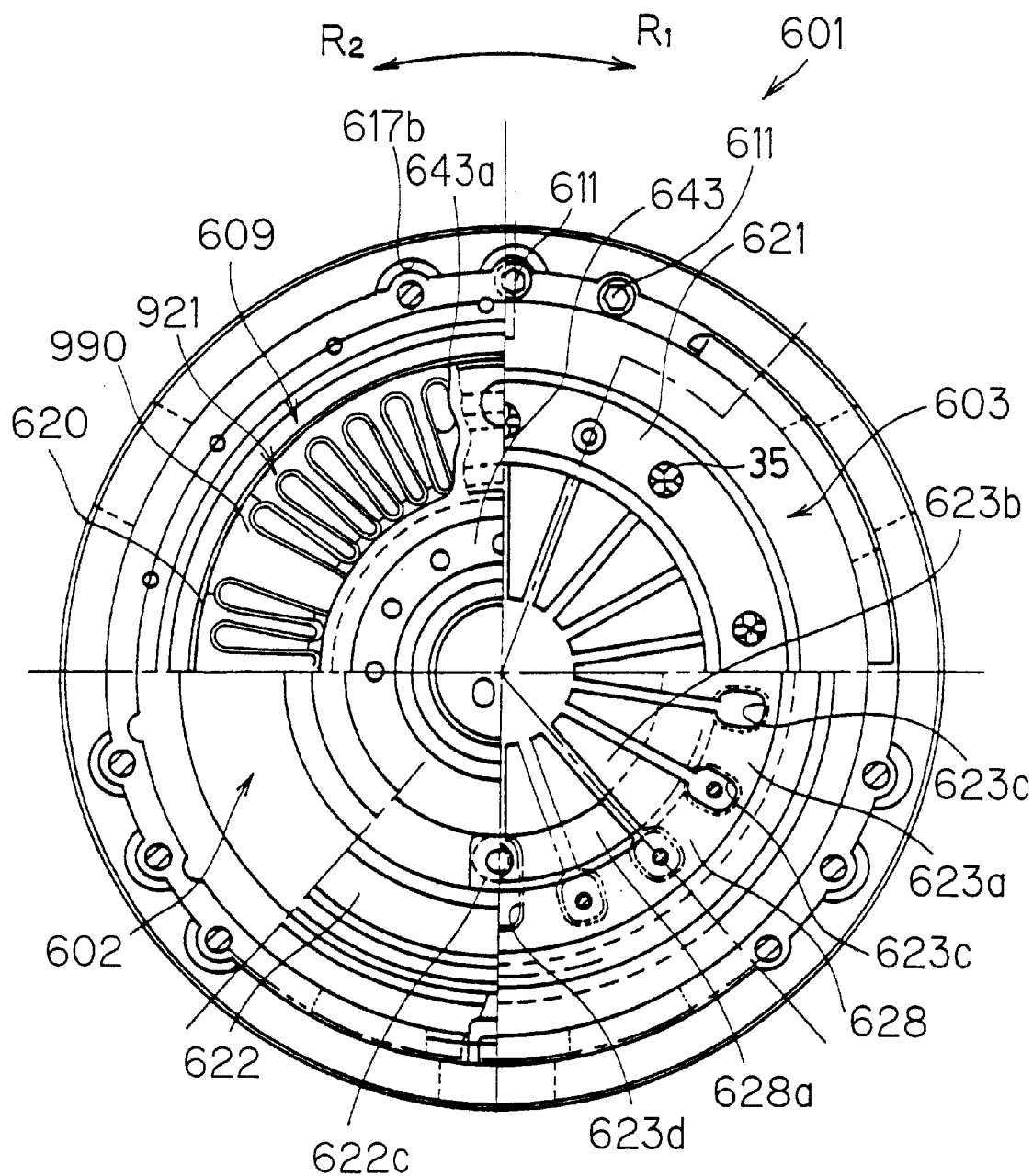
FIG. 56 is a multiple cutaway view, similar to FIG. 33, showing details of a clutch mechanism having a vibration attenuating spring is installed in accordance with a twenty-seventh embodiment of the present invention.

A modular clutch 601 is shown in FIG. 56 that is similar to that depicted in FIG. 33 and includes many common features. Therefore, only those features that differ from those described above with respect to FIG. 33 will be described in detail below.

Figure 57:
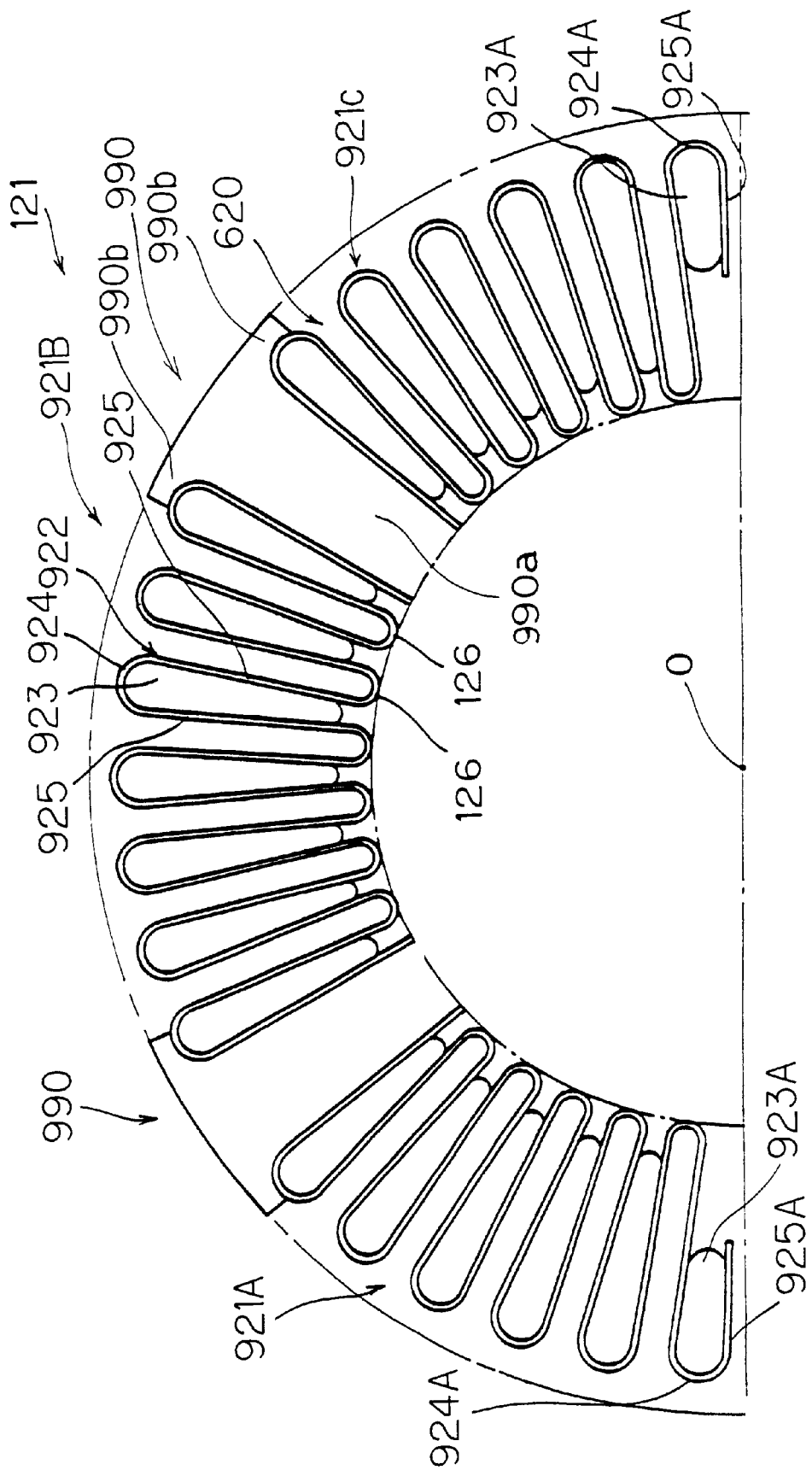
FIG. 57 is a plan end view showing the vibration attenuating spring depicted in FIG. 56 with portions of the clutch mechanism removed for greater clarity.

A vibration attenuating spring 921 is disposed in the damper receiving chamber 620 of the modular clutch 601 and forms a vibration attenuating mechanism for attenuating twist vibrations caused by torque variation of the engine as well as transmitting the torque in the damper mechanism 609. As shown in FIG. 57, each attenuating springs 921 is composed of three separated divided vibration attenuating springs 921A, 921B and 921C. Spring receiving sliders 990 (support members) are interposed between the separated divided vibration attenuating springs 921A and 921B, and between the divided vibration attenuating springs 921B and 921C, respectively.

Each of the separated divided vibration attenuating springs 921A, 921B and 921C is composed of a leaf spring 922 extending in the circumferential direction and a plurality of elastic members 923 provided on the leaf spring 922. The leaf spring 922 is formed of metal, specifically, spring steel. The leaf spring 922 formed by bending an elongated slender ribbon-shaped member alternatingly to form a sinusoidal like shape having an arcuate form. The bent portions in the leaf spring 922 is include a plurality of radially outward bent first portions 924, a plurality of radially inward bent second portions 926 and a plurality of lever portions 925 connecting the bent portions 924 and 926 to each other as shown in FIGS. 57 to 60.

Figure 59:
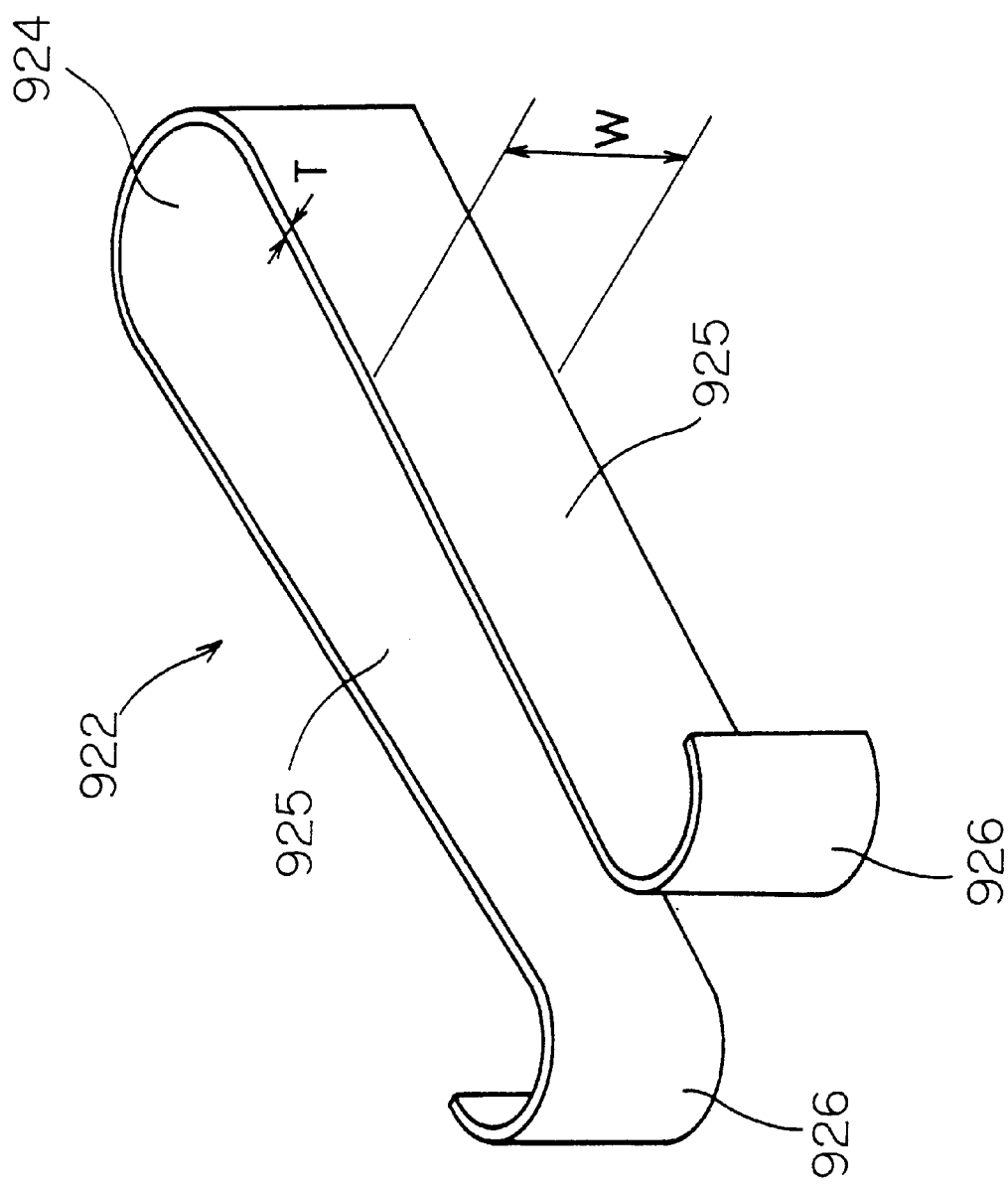
FIG. 59 is a fragmentary perspective view of a leaf spring of the vibration attenuating spring depicted in FIGS. 57, 58 and 59.

As shown in FIG. 59, the leaf spring 922 has a constant width W (in the axial direction) and a thickness T over the full length. A length L of the lever portion 925 of the leaf spring 922 in the longitudinal direction (in the radial direction) is slightly smaller than the radial length of the damper receiving chamber 620. The width W of the leaf spring 922 may be somewhat smaller than or generally equal to the axial dimension of the damper receiving chamber 620. A diameter of the first bent portions 924 is greater than that of the second bent portions 926. Also, a pair of lever portions 925 extend from the individual bent portions 924 or 926 extend in a linear form toward the opposite bent portions 924 or 926 and are slanted to be gradually close to each other toward the opposite bent portions 924 or 926.

Figure 58:
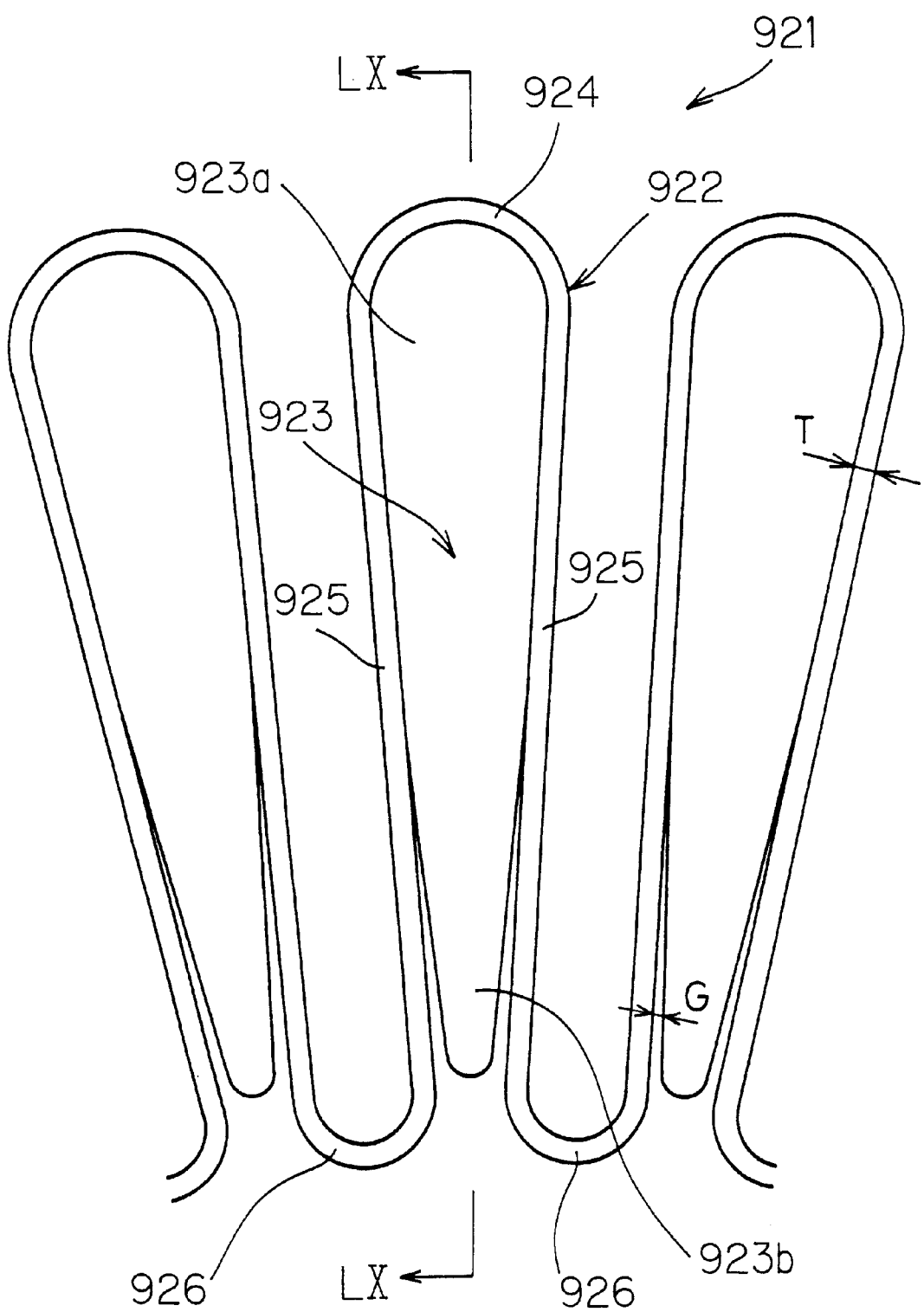
FIG. 58 is a fragmentary end view of a portion of the vibration attenuating spring depicted in FIG. 57, shown in an enlarged scale.

In each of the separated divided vibration attenuating springs 921A, 921B and 921C, the plurality of elastic members 923 are disposed inside of the first bent portions 924 of the leaf spring 922, i.e., between the pair of the associated lever portions 925 extending from both ends of the first bent portions 924. The elastic members 923 are made of, for example, rubber, and are molded to the inner surfaces, on the bent portions 924, of the leaf spring 922. The elastic members 923 extend radially at full length along the lever portions 925 on both sides. As shown in FIG. 58, each of the elastic members 923 has a contact portion 923a which engages an inner surface of the bent portion 924 and also is engaged with a portion of the lever portions 925. Further, each elastic member 923 includes a projecting portion 923b which extends between the remainder of the lever portions 925.

Figure 60:
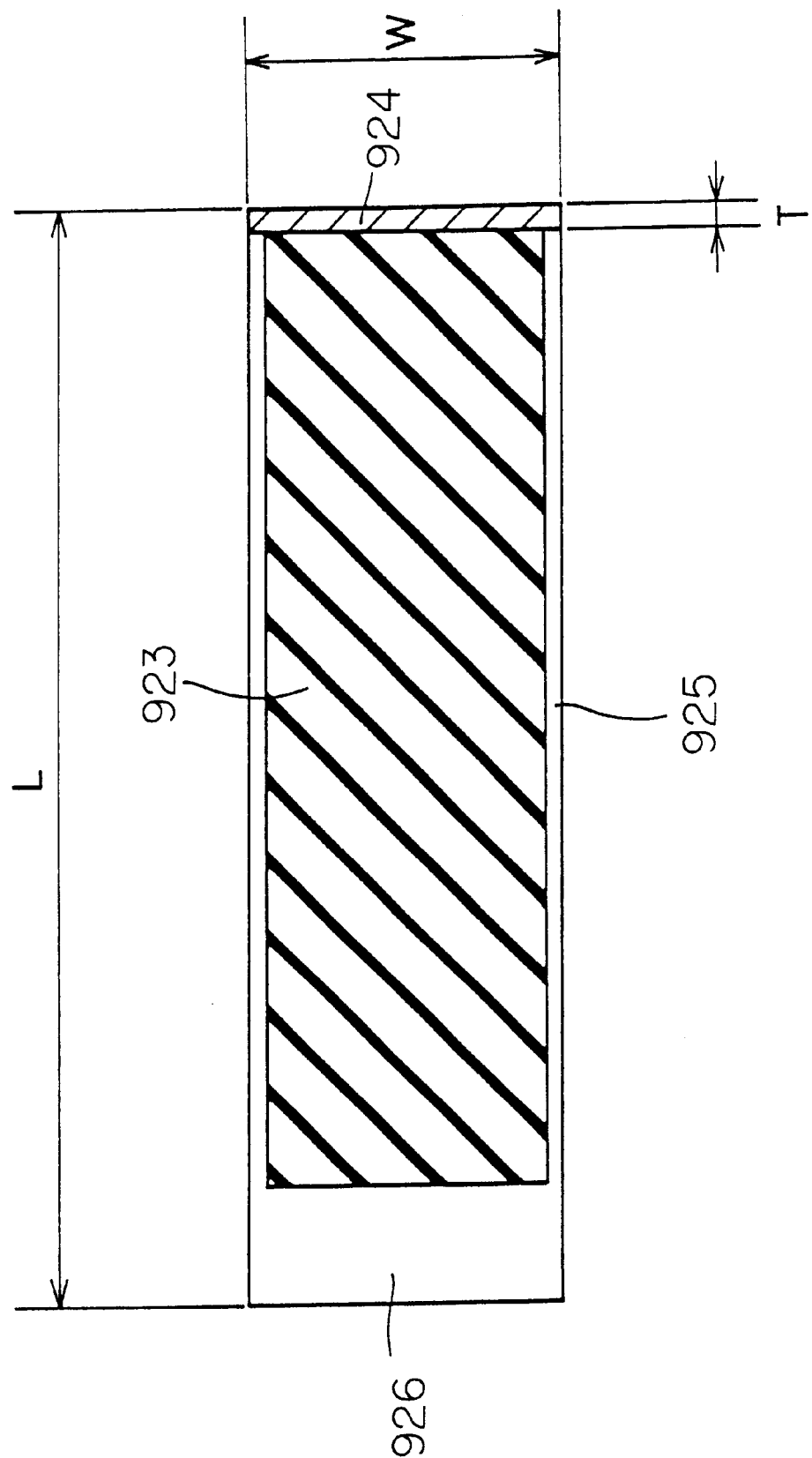
FIG. 60 is a cross-sectional view taken along the line LX—LX of FIG. 58.

The contact portion 923a is preferably formed along the bent portion 924 and is molded or adhered to the inner surface of the bent portion 924 and the sides of the bent portion 924 of the lever portions 925. A gap G is defined between each of the pair of lever portions 925 and the projecting portion 923b on either side thereof. The length, in the circumferential direction, of the projecting portion 923b is gradually shorter toward the tip end, and the gap G between the projecting portion 923b and each lever portion 925 gradually increases in size toward the bent portions 926. As shown in FIG. 60, a width, in the width W direction, of the elastic member 923 is somewhat shorter than that of the leaf spring 922.

The spring receiving sliders 990 are made of, for example, resin material and disposed to be movable in the circumferential direction within the damper receiving chamber 620. The spring receiving sliders 990 are composed of spring receiving portions 990a and support portions 990b. The spring receiving portions 990a have substantially the same radial length as that of the damper receiving chamber 620. Surfaces, in the circumferential directions on both sides, of each spring receiving portion 990a are substantially flat and are in contact with the lever portions 925 of each vibration attenuating spring 921A, 921B, 921C. Each support portion 990b extends in the circumferential direction from the end portion, in the radial direction, of the spring receiving portion 990a. The outer circumferential portions of the leaf spring portion 990a and the support portion 990b are formed into smoothly curved sliding surfaces 990c which may be slide along the outer circumferential wall of the damper receiving chamber 620. Also, the support portion 990b supports the radially outward side of the first bent portions 924 on both sides. Thus, since the support portions 990b of the spring receiving portions 990 are disposed between the outer circumferential wall of the damper receiving chamber 620 and the leaf spring 922 portions of each divided vibration attenuating spring 921A, 921B, 921C, a gap is kept between the outer circumferential wall of the damper receiving chamber 620 and each divided vibration attenuating spring 921A, 921B, 921C. As a result, the first bent portions 924 are barely contacts, if at all, the outer circumferential wall of the damper receiving chamber 620 when the vibration attenuating springs 921 are compressed.

Also, coatings of, for example, Teflon system, molybdenum bisulfide system, graphite system and fluorine system and impregnating-nitrating process having a minimum frictional coefficient are applied to the outer circumferential inner wall of the damper receiving chamber 620. Members having a low frictional coefficient are used for the spring sliders 990. As a result, a sliding resistance between the spring receiving sliders 990 and the outer wall of the damper receiving chamber 620 is minimal.

The vibration attenuating spring 921 is divided into three divided vibration attenuating springs 921A, 921B and 921C so that the different characteristics may be selected for each vibration attenuating spring. For example, it is possible to use the leaf springs which are different in shape (thickness, width and pitch). As a result, it is easy to adjust the overall characteristics of the vibration attenuating spring 921.

In both ends, in the circumferential direction, of the vibration attenuating spring 921, i.e., the end portions, in the circumferential direction, of the divided vibration attenuating springs 921A, 9213 and 921C, the lever portions 925A extend from the first bent portions 924A to the middle portion in the radial direction. The elastic members 923A having substantially the same length as the short lever portions 925A are disposed within the first bent portions 924A. Alternatively, the lever portions 925A at ends in the circumferential direction may extend to the a radially inward side of the chamber 620 so that the elastic members 923A may alternatively have the same dimension in the radial direction as that of the elastic members 923.

The driven member 643 (FIG. 56) is a disc-like member having a pair of engagement portions 643a extending radially outwardly and integrally from the disc-like portion. The two engagement portions 643a extend in the damper receiving chamber 620 at two diametrically opposite positions. The engagement portions 643a are in contact with ends in the circumferential direction of the pair of vibration attenuating springs 921. Also, the first and second input plates 641 and 642 (see FIGS. 33, 34 and 35) have support portions 641a and 642a projecting at two radially opposite positions in the axial direction and come into contact with both ends, in the circumferential direction, of the vibration attenuating springs 921.

Operation

Figure 61:
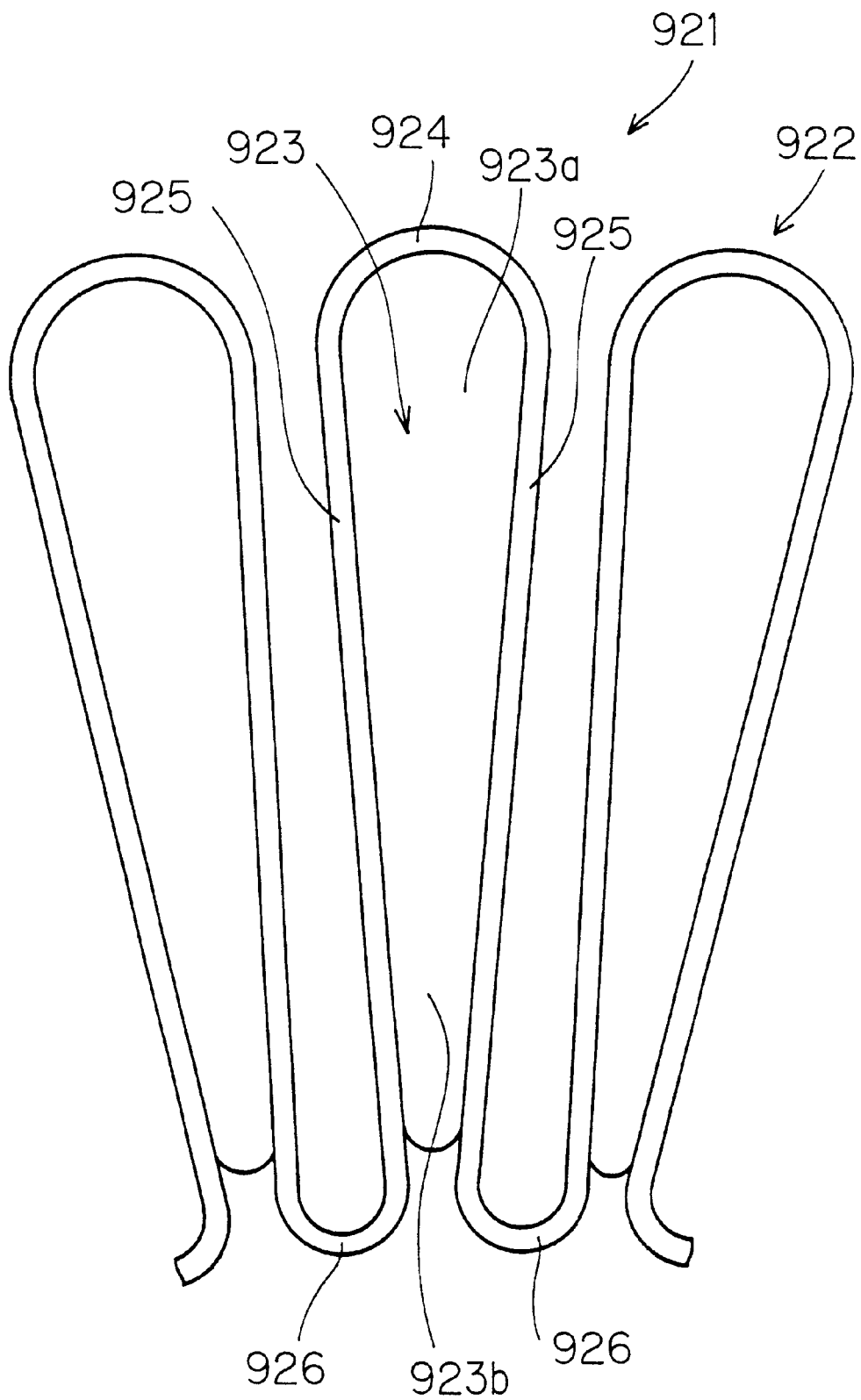
FIG. 61 is a fragmentary plan view showing an operational condition of the vibration attenuating spring under slight compression.

The operation of the modular clutch 601 is generally the same as is described above with respect to other embodiments accept that the vibration attenuating spring 921 is compressed in the circumferential direction with the spring receiver sliders 90. For instance, when the minute twist vibrations caused by the torque variation of the engine are transmitted, each spring element of the divided vibration attenuating springs 921A, 921B and 921C of the vibration attenuating spring 921 is changed alternatively between the conditions shown in FIGS. 58 and 61. When the vibration attenuating spring 921 is moved from the condition shown in FIG. 58 to the condition shown in FIG. 61, the second bent portions 926 are mainly elastically deformed to thereby obtain the low rigidity. In FIG. 61, the portions on the side of the second bent portions 926 of the lever portions 925 are brought into contact with the projection portions 923b of the elastic member 923. However, the elastic members 923 are not firmly clamped by the lever portions 925 as a whole. For this reason, a large internal friction is not generated in the elastic members 923. Thus, the minute twist vibrations are hardly transmitted on the engine side due to the low rigidity/small resistance characteristics.

Also, as described above, since the vibration attenuating springs 921 are hardly slid on the outer circumferential inner wall of the damper receiving chamber 620 by the spring receiver sliders 990, the overall resistance (hysteresis torque) does not become large. For this reason, it is hard to transmit the fine or minute twist vibrations to the transmission side.

When an excessive torque change is generated in the damper mechanism 609 upon passing through the resonant point in the low RPM region, the phase angle of the vibration attenuating spring 921 is increased. In accordance with this, the degree of deformation of the lever portions 925 is increased and at the same time the amount of elastic deformation of the elastic members 923 is increased to thereby generate a high hysteresis torque. As a result, the excessive torque variation is attenuated. More specifically, the vibration attenuating spring 921 is moved from the condition shown in FIG. 58 through the condition shown in FIG. 61 to the condition shown in FIG. 62. As it is changed from the condition shown in FIG. 61 to the condition shown in FIG. 62, the deformation of the second bent portions 926 is significant enough so that the elastic members 923 are firmly clamped by the lever portions 925 on both sides so as to be elastically deformed. At this time, the large internal friction is generated in the elastic members 923.

Figure 62:
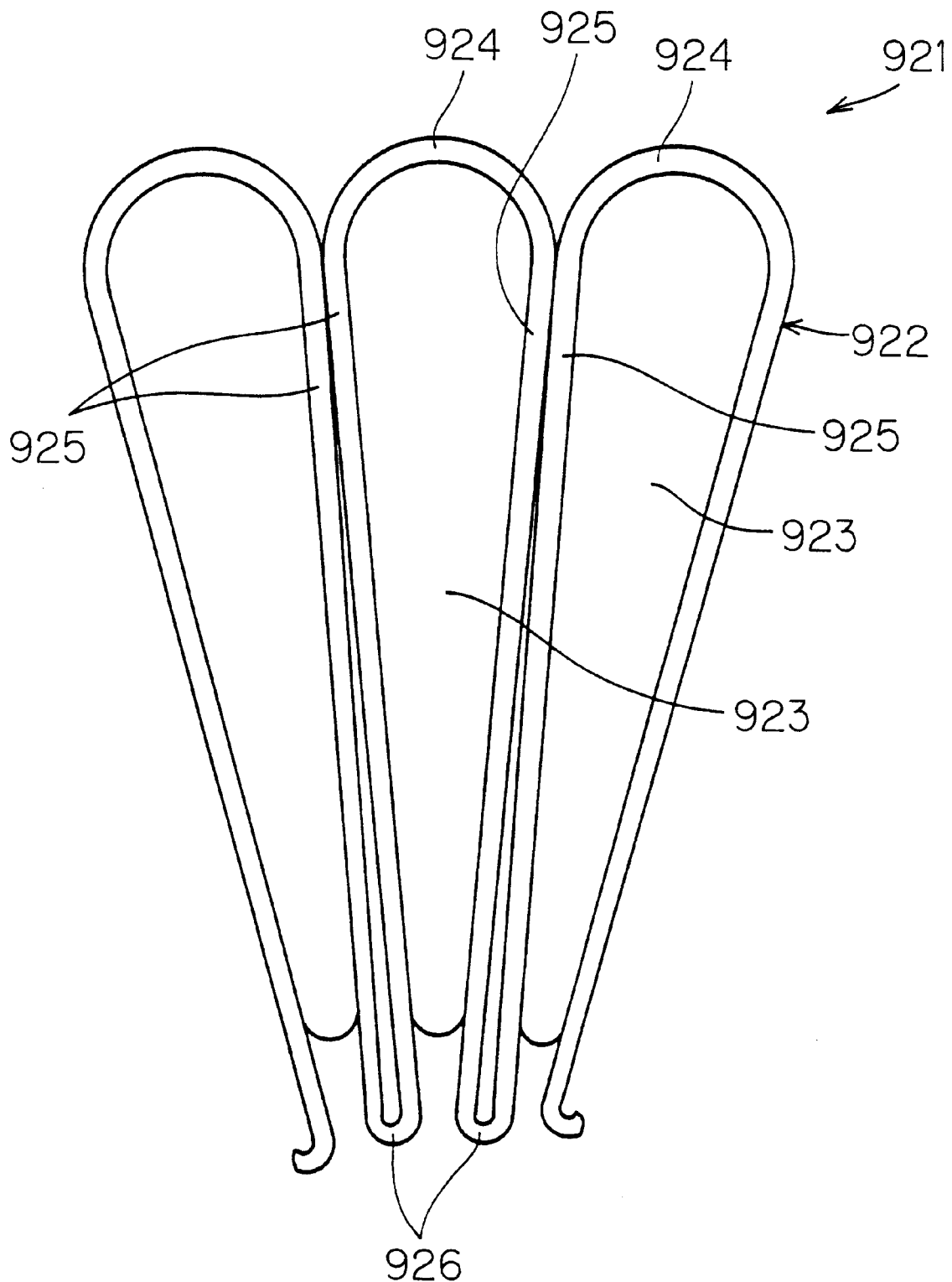
FIG. 62 is another fragmentary plan view showing another operational condition of the vibration attenuating spring under further compression.

In the condition where the phase angle is kept at maximum as shown in FIG. 62, the first bent portions 924 of the leaf spring 922 are brought into contact with each other in the circumferential direction. In this condition, the elastic members 923 are brought closest to each other through the lever portions 925 in the circumferential direction in series to thereby prevent the bent leaf spring 921 from elastically bending exceeding a predetermined angle. Namely, the elastic members 923 function as stops for the damper mechanism 609.

Effects

Since the vibration attenuating spring 921 attains the functions of both the elastic members and the friction generating mechanism only by the combination of the leaf spring 922 and the elastic members 923, the structure is compact and a high function is ensured. As a result, it is possible to reduce the dimension of the damper mechanism 609. Also, since the leaf spring 922 takes a shape obtained by bending an elongated plate, it is possible to shorten the width W dimension of the vibration attenuating spring 921 in comparison with the conventional coil spring. As a result, it is possible to shorten the axial dimension of the damper mechanism 609 and the modular clutch 601 as a whole.

Furthermore, in the divided vibration attenuating springs 921A and 921B in this embodiment, by providing the bent portions 924 where the elastic members 923 are disposed and the bent portions 926 where the elastic members are not disposed, the portions having a high rigidity and the portions having a low rigidity are applied in series. As a result, in the damper mechanism 609, a small resistance is obtained by the second bent portions 926 in the range in which the twist angle is small, and a large resistance is obtained by the first bent portions 924 in the range in which the twist angle is large.

Since the vibration attenuating spring 921 attains the vibratory attenuation characteristics in the same manner in the prior art only by the combination of the leaf spring 922 and the plurality of elastic members 923, it is unnecessary to use viscous resistances. As a result, it is possible to dispense with the seal mechanism for the damper receiving chamber 20, and the damper mechanism 609 is largely simplified.

MODIFICATION

In the twenty-seventh embodiment described above, the rigidity of the elastic members is obtained by using a single material for all of the elastic members. However, it is possible to use the elastic members made of different materials.

TWENTY-EIGHTH EMBODIMENT

Figure 63:
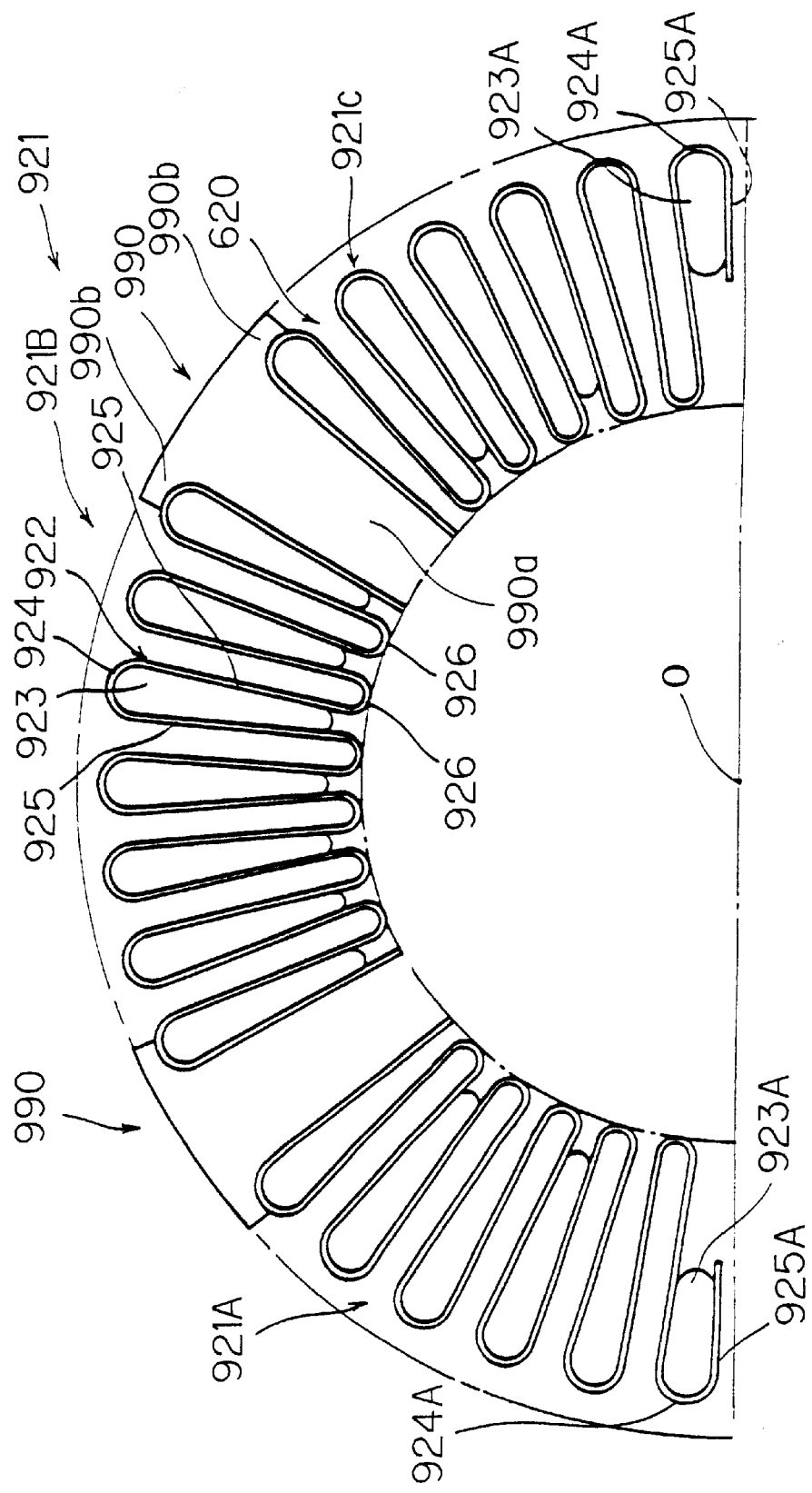
FIG. 63 is a plan end view, similar to FIG. 57, showing the vibration attenuating spring in accordance with a twenty-eighth embodiment of the present invention.

It is possible to differentiate the number, kind and shape of the elastic members 923 and the arrangement position for each vibration attenuating springs. For example, in the vibration attenuating spring 921 shown in FIG. 63, the number of the elastic members 923 of the divided vibration attenuating springs 921A and 921C arranged on both sides in the circumferential direction is smaller than the number of the elastic members 923 of the intermediate divided vibration attenuating spring 921B. As a result, the overall rigidity of the vibration attenuating spring 921 is low in comparison with the first embodiment. Furthermore, it is possible to use the divided vibration attenuating spring where the elastic members are not provided at all (i.e., the divided vibration attenuating spring only composed of the leaf spring) in combination with the divided vibration attenuating spring where the elastic members are arranged.

It is possible to apply the damper mechanism according to the present invention to other power transmission devices, such as a clutch disc assembly, and a lockup clutch of a torque convertor, in addition to the flywheel portion.

In the vibration attenuating spring according to the present invention, since both functions of the conventional spring member and the friction generating mechanism are attained by a simple spring element composed of a leaf spring and elastic members, it is possible to obtain the high functional performance with a simple structure. Also, since it is possible to impart different functions to the respective spring portions by using the plurality of divided leaf springs, it is easy to adjust the overall characteristics of the vibration attenuating spring.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What we claim is:

1. A vibration attenuating spring comprising:

a leaf spring having a bent portion and a pair of lever portions extending from respective ends of said bent portion;

an elastic member disposed within said bent portion being elastic deformable in response to said lever portions being pressed toward one another and wherein said elastic member is formed with a contact portion that is in contact with an inner surface of said bent portion of said leaf spring and said elastic member is also formed with a projection portion extending from said contact portion said projecting portion bring race apart from said lever portions with said leaf spring in a compression free state.

2. The vibration attenuating spring according to claim 1, wherein said elastic member is fixed to an inner surface of said bent portion of said leaf spring.

3. The vibration attenuating spring according to claim 2, wherein said elastic member is formed integrally within said bent portion of said leaf spring.

4. The vibration attenuating spring according to claim 1, wherein said elastic member is formed of rubber.

5. The vibration attenuating spring according to claim 1, wherein said leaf spring is formed of metal.

6. The vibration attenuating spring according to claim 1, further comprising a plurality of said spring elements connected in series end to end defining an elongated leaf spring with a plurality of bent portions having corresponding lever portions.

7. A vibration attenuating spring comprising:

an elongated leaf spring bent into an undulated shape with a plurality of bent portions and a plurality of lever portions where each lever portion extends between corresponding pairs of bent portions defining a repeating sinusoidal-like shape, said bent portions defining two groups of bent portions, a first group of bent portions being defined on a first longitudinal side of said leaf spring and a second group of bent portions defined on a second longitudinal side of said leaf spring;

a plurality of elastic members disposed only on an inner surface of each of said first group of bent portions, said second group of bent portions being configured without any of said plurality of elastic members, said elastic members being elastically deformable in response to said lever portions being urged toward one another; and wherein said plurality of elastic members are formed of rubber.

8. The vibration attenuating spring according to claim 7, wherein said plurality of elastic members are disposed between every other of said first group of bent portions.

9. The vibration attenuating spring according to claim 7, wherein said plurality of elastic members have differing sizes from one another.

10. The vibration attenuating spring according to claim 7, wherein said plurality of elastic members have differing rigidities with respect to one another.

11. The vibration attenuating spring according to claim 7, wherein said plurality of elastic members are fixed to an inner surface of said first group of lever portions.

12. The vibration attenuating spring according to claim 11, wherein said plurality of elastic members are formed integrally with said first group of lever portions.

13. The vibration attenuating spring according to claim 7, wherein said elongated leaf springs is formed of metal.

14. The vibration attenuating spring according claim 7, wherein said leaf spring is preformed in an arcuate shape as a whole in a compression free state.

15. A damper mechanism comprising:

an input rotary member;

an output rotary member disposed to be rotatable relative to said input rotary member; and an elongated leaf spring disposed between said input rotary member and said output rotary member, said elongated leaf spring bent into an undulated shape with a plurality of bent portions and a plurality of lever portions where each lever portion extends between corresponding pairs of bent portions defining a repeating sinusoidal-like shape, said bent portions defining two groups of bent portions, a first group of bent portions being defined on a first longitudinal side of said leaf spring and a second group of bent portions defined on a second longitudinal side of said leaf spring; and a plurality of elastic members disposed on an inner surface of at least one of said first and second groups of bent portions, said elastic members being elastically deformable in response to said lever portions being urged toward one another.

16. The damper mechanism as set forth in claim 15, wherein:

said input rotary member at least partially defines a damper receiving chamber and a portion of said output rotary member extends into said damper receiving chamber;

said leaf spring and said plurality of elastic members are disposed in said damper receiving chamber; and the damper mechanism further comprises a sliding frictional resistance reducing mechanism disposed between an outer circumferential wall of said damper receiving chamber and said leaf spring.

17. The damper mechanism as set forth in claim 15, wherein said sliding frictional resistance reducing mechanism includes needle bearings disposed between two circumference ally extending retaining members.

* * * * *